United States Patent
Seitz et al.

(10) Patent No.: US 9,772,181 B2
(45) Date of Patent: Sep. 26, 2017

(54) TEST BODY FOR DETERMINING ROTATION ERRORS OF A ROTATING APPARATUS

(71) Applicant: CARL-ZEISS INDUSTRIELLE MESSTECHNIK GMBH, Oberkochen (DE)

(72) Inventors: Dominik Seitz, Schwaebisch Gmuend (DE); Tobias Held, Noerdlingen (DE); Rainer Sagemueller, Aalen (DE); Claus-Peter Walny, Essingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 135 days.

(21) Appl. No.: 14/760,138

(22) PCT Filed: Jan. 9, 2013

(86) PCT No.: PCT/EP2013/050329
§ 371 (c)(1),
(2) Date: Jul. 9, 2015

(87) PCT Pub. No.: WO2014/108188
PCT Pub. Date: Jul. 17, 2014

(65) Prior Publication Data
US 2015/0345937 A1    Dec. 3, 2015

(51) Int. Cl.
*G01B 11/26*      (2006.01)
*G01B 21/04*      (2006.01)
*G01B 5/24*       (2006.01)

(52) U.S. Cl.
CPC .............. *G01B 11/26* (2013.01); *G01B 5/24* (2013.01); *G01B 21/042* (2013.01)

(58) Field of Classification Search
CPC .... G01B 11/27; G01D 18/00; B23B 2270/48; B23B 25/06

(Continued)

(56) References Cited

U.S. PATENT DOCUMENTS 5,610,846 A      3/1997    Trapet et al.
7,277,811 B1 *  10/2007    Marsh ................... B23Q 17/22
                                                        702/105

(Continued)

FOREIGN PATENT DOCUMENTS

DE       195 18 268 A1    11/1995
DE          4424871 A1     1/1996

(Continued)

OTHER PUBLICATIONS

Khan, A.W., et al., "A methodology for error characterization and quantification in rotary joints of multi-axis machine tools", The International Journal of Advanced Manufacturing Technology, Dec. 2010, pp. 1009-1022, vol. 51, No. 9-12.

(Continued)

*Primary Examiner* — Thanh Luu
(74) *Attorney, Agent, or Firm* — Laurence A. Greenberg; Werner H. Stemer; Ralph E. Locher

(57) ABSTRACT

A test body is provided for determining one or more rotation errors of a rotating apparatus with respect to one or more degrees of freedom of movement, in which a real rotating movement of the rotating apparatus differs from an ideal rotating movement. The test body includes a holder which, together with a part of the rotating apparatus, can be rotated about an axis of rotation. The holder can be configured to arrange or fasten the test body with respect to the axis of rotation about which the test body can be rotated for the purpose of determining the rotation error(s). One or more test elements are rigidly connected to the holder or are formed on the holder, and each of the test elements is used to determine a rotation error with respect to one or more of the degrees of freedom of movement.

24 Claims, 24 Drawing Sheets

(58) Field of Classification Search
USPC .............................................. 356/138, 152.3
See application file for complete search history.

(56) References Cited

U.S. PATENT DOCUMENTS

2004/0025357 A1   2/2004   Schroder
2014/0167745 A1   6/2014   Held et al.

FOREIGN PATENT DOCUMENTS

| DE | 102006059491 B3 | 4/2008 |
| DE | 102011012611 A1 | 8/2012 |
| EP | 0684447 B1 | 9/2003 |
| WO | 0225220 A1 | 3/2002 |
| WO | 2013007285 A1 | 1/2013 |
| WO | 2013007285 A1 | 7/2013 |

OTHER PUBLICATIONS

Geckeler, R.D., et al., "Calibration of angle encoders using transfer functions", International Journal of Precision Engineering and Manufacturing, Mar. 2006, pp. 367-371, vol. 14, No. 3.
Probst, R., et al., "The new PTB angle comparator", Measurement Science and Technology, 1998, pp. 1059-1066, vol. 9, No. 7.
Busch, K., et al., "Rückführung von Koordinatenmessgeräten durch Abschätzung der zu erwartenden Messabweichungen durch Simulation", Physikalisch-Technische Bundesanstalt, 1996.

* cited by examiner

TEST BODY FOR DETERMINING ROTATION ERRORS OF A ROTATING APPARATUS

BACKGROUND OF THE INVENTION

Field of the Invention

The present invention relates to a test body for establishing rotational errors of a rotational device, in particular for a coordinate measuring machine, an arrangement and a method for establishing such rotational errors.

Rotational devices, such as rotary pivot joints or rotary tables for coordinate measuring machines, usually comprise an angle encoder, by means of which the current angle position of the rotational axis of the rotational devices can be registered. In the case of conventional incremental measuring systems, this is usually brought about with reference to a reference marker. However, the conventional angle measuring systems have errors which lead to measurement errors in coordinate metrology.

In addition to the errors caused by the angle measuring system itself, there are additional errors as a result of the mechanism of the rotational device, in particular as a result of the mounting/guiding of the parts of the rotational device rotatable about the rotational axis, as well as errors, which are produced by forces or torques acting in or on the rotational axis. Forces and torques can act statically or dynamically in this case. In general, deviations from the ideal rotational movement occur in all six degrees of freedom (translational and rotational) in the case of the movement of parts about a rotational axis, which are subsumed by the phrase rotational error. Thus, the phrase "rotational error", which is also referred to as "movement error", means all errors or deviations, such as translational and rotational deviations, which occur when parts of the rotational device rotate about a rotational axis. In the case of multi-stage rotational devices with a rotational movability about a plurality of rotational axes, the rotational errors in relation to one rotational axis are possibly additionally dependent on the current rotational position of the other rotational axis (axes).

These additional errors also have an effect on the measurement accuracy of the coordinate measuring machine. Some of these errors, namely e.g. the wobble error and radial run-out, even lead directly to an additional measuring error of the angle measuring system of the rotational device.

Therefore, it is desirable to calibrate rotational devices and the angle measuring systems thereof. In particular, it is possible to register rotational errors and subsequently correct or compensate these by computation. A specific rotational error is the so-called rotational position error, which describes the deviation of the actual rotational position from the nominal rotational position, which is output by the rotational position measurement system. In particular, the rotational position error makes itself known by virtue of a rotational angle measuring system of a rotational device displaying a value deviating from the actual rotational angle.

Registering the aforementioned rotational errors can also be referred to as "qualification". What is important for the qualification of rotational devices in respect of the rotational axes thereof is that the qualification takes into account the conditions occurring during subsequent use. Thus, for example, the subsequent orientation (installed position) of the rotational axis may be decisive as deformations in the axis-of-rotation structure already occur as a result of the inherent weight of the rotational device. Further aspects include, for example, the used swivel region, the weight of a measuring head to be supported, the weight of a workpiece or torques caused by a measuring head or workpiece. Furthermore, dynamic effects occur, for example natural dynamic effects of the rotational axis in the form of deviations, which may be caused by different rotational speeds of parts of the rotational device, or effects due to an additional movement of the rotational device, for example if the rotational device is moved along a linear axis. The aforementioned influences require qualification taking into account the influences or a repetition of the qualification if the influences have changed.

Depending on the method employed, the qualification of rotational devices in respect of the rotational axes thereof can be very complicated. Many methods require expensive and high-maintenance measuring devices. A further aspect relates to the pure measurement duration or the equipment time. Firstly, the rotational errors are established in each rotational device, which rotational errors are stored in a data file for a subsequent computed aided accuracy (CAA) error correction; secondly there is monitoring and acceptance of each rotational device on the basis of maximum error prescriptions. Depending on the number of rotational devices to be measured and monitored, significant outlay may be generated here.

BRIEF SUMMARY OF THE INVENTION

One object of the invention lies in the provision of a test body, by means of which rotational errors of a rotational device are establishable with high precision and with as little time outlay as possible. Further objects lie in the provision of an arrangement and method for establishing rotational errors with the aid of the test body.

Different subjects of the invention are specified under the following headings I, II, and III, which can be combined with one another in any combination. However, each invention subject in relation to I, II and III also already constitutes an independent invention, wherein the subjects in relation to II and III may solve other or further problems than the aforementioned problem.

I. Test Body, Arrangement with the Test Body and Method Using the Test Body

The aforementioned object is achieved, in particular, by a test body, an arrangement and a method according to the independent claims. Specific advantageous embodiments are the subject matter of dependent claims.

What is specified is a test body for establishing one or more rotational errors of a rotational device, in particular of a rotational device for a coordinate measuring machine, in respect of one or more degrees of freedom of movement, in which a real rotational movement of the rotational device differs from an ideal rotational movement, wherein the test body comprises:
 a holder, which is rotatable together with part of the rotational device about a rotational axis and which is embodied to arrange or fasten the test body in relation to the rotational axis about which the test body is to be rotated for establishing the rotational errors,
 a test element rigidly connected to the holder or formed on the holder, wherein the test element serves to establish the rotational error in respect of one or more of the degrees of freedom of movement,
wherein the test element is a reflector which is aligned at an angle to the rotational axis and reflects radiation incident thereon in a direction dependent on the rotational angle of the test body, or wherein the test element is a measurement body which is arranged at a distance from the rotational axis and/or in a manner not coaxial with the rotational axis such that the rotational angle of the test body is determinable by an associated sensor or by the measuring system of a coordinate measuring machine on the basis of the rotational position of the test element. Such a test body is combinable in any combination with one or more of the subjects of the invention, embodiments and variants described in this description.

Also specified is a test body for establishing one or more rotational errors of a rotational device, in particular of a rotational device for a coordinate measuring machine, in respect of one or more degrees of freedom of movement, in which a real rotational movement of the rotational device differs from an ideal rotational movement, wherein the test body comprises:
- a holder, which is rotatable together with part of the rotational device about a rotational axis and which is embodied to arrange or fasten the test body in relation to the rotational axis about which the test body is to be rotated for establishing the rotational error or rotational errors,
- a plurality of test elements rigidly connected to the holder or formed on the holder, wherein each one of the test elements serves to establish the rotational error in respect of one or more of the degrees of freedom of movement, wherein a first one of the test elements is a reflector which is aligned or alignable at an angle to the rotational axis and reflects radiation incident thereon in a direction dependent on the rotational angle of the test body, or
wherein a first one of the test elements is a first measurement body which is arranged, or can be arranged, at a distance from the rotational axis and/or in a manner not coaxial with the rotational axis such that the rotational angle of the test body is determinable by an associated sensor or by the measuring system of a coordinate measuring machine on the basis of the rotational position of the test element,
wherein a second one of the test elements is a reflector which is aligned or alignable at an angle to the rotational axis and which reflects radiation incident thereon in a direction dependent on the rotational angle of the test body and which, if another reflector which is a test element of the test body is present, is aligned in a different direction to the other reflector and which, if another reflector which is a first test element of the test body is present, can be attached together with the other reflector at a common support body, or
wherein a second one of the test elements is a reflector which is aligned in the direction of the rotational axis and which, if another reflector which is a first test element of the test body is present, can be attached together with the other reflector at a common support body, or
wherein a second one of the test elements is a second measurement body which is a rotationally symmetric measurement body or which has a face pointing in one direction or a plurality of faces pointing in different directions. What applies to one or more faces is that they are preferably a planar or substantially planar face, or that they are a planar face in at least a portion of the face.

The phrase "rotational error" comprises all translational and rotational deviations which occur during the operation of the rotational device, in particular three translational errors in respect of the Cartesian coordinate axes X, Y and Z, referred to as Tx, Ty, Tz, and rotational errors in respect of the Cartesian coordinate axes X, Y, referred to as Rx, Ry, provided that the rotational axis of the rotational device is aligned in the Z-direction (more in this respect is outlined below). If the movement about the rotational axis were an ideal rotational movement, there would be no rotational errors. This applies within the scope of the measurement accuracy of the sensors which are used in combination with the test elements and within the scope of the precision with which the test body is manufactured (e.g. precision of the rotational symmetry of a measurement body and precision of a mirror as a test element). In particular, the test body can be calibrated in advance in combination with the assigned sensors in order to correct or eliminate measurement errors of the sensors and deviations from the ideal design of the test body.

A specific rotational error is the rotational position error which was already mentioned and defined above. To the extent that the rotational axis is aligned in the Z-direction of a Cartesian coordinate system, the rotational position error in this invention is also referred to as Rz. Naturally, different alignments of the rotational axis in a different direction of the Cartesian coordinate system are possible, e.g. a horizontal alignment. In the case of an alignment of the rotational axis in the Y-direction of a predetermined coordinate system, the rotational position error would be referred to as Ry; in the case of an alignment in the X-direction, it would be referred to as Rx. In the selected example, Rz should be distinguished from Ry and Rx to the extent that, here, the rotation of the rotatable part of the rotational device about the rotational axis aligned in the Z-direction is desired in the rotational device, whereas a rotation of the rotatable part about a different spatial axis—X or Y—is undesired and constitutes a deviation from the ideal rotational movement.

Examples of rotational devices are rotary joints, rotary pivot joints, which have a plurality of rotational axes, and rotary tables. The invention relates in particular to rotational devices which are usable in coordinate measuring machines (abbreviated to CMM below), machine tools, robots and other applications in which high accuracy is important. The rotational device is also referred to as test object.

A rotation of the test body is implemented by virtue of it being arranged at or on the rotational device and co-rotated when the rotational device is rotated. The rotational device preferably has a first and a second part which are rotatable relative to one another. The test body is preferably fastened on or at one of the rotatable parts of the device in such a way that it is not rotatable relative to this part. Thus, if, for example, the test body is arranged at a second part of the rotational device and if the second part is rotated relative to the first part, the test body is also rotated about the same rotational angle relative to the first part as the second part. By way of example, the test body can be positioned on the plate of a rotary table to be qualified, or at a rotatable part of a rotary pivot joint.

The fact that the holder, and hence the test body, are rotatable about a rotational axis does not imply a rotational movability of the holder or test body when considered on its own. Rather, the test body is configured for a rotation about a rotational axis if it is arranged in a predetermined manner, preferably in a reproducible manner, at a rotational device or at a reference rotational device which will still be described below. The phrase "rotational axis" then refers to the rotational axis of the rotational device or the rotational axis of the reference rotational device. When using the test body, the rotational axis can be tangential to, or intersect with, the test body or the holder or a test element, or the rotational axis can lie outside of the test body when the test body is used.

A reflector, as a test element, is aligned in relation to the rotational axis in the manner described when the test body is arranged at a rotational device or reference rotational device. Or a reflector, as a test element, is alignable in relation to the rotational axis in the manner described when the test body is intended to be arranged at a rotational device or reference rotational device. A measurement body, as a test element, is arranged at a distance from the rotational axis and/or in a manner not coaxial with the rotational axis when the test body is arranged at a rotational device or reference rotational device. Or a measurement body, as a test element, can be arranged in the manner described in relation to the rotational axis when the test body is intended to be arranged at a rotational device or reference rotational device.

The use of a rotational device and of a reference rotational device in a specific method will still be discussed in detail below. The test body is configured in such a way that it can be attached to part of a rotational device or reference rotational device, to be precise in a manner conjointly rotating with this part. The part of the rotational device/reference rotational device can be rotatable about the rotational axis relative to a further part of the rotational device/reference rotational device (together with the test body). By way of example, the part to which the test body can be attached is a rotary plate or a rotary table or a rotatable part of a rotary joint or rotary pivot joint.

The holder of the test body can have an axis of rotational symmetry which can be arranged axially flush or substantially axially flush with the rotational axis of the rotational device or the reference rotational device.

The rotational angle of the test body or of the rotational device is preferably implemented with the aid of the first test element. This rotational angle information can be used to determine the rotational position error of the rotational device. The first test element can be attached laterally to the rotational axis and connected directly to the holder. In another variant, the first test element is connected indirectly to the holder by means of a support or another different fastening element. Instead of this, or in addition thereto, other rotational errors, such as e.g. translational errors or further rotational errors, as explained in the part relating to the example, can also be determined by means of the first test element.

The second test element preferably serves to register further translational or rotational deviations, which can occur in addition to the rotational position error. However, the second test element can also be used to determine a rotational position error, as specified in the exemplary embodiments. By way of example, rotational position errors can be determined by means of the first and the second test element if both are reflectors, in particular mirrors.

A reflector as a test element can advantageously be used in a method for registering rotational position errors, as yet to be described below and in the examples, wherein, in the method, a rotational device is coupled to a reference rotational device and the test body is attached to the rotational device or the reference rotational device and wherein, in the method, a rotation of parts of the rotational device and of parts of the reference rotational device is undertaken in such a way that, after the rotations, the position of the test body is unchanged, changed only a little or substantially unchanged, in particular unchanged, changed only a little or substantially unchanged in relation to an external reference point or observation point. In such a method, the one unchanged or minimally changed position of the reflector can be registered by means of e.g. a sensor, in particular an angle sensor, specifically an autocollimator.

Within the terminology of this invention, a reflector should be distinguished from a measurement body. The purpose of the reflector is to determine a rotation by a change in direction of reflected radiation, in particular light, after a change in rotational position of the reflector and/or to determine a translation by means of reflected radiation, e.g. by means of a radiation-based distance sensor.

A measurement body is configured in such a way that the rotation and/or translation thereof can be determined by a radiation-less measurement, in particular by means of a coordinate measurement and/or a radiation-less distance measurement.

However, despite distinguishing between the terms reflector and measurement body, it is conceivable for a reflector to be able to be used within the aforementioned sense of a measurement body, without the reflective properties for radiation thereof being used. By way of example, the surface of a plane mirror before and after a rotation can be sensed at at least three points using the sensing unit of a coordinate measuring machine, as a result of which the position of the surface plane before and after the rotation is obtained, and the rotation or the rotational angle can be established therefrom.

The term reflector also comprises arbitrarily thin reflection layers, which may be applied to a support body or a surface of a support body for stabilizing purposes. A reflector can e.g. be a mirror, in particular a plane mirror or a substantially plane mirror, a flat or substantially flat mirror or a mirror without curvature or substantially without curvature.

In a further variant, the reflector can be a combination of
a) a first, partly transparent mirror, preferably a plane mirror or substantially plane mirror and
b) a second, fully reflecting mirror, preferably a plane mirror or substantially plane mirror,
wherein the partly transparent mirror a) and the fully reflecting mirror b) are arranged in such a way in relation to one another that incident radiation is firstly incident on the first, partly transparent mirror, it partly passes through this first mirror and is partly reflected thereby, and the radiation portion passing through the first mirror is subsequently incident on the fully reflecting mirror b) and
wherein the mirror a) and the mirror b) are arranged at an angle to one another, preferably at an angle less than 90°.

In another variant, the reflector can be a retroreflector. In a special variant, the reflector can be a prism. A light-entry face of the prism can be partly reflective such that part of the incident light is reflected at this face like it is at a plane mirror and the remaining part of the light is cast back in an angle-maintaining manner after reflection at the angled faces of the prism. Preferred variants are described in DE102011012611 (A1). By way of example, a triple prism and a 90 degree prism are described therein, wherein it is possible, in conjunction with an autocollimator, to measure not only the inclination angle perpendicular to the optical axis but also, simultaneously, the roll angle about the optical axis.

The reflector can also be a combination of a mirror, in particular a plane mirror, a retroreflector and/or a prism.

In a reflector, the rotational angle can be determined, in particular, with an autocollimator or with a distance sensor, as described in the exemplary embodiments, when the test body is rotated in a manner in which the reflector is co-rotated. Preferred measuring methods for determining the rotational position error are contactless measuring methods, in particular autocollimation. As a result, no errors are generated by sensing forces and the test bodies are spared mechanically.

The following description relates to a mirror, but can apply analogously to a retroreflector. A mirror need not be exactly planar and can have wanted non-planar elements on a planar face, for example a prism as mentioned above. Otherwise, possibly present form defects of the mirror can be calibrated in a separate step and the error can be taken into account when using the test body.

The phrase "aligned at an angle to the rotational axis" means that the reflector does not point in the direction of the rotational axis or parallel to the rotational axis, but rather in any direction pointing away from the rotational axis, in the specific case, in a direction orthogonal or substantially orthogonal to the rotational axis. The beam of an autocollimator can be directed onto a reflection face of the reflector and register a change in angle when the mirror is co-rotated when the test body is rotated. Additionally, it is also possible to register the rotation of the mirror about a further rotational axis, e.g. a rotational axis orthogonal to the rotational axis of the test body, and to register the rotational deviation in respect of this further rotational axis. Preferably, to this end, the reflector is aligned orthogonally or substantially orthogonally.

In a specific variant of a test body, the first test element is a reflector, which is aligned at an angle to the rotational axis and reflects radiation incident thereon in a direction dependent on the rotational angle of the test body, and the second test element is a reflector, which is aligned at an angle to the rotational axis and reflects radiation incident thereon in a direction dependent on the rotational angle of the test body, and the reflectors are arranged at an angle to one another, e.g. arranged orthogonally.

If the first and the second test elements are reflectors, then both reflectors can be attached together to a common support body, for example in the form of reflecting coatings. An example of a support body is a regular or irregular polyhedron, e.g. a prism, a tetrahedron, a hexahedron, an octahedron, a dodecahedron, an icosahedron.

Specifically preferred examples of support bodies are support bodies that have a cross section in the form of a polygon, preferably a regular polygon. Preferably, a cross section is in the form of an N-gon, wherein N is an integer greater than or equal to 3, preferably a regular N-gon. Examples are three-, four-, five-, six-, seven- or eight-sided cross sections.

More specific examples of a support body are prisms, wherein a prism is understood to mean a geometric body which has a polygon as a base area, preferably a regular polygon, and the side edges of which are parallel and of equal length, wherein the side edges extend at an angle to, in particular in a manner orthogonal to, the base area. A prism with an N-sided base area is preferred, wherein N is an integer greater than or equal to 3, preferably with a regular N-sided base area. Examples are a three-, four-, five- six-, seven- or eight-sided base area, wherein a regular three-, four-, five- six-, seven- or eight-sided base area is most preferable.

Reflectors or reflector layers can be applied to one or more external faces of a support body. The support body can be a hollow body with external faces. Two or more of the external faces can be provided with a reflector or with a reflection layer, wherein, for example, a first reflection layer on a first face is the first test element and a second reflection layer on a second face is the second test element. In the case of a polyhedron, in particular a prism, an end face pointing in the direction of the rotational axis as one of the external faces can be provided with a reflector or with a reflection layer.

In one embodiment, the support body has a reflector arrangement which has a plurality of reflectors or reflector layers, wherein the reflectors or reflector layers are at an angle to one another and point in different spatial directions.

When the reflector or the reflector layer is a plane mirror or a substantially plane mirror, or a planar or substantially planar layer, then the phrase "spatial direction" or "pointing in a spatial direction" refers to the normal vector on the mirror surface, i.e. the normal vectors point in different, e.g. inverted spatial directions, expressed differently: in opposite spatial directions.

By way of example, two reflectors or reflector layers can be present in a support body with a reflector arrangement, which reflectors are at an angle of >180° to 360° in relation to one another. The angle between two reflectors or reflector layers is measured from the reflecting surface of one reflector or one reflector layer to the reflecting surface of another reflector or another reflector layer. In the case of an angle of 360°, the reflectors/reflector layers point in opposite spatial directions.

By way of example, more than two reflectors or reflector layers can be present in a support body with a reflector arrangement, which reflectors or reflector layers are at an angle in relation to one another and point in various spatial directions, wherein adjacent reflectors or reflector layers are preferably at an angle of >180° to <360° in relation to one another, wherein the angle is defined as in the case above. In a specific preferred variant, neighboring reflectors or reflector layers can be at an angle of $$\alpha=360°-[(N-2)/N]*180°$$

in relation to one another, where N is an integer greater than or equal to 3.

Such a support body and such a reflector arrangement permit so-called flipping-over measurements in a simple manner without the test body having to be released from a rotatable part of a rotational device, to which it is coupled in a conjointly rotating manner, in order to twist the test body against this part. Measurements according to this principle are described elsewhere in this description and in the examples. By way of example, the support body can have external faces, which are at the aforementioned angle $\alpha$ in relation to one another, wherein reflectors, in particular plane mirrors, or reflector layers are attached to the external faces. Specific examples of such a support body are prisms, as defined and specified above.

In a further possible alternative, in the case of a reflector, the phrase "aligned at an angle to the rotational axis" means that the reflector is aligned in the rotational direction or opposite to the rotational direction. In the case of a mirror, the reflection face thereof can be aligned in this manner. The phrase "aligned in the rotational direction or opposite to the rotational direction" means that the reflector points in the rotational direction or opposite to the rotational direction. In the case of a mirror, the reflection face points in the rotational direction or opposite to the rotational direction. Specifically, a reflection face can be aligned in such a way in the case of a mirror that a normal vector at a point on the reflection face is tangential to a circle described by the rotational movement of the point about the rotational axis. In this embodiment, e.g. a distance sensor, in particular a laser, is used for registering the rotational angle, which distance sensor measures a change in the distance in a rotation of the mirror, from which the rotational angle can be calculated from trigonometric relationships, as specified in an exemplary embodiment. However, alternatively, use can be made of e.g. an autocollimator in order to measure the rotational angle or a change in rotational position.

A first measurement body, as a first test element, which is arranged at a distance from the rotational axis and/or in a manner not coaxial with the rotational axis can be any body to which a uniquely defined coordinate system, which is referred to as workpiece or measurement body coordinate system, can be assigned. Examples are a sphere, a cylinder, a triple sphere, a cone, a prism or any other geometric body. In particular, the measurement body has one or more reference points, also referred to as "spatial points", which are determinable with a measuring system of the CMM such that the rotational position is determinable by determining the position of the reference point or points in different rotational positions of the measurement body. The reference point or points are at a distance from the rotational axis.

The first measurement body can have a marking, e.g. an elevation or depression in the surface, which can be probed by the tactile measuring head system of a coordinate measuring machine, in particular by a sensing unit as part thereof, such that a spatial point can be uniquely determined.

It is also possible to probe a reflector as first test element in order to determine a change in position. By way of example, in the case of a plane mirror, the surface can be probed at three points and, after a change in the rotational position, probing can once again take place at three points in order thus to determine the rotational angle in the mirror plane.

By way of example, the reference point can be determined by probing using the tactile measuring system of a CMM. If the test element is a sphere, then e.g. the sphere center can be used as reference point, the position of which can be determined by multiple probing of the sphere surface. By way of example, the rotational device is a rotary table and a test body having a sphere located laterally in relation to the rotational axis is positioned on the rotary table. In a first angle position, the position of the sphere and of the sphere center can be registered using the measuring system of the CMM, e.g. by way of sensing. After rotating the rotary table plate and the test body into a second position, the changed sphere position and the sphere center can be registered anew and the rotational angle of the rotary table plate and of the test body can be established from the measured values. At the different sphere positions, the sphere center is preferably determined by multiple probing.

Any measurement body at or in which a reference point or spatial point is uniquely determinable using the measuring system of the CMM can be used as first measurement body as an alternative to a sphere. As mentioned above, e.g. the sphere center is the reference point in the case of a sphere. Possibly present form defects of the measurement body can be calibrated in a separate step and the error can be taken into account when the measurement body is used.

As mentioned above, a second one of the test elements can be a second measurement body which is either a rotationally symmetric measurement body or which has a plurality of faces pointing in different directions. The phrase "second measurement body" serves for distinguishing it from the first measurement body. The first measurement body is a specific case of a first test element and can, as described above, be arranged at a distance from the rotational axis and/or in a manner not coaxial with the rotational axis.

In particular, one of the test elements, for example the second test element, can be a rotationally symmetric measurement body, the axis of symmetry of which can be arranged in a manner coaxial with the rotational axis, i.e. the axis of rotational symmetry thereof can be aligned in a manner coaxial with the rotational axis. Examples of such rotationally symmetric elements are a sphere, a disk, a ring, such as e.g. a torus, a cylinder, a cone or a combination thereof. A plurality of spheres arranged in succession along the axis, e.g. a double sphere, can be provided as rotationally symmetric test element. The whole sphere surface is not accessible for the measurement in the case of a sphere or double sphere since the test element is connected to the holder at at least one location.

In a preferred variant, the rotationally symmetric test element is a cylinder. Furthermore, a plurality of spheres, in particular a double sphere, are preferred. In this context, a double sphere, or an arrangement of even more spheres, is considered to be a rotationally symmetric test element which, like a cylinder, can be measured at different points along the axis of symmetry by means of a sensor. Using a cylinder or a double sphere, it is possible to determine rotational deviations about axes which are orthogonal to the rotational axis of the rotational device and the test body attached thereto. Furthermore, it is possible to determine translational deviations in directions at an angle to the rotational axis. Furthermore, it is possible to determine a translational deviation in the direction of the rotational axis if a distance measurement is implemented on the upper pole of a sphere, or on the upper pole of the upper sphere of a double sphere, or on the end face of a cylinder. It is also possible to determine a rotational deviation by measuring a plurality of points on the end face of the cylinder, wherein the cylinder should have a sufficient diameter for the purposes of arranging appropriate sensors, but it can by all means have a low height, i.e. be disk-shaped.

In a second alternative, the second measurement body has a plurality of faces pointing in different directions. In this case, the second measurement body is not rotationally symmetric. Specific examples are prisms, wherein a prism is understood to be a geometric body which has a polygon as a base area and the side edges of which are parallel and of equal length. Specific examples are a triangular prism, a cuboid, a cube, a hexagon, pentagon, octagon and bodies with even more side faces pointing in different directions. In such a second measurement body, one or more distance and/or angle sensors can be directed to one or more of the faces. By way of example, a cube can be aligned in such a way that, in relation to a Cartesian coordinate system, two side faces point in the X and −X direction and two side faces point in the Y and −Y direction and the remaining two side faces point in the Z and −Z direction. One or more of these side faces can be assigned distance sensors, by means of which a translation in the corresponding spatial direction is measurable. The faces can be such that a plurality of angle and/or distance sensors can be assigned at various heights along an X, Y and/or Z-axis of the face such that even a rotation of the measurement body is registrable. By way of example, the second measurement body can have rectangular side faces, which enable an arrangement of a plurality of sensors along the side face. In a further alternative, the second measurement body can be a double cube, which is considered to be a measurement body in this context. A second measurement body which has a number of faces pointing in different directions can be advantageously used in a method, still described below and in the examples, for registering rotational position errors, in which a rotational device is coupled to a reference rotational device and the test body is attached to the rotational device or the reference rotational device, and wherein, in the method, a rotation of parts of the rotational device and of parts of the reference rotational device is undertaken in such a way that, after the rotations, the position of the test body is unchanged or substantially unchanged. In such a method, a rotational symmetry of the second measurement body is not required because the measurement body is not twisted, or only twisted insubstantially, relative to sensors assigned thereto.

In one embodiment, the test body has a pedestal connected to the holder or formed on the holder. The pedestal is configured to attach the test body to a rotational device, in particular to a rotatable part of a rotational device. In particular, the pedestal has a larger cross section at an angle to the rotational axis than the holder. The pedestal preferably has a metal, metal alloy, ceramic or plastic as a main material component. The pedestal serves for installation in a CMM or for attaching the test body to a rotational device, such as e.g. a rotary pivot joint or a rotary table, or to a reference rotational device, which will still be described on the basis of a method in which the test body can be used. The pedestal is configured in such a way that it can be attached to part of a rotational device or a reference rotational device, preferably in a conjointly rotating manner, i.e. in a manner not rotatable relative to this part. The part of the rotational device/reference rotational device can be rotatable relative to a further part of the rotational device/reference rotational device. By way of example, the part to which the pedestal can be attached is a rotary plate of a rotary table or a rotatable part of a rotary joint or rotary pivot joint.

In one embodiment, the test body has means for fastening or bearing in a coordinate measuring machine or for fastening or bearing on a rotational device for a coordinate measuring machine, such as a rotary pivot joint or a rotary table. Fastening or bearing on a rotational device means, in particular, that the test body is fastened or mounted on or below the rotational device in the installed position of the rotational device and of the test body.

The means for fastening or bearing are preferably arranged at the holder or at a pedestal, which were described above. Means for fastening or bearing are preferably one or more interlocking connection means or one or more force-fit connection means.

The test body can be equipped with one or more three-point bearings which enable a reproducible assembly in one or more orientations. Using this, the test body can be used e.g. for qualifying the various rotational axes of a rotary pivot joint.

In the case of a three-point bearing, an additional tensile force is preferably generated between the test body and a part, on or at which the test body is mounted, which is also referred to as "pretensioning". Such a tensile force prevents the test body from jumping out of the bearing. By way of example, depending on the alignment of the test body, jumping out of the bearing can be brought about by the weight thereof or by a movement of the test body.

The pretensioning increases the reproducibility of the orientation of the test body. The pretension can be implemented e.g. magnetically, preferably at a central point between a plurality of bearing points, or by the inherent weight of the test body. An additional mass can be attached to the test body in order to increase the mass of the test body. For the purposes of magnetic pretension, the test body can have a magnet which, for example, can be installed or set into the test body. Such a magnet can exert an attractive force to a ferromagnetic substrate, for example to a ferromagnetic test object. The pretension can also be advantageous if large accelerations occur when qualifying the rotational axis, for example as a result of release movements in the case of latching rotary pivot joints. Further means for pretensioning are screws, hooks, a bayonet or a spring.

Further exemplary means for fastening or bearing are stops, pins, screwed connection means, plug-in connection means, latching connection means or non-slip materials.

An advantage of a three-point bearing lies in high precision. If such precision is not necessarily required, the test body can be fastened to the rotational device using stops, (dowel) pins, screws or other known fixation means.

In one embodiment, the test body has a reflector which is aligned in the direction of the rotational axis. In particular, in the direction of the rotational axis means that a measurement beam incident parallel to or along the rotational axis is incident on the reflector in an orthogonal or substantially orthogonal manner. A distance sensor can be aligned (axially) to the reflector in the direction of the rotational axis or parallel thereto and it can register a translational deviation in the direction of the rotational axis (e.g. in the Z-direction). Various distance sensors are usable, such as e.g. optical distance sensors or capacitive distance sensors, wherein an optical sensor is preferred due to the mirroring properties of a reflector.

Above, reflectors aligned at an angle to the rotational axis were already described as first and second test elements. These reflectors can be combined with a reflector oriented in the direction of the rotational axis. There can also be even more reflectors aligned at an angle to the rotational axis. Together, a plurality of reflectors can form an arrangement of reflectors, which is also referred to as a reflector array, e.g. in the form of a polyhedron, the sides of which are formed from the mirrors.

In a preferred variant, the test body has a reflector arrangement which has a plurality of reflectors or reflector layers, wherein the reflectors or reflector layers are at an angle in relation to one another and point in different spatial directions. As described above, there is no need for a support body in the case of such a reflector arrangement.

If the reflector or the reflector layer is a plane mirror or a substantially plane mirror, or a plane or substantially plane layer, then the term "spatial direction" and "pointing into a spatial direction" relates to the normal vector on the mirror surface, i.e. the normal vectors point in different, e.g. reverse, spatial directions.

By way of example, two reflectors or reflector layers can be present in the reflector arrangement, which reflectors or reflector layers are at an angle of >180° to 360° in relation to one another. The angle is measured from the reflecting surface of one reflector or one reflector layer to the reflecting surface of another reflector or another reflector layer. In the case of an angle of 360°, the reflectors/reflector layers point in opposite spatial directions.

By way of example, more than two reflectors or reflector layers can be present in the reflector arrangement, which reflectors or reflector layers are at an angle in relation to one another and point in various spatial directions, wherein adjacent reflectors or reflector layers are preferably at an angle of >180° to <360° in relation to one another. In a specific preferred variant, neighboring reflectors or reflector layers can be at an angle of $$\alpha=360°-[(N-2)/N]*180°$$

in relation to one another, where N is an integer greater than or equal to 3.

Such a reflector arrangement permits so-called flipping-over measurements in a simple manner, without the test body having to be released from a rotatable part of a rotational device, to which it is coupled in a conjointly rotating manner, in order to twist the test body against this part. Measurements according to this principle are described elsewhere in this description and in the examples.

In a preferred variant, the test body has a plurality of measurement bodies, which are arranged at a distance from the rotational axis and/or in a manner not coaxial with the rotational axis, wherein a notional line from one measurement body to the rotational axis and a notional line of an adjacent measurement body to the rotational axis are at an angle of 360°/M with respect to one another, wherein M is an integer greater than or equal to 2, in particular 2-8. In particular, each one of the measurement bodies has a reference point and a notional line from the reference point of a measurement body to the rotational axis and a notional line from the reference point of an adjacent measurement body to the rotational axis are at the angle of 360°/M with respect to one another. Expressed differently, the reference points preferably form the corners of a regular N-gon. The reference points can be e.g. sphere centers if the measurement bodies are spheres. Such an arrangement also permits in a simple manner the so-called flipping-over measurements which are described elsewhere. One of the plurality of measurement bodies which are arranged at a distance from the rotational axis and/or in a manner not coaxial with the rotational axis can be the first measurement body already mentioned above.

If the first and/or the second test elements are reflectors which are aligned at an angle to the rotational axis and if, furthermore, another reflector is present, which is aligned in the direction of the rotational axis, or if an aforementioned reflector arrangement is formed, which may also contain further reflectors, then all reflectors can be attached to a common support body, for example in the form of reflective coatings. Specific examples for support bodies are prisms, wherein a prism is understood to be a geometric body which has a polygon as a base area and the side edges of which are parallel and of equal length, or polyhedrons. The support body can be a hollow body with external faces. Specific examples for support bodies are a prism with a three-sided, four-sided, five-sided, six-sided, seven-sided or eight-sided base area, a tetrahedron, a hexahedron, an octahedron, a dodecahedron, an icosahedron. Three or more of the (external) faces of the support body can be provided with a reflection layer.

In principle, a test element can have one or more further test elements, e.g. a third test element, a fourth test element, etc., in addition to the aforementioned first and second test elements. Further test elements can be selected from such elements which were already described as first or second test element, such as reflectors and test bodies.

If a second one of the test elements is a second reflector aligned or alignable at an angle to the rotational axis, which second reflector is aligned in a different direction to the other reflector if another, first reflector, which is a test element of the test body, is present, then the other direction means, in particular, that both reflectors point in the opposite direction or substantially opposite to one another or both reflectors are orthogonal or substantially orthogonal to one another. Orthogonal to one another means that the reflectors point in directions that are at an angle of 90° to one another. The angle from the reflection face of the first reflector to the reflection face of the other reflector then is 360°−90°=270°; the angle between the normals of the reflection faces is 90°.

In one variant of the test body, a first one of the test elements is a reflector aligned in a manner orthogonal to the rotational axis and a second one of the test elements is likewise a reflector aligned in a manner orthogonal to the rotational axis, which second one of the test elements is aligned in a different direction to the first reflector, preferably in a manner orthogonal to the first reflector or in the opposite direction to the first reflector, and a further, third test element is a rotationally symmetric test element, the axis of symmetry of which is arranged in a manner coaxial with the rotational axis, wherein the third test element is preferably arranged at a different axial position in relation to the rotational axis than the reflectors. The reflectors are preferably both arranged at the same axial position. This also applies to further embodiments with two reflectors.

In a further variant of the test body, a first one of the test elements is a reflector aligned in a manner orthogonal to the rotational axis and a second one of the test elements is likewise a reflector aligned in a manner orthogonal to the rotational axis, which second one of the test elements is aligned in a different direction to the first reflector, preferably in a manner orthogonal to the first reflector or in the opposite direction to the first reflector, and a further, third test element is a reflector aligned in the direction of the rotational axis.

In one embodiment, the test body has a reflector as first and second test element. Both reflectors are preferably aligned orthogonal to one another, i.e. the reflection faces of the reflectors are at right angles to one another. By way of example, the first reflector points in the X-direction of a Cartesian coordinate system and the second reflector points in the Y-direction of a Cartesian coordinate system. In this embodiment, respectively one beam of an autocollimator can be directed to each one of the two reflectors. Firstly, the rotational angle about the rotational axis can be registered separately at both reflectors. Furthermore, a rotational deviation about in each case a further axis can be registered at each reflector, which further axis is orthogonal in relation to the rotational axis, as explained in the exemplary embodiments. It is possible to use two autocollimators and in each case direct the beam of one autocollimator to one of the reflectors. Secondly, it is also possible to use only one autocollimator and direct the beam by means of a deflection device, preferably an arrangement of deflection mirrors, onto both reflectors. In addition to one or more autocollimators, distance sensors can be directed onto the reflectors, e.g. laser rangefinders, in order to register translational deviations.

If the test body has a reflector as first, second and third test element, then all three reflectors are preferably aligned in a manner orthogonal to one another, i.e. the reflection faces of all reflectors are at right angles to one another. By way of example, the first reflector points in the X-direction of a Cartesian coordinate system, the second reflector points in the Y-direction of a Cartesian coordinate system and the third reflector points in the Z-direction of a Cartesian coordinate system.

Levers and additional masses can be attached to the test body. This renders it possible to simulate forces and torques occurring during the subsequent measurement operation. The rotational axis can then be qualified precisely in the manner in which it is also used in practice during measurement operation. For a subsequent correction, it is also possible to establish the compliance by unloaded and loaded measurements. Here, as described in EP0684447 (B1) and DE19518268 (A1), the compliance can encompass a tilt as a result of a torque, a tilt as a result of a force, a displacement by a torque and/or a displacement by a force.

Preferably, the test body is movable into its usage position at the test object and/or removable from the usage position. To this end, the arrangement can have an appropriate movement apparatus and/or an appropriate movement guide. In one embodiment, the test body has a component of a linear guide, e.g. a steel roller. In this embodiment, a linear guide, for example a steel roller mounted in a V-profile, is arranged between the test body and the test object. Using this, it is possible to move the test body out of, or into, the measurement region of sensors. In alternative embodiments, the test body has a joint or offset three-point bearings, by means of which the test body can be pivoted or offset out of, or into, the measurement region. If the test body is displaced, pivoted away or offset, it is possible e.g. to perform work, such as adjustments, on sensors. Offset three-point bearings are understood to mean that the test body can be brought into at least two different positions and/or alignments, in which respectively an associated three-point bearing is established.

In one embodiment, the test body has one or more actuation devices for setting the relative position between test body and test object, in order e.g. to set the coaxial property between test object and a rotary table. Screw drives are examples of actuation devices.

Alignment elements for aligning the test body can be arranged between the test body and the test object. Examples of alignment elements are a table, such as e.g. an XY-table and/or a tilt table, or a joint, e.g. a monolithic joint, or a flexure bearing, e.g. a bending flexure.

In a further embodiment, the test body has a two-part design. A number of the above-described test elements, such as mirrors, (double) spheres, cylinders, can be attached to different parts or can be present as individual parts, which can be assembled in a modular fashion to form the test body. Thus, test bodies with different components and functionalities are producible from different modules. In particular, the holder of the test body has a multi-partite design. By way of example, a first test element, e.g. a mirror, is fastened to a lower part of the holder and a second test element, e.g. a rotationally symmetric body, is fastened to an upper part. A three-point bearing can be situated between the two parts.

In a further variant of the invention, the test body has a face, which, from the perspective of the assembly position at a rotational device, is movable against a sensing unit, sensor or measuring head of a CMM. During the movement, the rotational device is moved together with the test body and, in the process, the face is moved against the sensing unit, sensor or measuring head. In relation to the movement against a sensing unit, this method is referred to as "probing with the test body". By multiple repetition of this sensing movement, the reproducibility of the movement of the rotational device, for example along a linear guide, can be tested. Alternatively, the test body can also contain a sensing unit.

In a further aspect, the invention relates to an arrangement, comprising:
a rotational device,
a test body which is arranged or fastened to the rotational device,
a plurality of sensors, which are respectively assigned to one or more of the test elements of the test body and configured to measure deviations in respect of at least one of the degrees of freedom of movement.

Rotational errors can be established from the deviations of the real rotational movement from the ideal or desired rotational movement in respect of degrees of freedom of movement, i.e. translational and rotational degrees of freedom.

The sensor is configured to generate a measurement signal corresponding to a position of the test element during operation of the arrangement.

By way of example, the sensor can be a magnetoresistive sensor, a Hall sensor, which operates in accordance with the electromagnetic Hall effect, an optical sensor, a sensor operating in accordance with the piezo-resistive effect, a capacitive sensor, an eddy current sensor which is configured for measuring the distance and/or relative position, or a sensor which operates in accordance with at least one of the aforementioned functionalities and/or at least one functionality that has not been mentioned. A number of magnetoresistive sensors and Hall sensors in particular can also be arranged on a common support, e.g. a micro-support that is similar to a microchip. Each one of the sensors on the common support then, in particular, registers a different degree of freedom of the movement. By way of example, all degrees of freedom of the movement can be registered with two such supports which each carry three sensors for registering three linearly independent degrees of freedom and which are arranged at different axial positions. The direction of a magnetic field prevalent at the location of the support can also be measured by the plurality of sensors on a support. Optical sensors register e.g. one of a plurality of markings formed on the test element when the marking moves past from the view of the sensor. In a different type of optical sensor, e.g. a laser triangulation and/or a comparison with a comparison light beam which is not influenced by the test element is performed, like in the case of an interferometer. Patterns projected onto the test element are registered in a further type of optical sensor.

In particular, the test element is configured in accordance with the measurement principle of the sensor. By way of example, the test element can have a permanent magnetic material in order to be able to measure in accordance with the Hall effect or the magnetoresistive measurement principle. Alternatively or additionally, the test element (e.g. a cylinder or a spherical test element) can have an electrically conductive surface for a capacitive or inductive sensor and/or a mirroring surface for reflecting measurement radiation for an optical sensor. A mirroring or partly reflecting surface can be formed e.g. on a cylinder-shaped, cone-shaped or torus-shaped test element. In any case, the sensor generates a measurement signal which contains information about the position of the test element. If the test element has a reflector which reflects incident measurement radiation as a function of the alignment of the reflector, it is possible to determine the rotational position.

A calibration of the sensor arrangement formed by the test element and the sensor may be necessary in order to be able to establish the position of the test element when the arrangement is in operation. Therefore, it is preferable to calibrate the arrangement for measuring coordinates of a workpiece in respect of determining the position of the test element, i.e. measurement signals of the sensor are to be assigned the corresponding values of the position or relative position. Here, for example, comparison measurements are performed and/or use is made of calibration standards that are known exactly in respect of the dimensions and form thereof and in respect of position relative to the arrangement.

A plurality of sensors together can use at least one test element for signal generation purposes. However, it is also possible that a separate test element is assigned to each one of a plurality of sensors. Furthermore, it is possible that a sensor component has more than one sensor.

A rotational device has a rotational movability of a first part and a second part about at least one rotational axis, wherein the first part and the second part have rotational movability relative to one another due to the rotational movability of the rotational device and wherein the first or the second part is configured to hold either the workpiece or a coordinate measuring apparatus, e.g. the sensing unit or sensing head, in order to enable a rotation of the workpiece or the coordinate measuring apparatus. The invention therefore also relates to rotational devices which have rotational movabilities about two rotational axes (e.g. a so-called rotary pivot joint with two rotational axes extending at an angle to one another) or about more than two rotational axes.

In one embodiment, the first or the second part of the rotational device is embodied to hold a workpiece. In the present arrangement, a test body according to the invention is arranged on, and/or fastened to, the first or the second part instead of a workpiece for the purposes of qualifying the axis. The other part is, in particular, configured to be fastened to a base of a coordinate measuring machine (CMM) and/or to be positioned on a base such that this part is immovable relative to the base and the test body, with the other part, can be rotated relative to the base. By way of example, the first and second parts can be parts of a rotary table, on or at which the test body is arranged or fastened in order to be able to be brought in various rotational positions and in order to perform an establishment of the rotational errors in the various rotational positions.

In accordance with a further embodiment of the arrangement, the first or the second part of the rotational device is configured to hold a coordinate measuring apparatus. In this case, the first and the second part enable a rotation of the coordinate measuring apparatus by means of a relative movement. By way of example, so-called rotary pivot joints, which enable a rotational movability in respect of two rotational axes extending at an angle and, in particular, orthogonal to one another, are known. However, rotational devices which merely enable a rotational movability in respect of a single rotational axis or rotations about more than two rotational axes are also known.

In one variant, and arrangement is provided, wherein
the first and/or the second test element of the test body is a reflector,
one or more angle sensors, preferably optical angle sensors, are assigned to the reflector or reflectors,
wherein the optical angle sensor or sensors is/are configured to register a rotation of the test body about a rotational axis of the rotational device and/or a rotation of the test body about one or more axes at an angle to the rotational axis and/or an unchanging position of the test body. The angle sensor registers a rotation of the reflector which co-rotates with the test body because it is rigidly connected to the test body. Therefore, it is also possible to establish the rotation of the test body by measuring the rotation of the reflector.

Examples for sensors or of devices which can be used as angle sensors for the purposes of this invention are optical angle sensors, such as autocollimators, laser rangefinders, laser interferometers, capacitive sensors, including capacitive distance sensors for the purposes of an angle measurement, magnetoresistive sensors, such as magnetoresistive angle sensors or magnetoresistive distance sensors which are used for the purposes of the angle measurement.

In a further variant, one or more distance sensors are assigned to one or more reflectors of a test body. By way of example, distance sensors can be capacitive sensors, eddy current sensors, magnetic field sensors, optical distance sensors, such as lasers, interferometers, or mechanical inductive sensing units, wherein optical distance sensors are preferred in the case of a reflector.

By way of example, an autocollimator and/or an optical sensor, in particular a laser interferometer or laser rangefinder, can be assigned to a reflector. One or more distance sensors can be assigned to a rotationally symmetric test element. A plurality of sensors, or some of the plurality of sensors, are preferably configured or arranged in such a way that these can be used to measure distances in different spatial directions and/or angles about different rotational axes such that deviations can be measured in respect of a plurality of translational and rotational degrees of freedom of movement. Which deviations can be established with which test body, in particular when using reflectors, and with which arrangement of sensors is explained, in particular, in exemplary embodiments of the description of the figures. An optical angle sensor directed to a reflector, in particular an autocollimator, can for example register a rotation of the reflector about axes which are at an angle to the spatial connection axis between sensor and reflector. By way of example, if a measurement beam of an autocollimator is incident on the mirror in the X-direction, then it is possible to register a rotation of the mirror about the Y-axis and the Z-axis and it is possible to determine the rotational angle. By way of example, if a measurement beam of an autocollimator is incident on the mirror in the Y-direction, then it is possible to register a rotation of the mirror about the X-axis and the Z-axis and it is possible to determine the rotational angle.

In a further variant, an arrangement is made available, wherein
the first test element of the test body is a measurement body, as already described, which is arranged at a distance from the rotational axis and/or in a manner not coaxial with the rotational axis,
one or more sensors, in particular an optical sensor or a tactile measuring head system of a coordinate measuring machine, are assigned to the measurement body,
wherein the sensor or sensors, in particular the measuring system, is/are configured to register a rotation of the test body about a rotational axis of the rotational device and/or a rotation of the test body about one or more axes at an angle to the rotational axis and/or an unchanging position of the test body.

The measuring system of a coordinate measuring machine, e.g. an optical measuring system or a tactile sensing measuring system, can be part of the arrangement if the rotational device and the test body are set up in a coordinate measuring machine, i.e. if the arrangement is established in a coordinate measuring machine. Within this meaning, the measuring system of the coordinate measuring machine, in particular an optical sensor or a tactile measuring head system, is considered to be an assigned sensor within the meaning of this arrangement. Naturally, an optical sensor or a tactile measuring head system is only assigned to the measuring head for the purposes of establishing rotational errors and only for as long as the arrangement is established in the coordinate measuring machine.

In a preferred arrangement, the test body is arranged or fastened by way of the holder on the rotational device, for example by way of an above-described bearing, in particular a three-point bearing. For arranging or fastening purposes, use can be made of a holding element which is arranged between the test body and the rotational device and which will still be described below and in the exemplary embodiments.

In a further aspect, the invention relates to a method for establishing rotational errors, also referred to as movement errors, of a rotational device for a coordinate measuring machine in respect of a plurality of degrees of freedom of movement, in which a real rotational movement of the rotational device differs from an ideal rotational movement, the method comprising the following steps:

a) rotating a test body, as described above, which is arranged at, or fastened to, the rotational device, about a rotational axis, b) Establishing rotational errors by means of a plurality of sensors, which are respectively assigned to one of the test elements of the test body and configured to measure deviations in respect of at least one of the degrees of freedom of movement.

The method can be performed using an above-described arrangement. As described above, the test body has a holder which is rotatable about a rotational axis and configured to fasten the test body in respect of a rotational axis about which the test body is to be rotated for establishing the rotational errors. In the method, the rotational axis is the rotational axis of the rotational device or the rotational axis about which parts of the rotational device are rotatable in relation to one another.

The information obtained by the method can be taken into account when using the rotational device, in particular in the subsequent measurement operation. One option for taking this into consideration lies in the computational correction of the movement, in particular by means of a mathematical model.

In the method, a test body which has an axial extent in the direction of the rotational axis of the rotational device is used in a preferred embodiment. In particular, use is made of a test body which has, as a test element, a double sphere, a cylinder or an elongate prism which can have any cross section (quadratic, rectangular, hexagonal etc.). One or more sensors, preferably at least two sensors, which measure the relative position of the sensor and the test element in different, preferably mutually orthogonal spatial directions, are assigned to each test element, wherein the directions can be e.g. aligned orthogonally to the rotational axis.

By way of example, the measurement of various axial positions renders it possible to measure wobble errors due to a deviation of the alignment of rotatable and/or rotationally symmetric parts of the rotational device. A wobble error is a rotational movement error and can be described as a rotation about one or more spatial axes that are orthogonal to the rotational axis of a rotational device. By way of example, if the rotational axis of a rotor of a rotational device lies in the Z-direction, a wobble error can be described by an additional, unwanted rotation of the rotor about the X-axis and/or Y-axis, wherein this rotation about the X-axis and/or Y-axis occurs during the rotation of the rotor about the Z-axis and the rotor can rotate a number of times and in different rotational directions about the X-axis and/or Y-axis during the rotation. In the case of additional deviations from the ideal rotational movement, additional movements can be superposed on the wobble movement. Naturally, further errors can occur in addition to a wobble error such that the axis of symmetry can, in practice, also perform different movements. By way of example, a radial run-out can be added to the wobble error such that an elliptic or circular movement that is not concentric with the rotational axis is superposed on the wobble error. A radial run-out can also be the result of a wobble movement.

Preferably, at least one sensor/test element pair (in this case, e.g. the same measurement body can interact with a different sensor) is additionally provided, which pair is configured to measure changes in the axial position between test element and sensor. If two such additional sensor element/test element pairs are arranged at different axial positions, it is consequently possible to register the corresponding two degrees of freedom of movement and e.g. the wobble error or other errors can be determined from the totality of available information. Here, there is no need for a separate measurement body to be available for each one of the pairs. Rather, the same measurement body can be used by e.g. two sensors, a plurality of sensors or all sensors.

In one embodiment of the method, the test body has a reflector as first and/or second test element and one or more sensors, preferably angle sensors, most preferably optical angle sensors, are assigned to the reflector or reflectors, comprising one or more of the following steps:

registering a rotation of the test body about a rotational axis of the rotational device by means of the sensor/sensors and/or registering a rotation of the test body about one or more axes at an angle to the rotational axis by means of the sensor/sensors.

In respect of this method embodiment, reference is made to the arrangement in which the first and/or the second test element of the test body is a reflector and one or more sensors, in particular optical angle sensors, are assigned to the reflector or reflectors, and to the explanations made there. As already specified above, an optical angle sensor, in particular an autocollimator, directed to a reflector can register e.g. a rotation of the reflector about axes which are at an angle to the spatial connection axis between sensor and reflector. By way of example, if a measurement beam of an autocollimator is incident on the mirror in the X-direction, then it is possible to register a rotation of the mirror about the Y-axis and Z-axis and the rotational angle can be determined. It is possible to measure a rotation of the about the Y-axis and the Z-axis by means of an autocollimator and a retroreflector in the form of a prism and additionally to measure a rotation about the X-axis (roll angle), i.e. the rotation about the optical axis. To this end, use can be made of a measuring system as described in DE102011012611 (A1).

By way of example, if a measurement beam of an autocollimator is incident on the mirror in the Y-direction, then it is possible to register a rotation of the mirror about the X-axis and the Z-axis and the rotational angle can be determined. In an analogous manner it is also possible to measure the rotation about the Y-axis (roll angle) using a specific measuring system made of an autocollimator and a retroreflector in the form of a prism, as is described in DE102011012611 (A1).

In one variant of the embodiment described above, one or more—preferably optical—distance sensors are assigned to the reflector or reflectors, and the method comprises: establishing one or more translation errors by measuring the distance between the reflector/the reflectors and the associated sensor/sensors.

By way of example, if a reflector points in the X-direction, it is possible to measure a translation of the test body in the X-direction using an optical distance sensor by way of example, the measurement beam of which is directed in the X-direction onto the reflector. The corresponding principle applies to other spatial directions in a Cartesian coordinate system.

In a further aspect, the invention relates to a specific method for establishing the rotational position error of a rotational device. In this method, use can be made of the test body described above. A rotational position measuring system of the rotational device can be calibrated using the method. Moreover, the established rotational position error can be converted into a correction model by a computational model of the rotational device.

In the method for establishing the rotational position error, a rotational device, which has two parts rotatable relative to one another, is coupled to a reference rotational device, which likewise has two parts rotational relative to one another, wherein one of the parts of the rotational device is coupled to one of the parts of the reference rotational device in a conjointly rotating manner and the other part of the rotational device is rotatable relative to the other part of the reference rotational device, and an above-described test body is attached to the rotational device or to the reference rotational device, and the method comprises the following steps:

establishing a first rotational position of the test body using the sensor/sensors, in particular angle sensors, rotating the two parts of the reference rotational device relative to one another and rotating the two parts of the rotational device relative to one another in such a way that the test body is rotated into a second rotational position which corresponds, or substantially corresponds, to the first rotational position, establishing a second rotational position of the test body using the sensor/sensors, in particular angle sensors.

The rotating of the two parts of the reference rotational device relative to one another and rotating of the two parts of the rotational device relative to one another is preferably implemented in opposite directions such that a rotation of the two parts of the reference rotational device is compensated for by a counter rotation of the two parts of the rotational device. This method will be described in more detail under the heading II in this description.

The correction values determined using the test body according to the invention and the method described above can also be used for the pre-correction of an online-corrected rotary table. An example of an online-corrected rotary table is described in the patent application PCT/EP2011/061681. Reproducible errors may be generated in the online-corrected rotary tables as a result of systematic errors of a measuring scale element (e.g. double sphere integrated into the rotary table) described in PCT/EP2011/061681 and assigned sensors (e.g. distance sensors, which measure distances to the spheres). By means of the measurement using a test body and a method in accordance with the present invention, these systematic errors can be established and optionally corrected at the later stage. When the method of the present invention is performed, the online correction from PCT/EP2011/061681 can be activated or deactivated.

If the online correction from PCT/EP2011/061681 is kept active during the measurement in accordance with the present method, the error of the online correction system is obtained directly. If the online correction is deactivated during the measurement in accordance with the present method, correction values from the online correction and correction values from the present method are obtained and can be compared to one another. The comparison provides the error of the online correction system, i.e. a deviation between a correction value of the online correction system and a corresponding correction value which was established according to the present method corresponds to the error of the online correction system.

Furthermore, the scope of the invention includes a computer program which executes and/or controls the steps of the method according to the invention, even the method described in II. In particular, the computer program has program code means which may be stored on a computer-readable data medium.

Moreover, the scope of the invention includes a data medium, on which a data structure is stored which, after being loaded into a core and/or main memory of a computer or computer network, executes and/or controls the steps of the method according to the invention.

II. Method for Establishing One or More Errors of a Rotational Position Establishment System In a further aspect, the invention relates to a method for establishing one or more errors of a rotational position establishment system, in which the above-described test body can be used. As described above, the test body has a test element, for example in the form of a reflector or a measurement body, which test element is also mentioned in embodiments of the subsequent method. The method constitutes an improved method for establishing rotational position errors.

What is specified is a method for establishing one or more errors of a rotational position establishment system, which measures rotational positions of parts of a rotational device, in particular for a coordinate measuring machine, and/or for establishing a hysteresis effect in such a rotational position establishment system, wherein a first part and a second part of the rotational device are rotatable relative to one another about a rotational axis of the rotational device, and the method comprises the following steps:

a) establishing a first rotational position of the rotational device with two parts rotatable relative to one another, wherein a first rotational position of the first part is established relative to the second part of the rotational device, b) establishing a first rotational position of a reference rotational device with two parts rotatable relative to one another, wherein one of the two parts is a third part, which, in relation to the rotational axis, is coupled in a conjointly rotating manner to the second part of the rotational device, and the other part of the two parts is a fourth part, which is rotatable relative to the third part about a rotational axis of the reference rotational device, wherein a first rotational position of the third part is established relative to the fourth part, c) as an optional step: establishing a first resultant rotational position of the first part and of the fourth part relative to one another in relation to the rotational axis and/or the rotational axis of the reference rotational device, wherein the first resultant rotational position results from the first rotational position of the rotational device and the first rotational position of the reference rotational device, d) varying the rotational position of the rotational device to a second rotational position of the rotational device, establishing the second rotational position of the rotational device using the rotational position establishment system, varying the rotational position of the reference rotational device to a second rotational position of the reference rotational device, establishing the second rotational position of the reference rotational device, establishing a resultant rotational position of the first part and of the fourth part relative to one another, which resultant rotational position has been changed as a result of varying the rotational positions, establishing the rotational position error of the rotational position establishment system from the changed resultant rotational position of the first part and of the fourth part relative to one another and optionally from i) the rotational positions of the rotational device or the change in the rotational position of the rotational device, and ii) from the rotational positions of the reference rotational device or the change in the rotational position of the reference rotational device, and/or, alternatively or additionally to step d), e) varying the rotational position of the rotational device to a second rotational position of the rotational device and varying the rotational position of the reference rotational device to a second rotational position of the reference rotational device such that the resultant rotational position of the first part and of the fourth part has not been changed, establishing the second rotational position of the rotational device with the rotational position establishment system, establishing the second rotational position of the reference rotational device, and establishing the rotational position error of the rotational position establishment system from the rotational positions of the rotational device or the change in the rotational position of the rotational device, and from the rotational positions of the reference rotational device or the change in the rotational position of the reference rotational device.

According to a basic concept, an error of the rotational position establishment system of a rotational device is established by means of a reference rotational device.

According to further basic concept of the method, a rotation of parts of the rotational device can be counteracted by rotation of parts of the reference rotational device such that the rotational position of the first part and of the fourth part is not changed, or only changed a little, even from an external observer position. This principle enables a simplified setup for measuring the error of a rotational position establishment system. By way of example, the external observer position can be assumed by a rotational position establishment apparatus, which is yet to be described below and which can interact with a test element that may be affixed to the first or the fourth part, or by a test element. As a result of the fact that the rotational position of the first part and of the fourth part is not changed, or only changed a little, from an observer position, the rotational position establishment apparatus or the test element can remain stationary and it is possible, for example, to use rotational position establishment apparatuses which measure very accurately in a small angle range.

According to the concept of this invention, the designations "first part", "second part", "third part" and "fourth part" do not set a spatial sequence of these parts or a relative arrangement of these parts. The numbering serves for conceptually distinguishing between the parts. Furthermore, the function of the parts in a rotational device or reference rotational device is not set by the numbering. By way of example, the first part can be a rotor, in particular a rotary plate, of a rotational device and the second part can be a stator, in particular a lower part of a rotary table, or vice versa. Likewise, the third part, as part of the reference rotary table, can be a rotor, in particular a rotary plate, and the fourth part can be a stator, or vice versa.

Denoting method steps by letters does not set a sequence in time, but serves for simpler naming and citing of method steps. If possible, method steps can be performed simultaneously or in any sequence.

When varying a rotational position, it is possible to predetermine a value of a next, e.g. second, rotational position. Varying can be implemented manually using an electrically or otherwise operated actuation apparatus. An actuation apparatus can have an electronic control system, e.g. a computer-assisted control system, into which an intended value of the next rotational position can be entered.

The term "establishing" describes, in general, a recognition process, specifically recognizing the rotational position in which part of a rotational device or reference rotational device is relative to another part of the rotational device/reference rotational device, or how large an error is. By way of example, establishing can be a visual readout, for example of a rotational position, and/or a machine readout. A readout can be implemented, for example, on the basis of a scale and a pointer, for example a scale with angle values. A readout can also be implemented at a display. Furthermore, the establishing process can be automated, without requiring monitoring, or separate acknowledgment, by a human. The establishing process can be a measurement process or it can comprise one or a plurality of measurement processes, for example by an establishment system or a measuring system. The establishing process can comprise one or more calculations, for example if an error is intended to be established with the aid of previously established variables. Calculations can be implemented using a computational device.

The first rotational position of the rotational device can be established without a rotational position establishment system, for example in the form of a zero setting, wherein a mechanical aid, e.g. a stop, may be provided for a zero setting. The first rotational position of the rotational device is preferably established using a rotational position establishment system of the rotational device. When establishing the first rotational position for the rotational device, the first rotational position can be set as zero position of the rotational position establishment system and can be used in the further procedure as zero position or reference position. If the reference rotational device also has a rotational position establishment system, it is likewise possible to set this first rotational position as zero position of this reference rotational position establishment system when establishing the first rotational position of the reference rotational device and use this as zero position or reference position in the further procedure.

The first rotational position of the rotational device can be set or the rotational device can already be in a rotational position which is used as first rotational position of the rotational device in the method. It is likewise possible to set the first rotational position of the reference rotational device or the reference rotational device can already be in a rotational position which is used as first rotational position of the reference rotational device in the method.

A rotational position of the reference rotational device can be measured, for example using a rotational position establishment system of the reference rotational device, or it may already be known with great accuracy. Mechanical systems for accurate relative setting of mutually rotatable parts of a rotational device are known, for example a Hirth joint.

To the extent that a rotational position measuring system is used in a reference rotational device, it can already be calibrated.

A rotational position or the change in rotational position can be an angle (value) in the specific case. However, it can be specified differently, for example as counters, markers or other self-selected dimensional or dimensionless variables. An example is given by dash-shaped or other markings, which are distributed over a circular circumference, wherein the rotational position/change in rotational position can be specified in this case by a number of markings such as e.g. dashes. Optionally, a conversion to an angle value can be made from the number of markings if the positions of the markings in relation to one another are known, in particular if distances between the markings are known.

The method can serve different purposes. Firstly, it can be used to establish errors of a rotational position establishment system. Secondly, it is possible to establish hysteresis effects in a rotational position establishment system. What this means is that the errors of the rotational position establishment system can be dependent on the rotational direction. Such hysteresis effects can be determined by applying various rotational directions of the during the relative rotation of parts of the rotational device to be tested. Using the method, it is also possible to perform error establishments a number of times, even when taking account of hysteresis effects, and to test a reproducibility of the error establishment. Moreover a statistical evaluation of the error data can be undertaken when establishing the error a number of times, for example in order to establish an error distribution. It is also possible, even in combination with the above-described method purposes, to determine rotational position errors at different rotational positions (or at support points yet to be described below) once or a number of times, optionally in a rotational direction dependent manner.

In the method, two parts of the reference rotational device are rotated relative to one another from a first rotational position. This is referred to as "varying the rotational position of the reference rotational device" or "setting the rotational position of the reference rotational device". The changed rotational position or the change in the rotational position of these two parts can be measured accurately, for example by means of a very accurate, optionally calibrated rotational position measuring system that is integrated into the reference rotational device. By way of example, an angle, about which the two parts of the reference rotational device are rotated relative to one another, is known accurately in this manner. The reference rotational device is preferably a calibrated or a self-calibrating rotational device, in particular a self-calibrating rotary table. A self-calibrating rotational device is disclosed in the document "Calibration of angle encoders using transfer functions" by Geckeler, R.; Fricke, A.; Elster C. in Measurement Science and Technology volume 17 (2006). The changed rotational position or the change in the rotational position for the reference rotational device can otherwise also be known accurately or be adjustable without using a rotational position measuring system, for example due to a very accurate mechanical actuation device such as e.g. a Hirth joint.

By way of example, the term "accurate" means that the rotational position measuring system of the reference rotational device has a smaller error than the rotational position measuring system of the rotational device, the error of which is intended to be established, or that an actuation device has a smaller error then the rotational position measuring system of the rotational device. Preferably, the error of the rotational position measuring system or actuation system in a reference rotational device is less than or equal to ½ the error of the rotational position measuring system of the rotational device, more preferably less than or equal to ⅕, most preferably less than or equal to ⅒.

A rotational device has a rotational movability of a first part and a second part about at least one rotational axis, wherein the first part and the second part are rotatably movable relative to one another due to the rotational movability of the rotational device and wherein the first or the second part is configured to hold e.g. either a workpiece or a tactile measuring head, e.g. with a sensing unit, or a general sensor in order to enable a rotation of the workpiece or of the measuring head or sensor. Rotational devices which have rotational movabilities about two rotational axes (e.g. a so-called rotary pivot joint with two rotational axes which extend perpendicular to one another) or about more than two rotational axes are also utilizable.

In one embodiment, the first or the second part of the rotational device is configured to hold a workpiece. The other part is configured, in particular, to be fastened to a base of a CMM and/or to be positioned on a base such that this part is immovable relative to the base while the other part can be rotated relative to the base.

In accordance with a further embodiment of the arrangement, the first or the second part of the rotational device is configured to hold a tactile measuring head, e.g. with a sensing unit or, in general, a sensor. In this case, the first and the second part enable a rotation of the measuring head or of the sensor by way of a relative movement. By way of example, so called rotary pivot joints, which enable a rotational mobility in relation to two rotational axes, which extend transversely and, in particular, perpendicular to one another, are known. However, the rotational devices which merely enable a rotational movability in respect to a single rotational axis or which enable rotations about more than two rotational axes are also known.

Examples for rotational devices where an error is intended to be established in the rotational position establishment system thereof are rotary joints, rotational devices with a plurality of rotational axes, rotary pivot joints, which have a plurality of rotational axes, rotary tables and rotary pivot tables. The invention relates, in particular, to rotational devices which are utilizable in coordinate measuring machines (abbreviated as CMM below), machine tools, robots and other applications, in which high accuracy is important. The rotational device is also referred to as test object.

The rotational device and the reference rotational device can have self-driven rotational axes, can be manually or semi-automatically implementable rotary joints, e.g. rotary joints implementable in reproducible three-point bearings. The (reference) rotational device can also be a partial apparatus, i.e. a component of a superordinate device such as a machine tool.

In the method, two parts of the rotational device, at which the rotational position error is intended to be determined by the rotational position establishment system thereof, are rotated relative to one another out of the first rotational position. This is referred to as "varying the rotational position of the rotational device". The changed rotational position or the change in rotational position of these two parts relative to one another is not known accurately as a result of the rotational position error of the rotational position establishment system which is still unknown and to be determined by the method.

One of the parts of the rotational device is coupled in a conjointly rotating manner to one of the parts of the reference rotational device (e.g. second and third part as specified above).

The remaining parts (first and fourth part as specified above) of the rotational device and of the reference rotational device can likewise be conjointly rotating in relation to one another or be rotatable relative to one another.

Step c) of the method specified above is an optional step which is not required if the first and the fourth part are not rotatable relative to one another. In this case, establishing a first resultant rotational position of the first part and of the fourth part relative to one another can be dispensed with, since these parts are not rotatable in relation to one another in any case and consequently the position of both parts in relation to one another is known from the outset. However, no harm is done by once again determining the rotational position. The first and the fourth part can be coupled to one another in a conjointly rotating manner, for example by mechanical coupling means such as supports, connectors etc. If the first and the fourth part are conjointly rotating in relation to one another, the first and the fourth part are rotated together and by the same amount about parts two and three, which are likewise coupled to one another in a conjointly rotating manner. Varying the rotational position of the rotational device and varying the rotational position of the reference rotational device in this variant result in the first and the fourth parts keeping an unchanged rotational position relative to one another, as specified in the alternative in step e).

If the first part and the fourth part are rotatable relative to one another, varying the rotational position of the rotational device and varying the rotational position of the reference rotational device have as a consequence that either the first and the fourth part assume a resultant rotational position relative to one another which has changed in comparison to what was previously, as specified in the alternative in step d), or that they assume an unchanged rotational position relative to one another, as specified in the alternative in step e). Both alternatives will be described in more detail below.

Method in Accordance with Step d)

The resultant rotational position, changed relative to one another, of the first part and of the fourth part is established. During the establishment, the initial position (prior to varying the rotational positions) and the changed rotational position (after varying the rotational positions) can be established or measured, from which the change can be established, or there can be a direct establishment of the change. The establishment of the change means that a change value (e.g. change in angle) is established directly as a difference between two values (e.g. discrete angle values).

A changed resultant rotational position of the first part and of the fourth part relative to one another is established very accurately, for example by means of a further measuring system, preferably by means of a rotational position establishment apparatus, in particular an angle establishment apparatus, as will still be described below.

As a further variable, the changed rotational position or the change in the rotational position of the two parts of the reference rotational device (third and fourth parts) relative to one another is known accurately or measured accurately, for example by means of an accurate rotational position measuring system present in the reference rotational device, in particular by means of a rotational angle measuring system.

The following settings or variables are known:
i. the changed rotational position of the rotational device, i.e. changed rotational position of the first and the second part relative to one another, displayed by the rotational position establishment system, the error of which is intended to be determined, for example an angle (change) value,
ii. the changed rotational position of the reference rotational device, i.e. changed rotational position of the third and fourth parts relative to one another, which is known accurately or established accurately, for example an angle (change) value,
iii. the changed rotational position of the first and the fourth part relative to one another, which is known accurately, for example an angle (change) value.

Using iii) and optionally also using i) and ii), it is possible to establish the error of the rotational position establishment system, as explained on the basis of an exemplary embodiment. The settings/variables i) and ii) are not required in all cases. By way of example, if the changed rotational position of the rotational device corresponds to a displayed, error-afflicted (angle) value and if the changed rotational position of the reference rotational device corresponds to a negated (angle) value in respect thereof—expressed differently: if the two (angle) values have an equal magnitude but opposite sign, with the (angle) value of the rotational device being error afflicted—then the error can be determined merely from iii), as specified in the exemplary embodiments. If the aforementioned (angle) values, i.e. the value for i) and the value for ii), are unequal in terms of magnitude and/or do not have an opposite sign, then i) and ii) are also used for establishing the error.

Values which are
I. displayed by the error-afflicted rotational position establishment system of the rotational device or
II. displayed by the rotational position establishment system of the reference rotational device or set at the reference rotational device
are also referred to as "nominal values" in this invention.

In I. (rotational device), the nominal value deviates from the real value by the magnitude of the error to be established. In principle, this is also the case in II. (reference rotational device). However, the reference rotational device is more accurate, with reference being made to the definition of accuracy provided above. In this invention, the nominal value of the reference rotational device is preferably assumed to be a real value and establishments are made on the basis thereof.

Method in Accordance with Step e):

What is determined in the alternative of step e) is that the resultant rotational position of the first part and of the fourth part is unchanged. An unchanged resultant rotational position of the first part and of the fourth part relative to one another is established accurately, for example by means of a further measuring system, preferably by means of a rotational position establishment apparatus, preferably a rotational angle establishment apparatus, as will still be explained below.

The following settings or variables are known:
i. the changed rotational position of the reference rotational device, i.e. changed rotational position of the third and fourth parts relative to one another, which is known accurately, for example an angle (change) value,
ii. the changed rotational position of the rotational device, i.e. changed rotational position of the first and second parts relative to one another, displayed by the rotational position establishment system, the error of which is intended to be determined,
and it is furthermore known that the unchanged rotational position of the first and fourth parts relative to one another is unchanged.

Using i) and ii), it is possible to establish the error of the rotational position establishment system, as explained on the basis of an exemplary embodiment.

In the method, steps d) can be performed a number of times or steps e) can be performed a number of times. A number of variations of the rotational position of the rotational device and/or of the rotational position of the reference rotational device are preferably undertaken, i.e. a plurality of changed rotational positions of the rotational device and/or reference rotational device are set. By way of example, the rotational position of the rotational device/reference rotational device can be varied from the second rotational position to a third rotational position, from the third rotational position to a fourth one, etc. In the plurality of variations, the rotational directions can vary in the rotational device and/or the reference rotational device.

It is likewise possible to perform steps d) and e) respectively once or a number of times. A number of variations of the rotational position of the rotational device and/or of the rotational position of the reference rotational device are preferably undertaken, i.e. a number of changed rotational positions of the rotational device and/or reference rotational device are set.

For performing steps d) and/or e) a number of times, a plurality of rotational positions can be set for the reference rotational device and/or the rotational device, which are also referred to as "support points" for registering rotational position errors.

Such support points can be distributed irregularly or regularly on one or more relative rotations of the parts of the reference rotational device and/or rotational device. An integer divisor of 360° is preferably selected as a distance between the support points (increment). The number of support points can be increased arbitrarily, or the increment can be reduced arbitrarily, as a result of which short-periodic errors in particular can be registered and aliasing effects, which are generated by an increment that is too large, can be reduced or avoided.

Both the positioning of the rotational axes and data evaluation is possible in a very quick and accurate manner using the method. Therefore, the method has, in particular, the following advantages:

A very fast rotational position error registration is possible, even in the case of a large number of support points. This enables the following:

A practicable registration of short-periodic errors of the rotational position establishment system. By way of example, if use is made of a self-calibrating reference rotational device, it is possible to obtain constant monitoring regarding the accuracy of the reference rotational device, and hence regarding the accuracy of the error establishment.

Calibration costs are saved when using a self-calibrating reference rotational device.

Registration of rotational position errors is possible in a multiplicity of rotational devices, e.g. also in the case of latching rotary pivot joints or rotational devices which, as a result of the design thereof, only have limited space for sensor systems.

The registration of the rotational position errors can be implemented in the finished overall system. That is to say, possible bracing of the scale as a result of assembly thereof is also taken into account; if forces act on the scale (e.g. tensions generated by adhesive bonding), the latter deforms. By way of example, the scale is a graduated disk, in which deformations cause a change in the division spacing.

If required, accurate registration of the rotational position errors in portions of the rotational position establishment system is possible.

Coupling between rotational device and reference rotational device can be implemented in various ways:

Both devices can be positioned directly joining one another. The coupling can be implemented, in particular, by a force fit or in an interlocking manner. By way of example, coupling can be implemented by frictional forces, for example if the reference rotational device and the rotational device are positioned on one another and the weight of one of the devices weighs on the other device.

A bearing can be provided between the reference rotational device and the rotational device, for example a three-point bearing.

One or more holding elements or adapters can be arranged between the rotational device and the reference rotational device. A specific holding element will still be described in this description and in the exemplary embodiments.

The coupling between rotational device and reference rotational device is preferably such that the rotational axis of the rotational device (axis about which the parts of the rotational device rotate relative to one another) and the rotational axis of the reference rotational device (axis about which the parts of the reference rotational device rotate relative to one another) are coaxial or axially flush or substantially coaxial or substantially axially flush in relation to one another.

In one embodiment of the method, the rotational position of the first part and of the fourth part relative to one another, i.e. the unchanged rotational position of the two parts relative to one another or the change in the rotational position of the two parts relative to one another, is determined with the aid of a rotational position establishment apparatus. In accordance with step d) of the method above, a changed resultant rotational position of the first part and of the fourth part relative to one another can be determined by means of the rotational position establishment apparatus. Alternatively or additionally, in accordance with step e) of the method above, the rotational position establishment apparatus can be used to determine that the rotational positions of the first part and of the fourth part relative to one another are unchanged. In these embodiments (d) & e)), the rotational position establishment apparatus serves as a highly accurate additional measuring system. By way of example, establishing the error of the rotational angle measuring system to be calibrated is implemented in this case by comparing a rotational angle measuring system of the reference rotational device with the (error-afflicted) rotational angle measuring system of the rotational device, wherein the rotational position establishment apparatus serves as further measuring system. A calculation principle is specified in the examples.

An example of a rotational position establishment apparatus is an angle measuring apparatus. A specific example of a rotational position establishment apparatus in an autocollimator or an arrangement of a plurality of autocollimators. In a different variant, one or more distance sensors, such as e.g. laser rangefinders, laser interferometers, capacitive distance sensors, magnetoresistive distance sensors, magnetoresistive angle sensors, can be used as a rotational position establishment apparatus. These rotational position establishment apparatuses can be combined with one another and/or it is possible to use a plurality of apparatuses of the same type. Instead of measuring angles, or in addition to measuring angles, rangefinders or distance sensors can also be used for establishing translational movement errors. Specific arrangements of rotational position establishment apparatuses are described in the exemplary embodiments.

It is also possible to use a coordinate measuring machine as a rotational position establishment apparatus.

When using a rotational position establishment apparatus, the rotational position of the first part and of the fourth part relative to one another is preferably established with the aid of a test element, wherein the rotational position or change in rotational position of the test element relative to the rotational position establishment apparatus or relative to another reference point is established by means of the rotational position establishment apparatus.

In particular, the positioning of the rotational position establishment apparatus and test element can be as follows:
the rotational position establishment apparatus is positioned in relation to the first part or the fourth part, for example coupled to the first part or to the fourth part, in such a way that it is conjointly rotating in relation to the first part or the fourth part,
the test element is positioned in relation to the first part or the fourth part, for example coupled to the first part or to the fourth part, in such a way that it is conjointly rotating in relation to the first part or the fourth part,
wherein the rotational position establishment apparatus is conjointly rotating in relation to the first part if the test element is conjointly rotating in relation to the fourth part, and the rotational position establishment apparatus is conjointly rotating in relation to the fourth part if the test element is conjointly rotating in relation to the first part.

In the above context, the phrase "conjointly rotating" means, in particular, conjoint rotation in respect of a rotation about the rotational axis of the rotational device or the rotational axis of the reference rotational device. Conjoint rotation in relation to the first/fourth part means that the rotational position establishment apparatus or the test element co-rotates with the first/fourth part about the same rotational angle, or any other scale unit, when the first/fourth part is rotated.

A conjointly rotating arrangement relative to the first or fourth part can be designed in many various ways. By way of example, a coupling of the rotational position establishment apparatus or of the test element to the first of fourth part can be implemented. A coupling can contain arbitrarily many intermediate elements.

In one variant, the rotational position establishment apparatus and/or the test element is/are attached to the rotational device or to the reference rotational device. If the first of fourth part is e.g. a rotor of a (reference) rotary table, then the rotational position establishment apparatus or the test element can be attached directly or indirectly to the rotor, e.g. a rotary plate, and co-rotate with the rotor. The respective other part, i.e. the fourth part if the first part is the aforementioned rotor, can then be positioned in a non-rotatable manner on a substrate or on a stationary support and either the rotational position establishment apparatus or the test element can likewise be positioned on the substrate or on the support such that it is conjointly rotating in relation to the first part. In this case, the substrate can be considered to be a coupling element. In another variant, both parts (first and fourth parts) can be rotatable in relation to a substrate. Various variants are presented in the exemplary embodiments.

The rotational position of the first part and of the fourth part relative to one another can be determined with the aid of the relative rotational position of the rotational position establishment apparatus and of the test element, which can be changed or unchanged after varying the rotational positions of the rotational device and reference rotational device. It is possible to determine either the change in the rotational position of the first part and of the fourth part relative to one another or it is possible to determine the unchanged rotational position of the two parts relative to one another.

An unchanged position of the first part and of the fourth part relative to one another can be produced in such a way that the rotational position of the test element or of the rotational position establishment apparatus is set in such a way in accordance with the above-described variant e) that an unchanged relative position of the test element is determined with the rotational position establishment apparatus.

This is also referred to as tuning to an unchanged position or as tuning to the zero deviation. The terms "unchanged position" and "zero deviation" should be considered in the context of the measurement accuracy/error margin of the rotational position establishment apparatus and in the context of the manual or machine adjustment accuracy of the rotatable parts of the rotational device and reference rotational device, i.e. an unchanged position or a zero deviation can only be achieved within the scope of the measuring accuracy and adjustment accuracy. For the method, an autocollimator is particularly suitable as a rotational position establishment apparatus and a mirror is particularly suitable as a test element.

In one variant, the test element is a reflector, wherein the direction of radiation which is reflected by the reflector is dependent on the relative rotational position between the first part and the fourth part. The reflector is likewise rotated during a change in the rotational position of the first part in relation to the fourth part. A reflector can be used, in particular, if the rotational position establishment apparatus is an autocollimator or a laser distance sensor. An exemplary reflector is a mirror, in particular a plane mirror, or a retroreflector. A measurement beam is transmitted to the reflector, the former being reflected by the reflector.

In a further variant, the test element is a measurement body which is arranged at a distance from the rotational axis and/or in a manner not coaxial with the rotational axis such that the rotational angle of the measurement body about the axis is determinable by the measuring device on the basis of a changed rotational position of the measurement body. The phrase "at a distance from the rotational axis" means that the rotational axis does not intersect the measurement body. In this description, the phrase "(not) coaxial" is synonymous with "(not) concentric". Not coaxial means that a rotational symmetry axis or another symmetry axis of the measurement body, for example of a sphere, is not coaxial (or expressed differently: not flush) with the rotational axis.

A measurement body as a first test element, which is arranged at a distance from the rotational axis and/or in a manner not coaxial with the rotational axis, may be any body at which a uniquely defined coordinate system can be determined. Examples include a sphere, a triple sphere, a cylinder, a triple sphere, a cone, a prism or any other geometric body. In particular, the measurement body has one or more reference points, also referred to as "points in space", which are determinable by a measuring system of the CMM, such that the rotational position is determinable by determining the position of the reference point or points in various rotational positions of the measurement body. In principle, any measurement body, at or in which a reference point or a point in space is uniquely determinable using the measuring system of a CMM, can be used.

By way of example, the reference point can be determined by probing using a sensing system of a CMM. If the test element is a sphere, then e.g. the sphere center can be used as reference point, the position of which can be determined by multiple probing of the sphere surface. By way of example, the rotational device is a rotary table and a sphere which is positioned laterally from the rotary table axis is used as a test element. In a first angle position, the position of the sphere and of the sphere center can be registered using the measuring system of the CMM, e.g. by way of sensing. After rotating the rotary table plate into a second position, the changed sphere position and the sphere center can be registered anew and the rotational angle of the rotary table plate can be established from the measured values. At the different sphere positions, the sphere center is preferably determined by multiple probing.

Possibly present form defects of the measurement body can be calibrated in a separate step and the error can be taken into account when the measurement body is used. This can be dispensed with if the same or substantially the same surface points are always measured on the measurement body, for example using the sensing system of a CMM.

When varying the rotational position of the rotational device and the rotational position of the reference rotational device, the first part can be rotated in a first direction against the second part in the rotational device and the third part can be rotated in the same direction against the fourth part in the reference rotational device. In the case of the same observation position or field of view, it is possible, for example, for the first part to be rotated clockwise (positive rotational direction) against the second part in the rotational device and the third part can likewise be rotated clockwise against the fourth part in the reference rotational device. Analogously, the rotation can respectively be implemented in a counterclockwise manner (negative rotational direction). In the case of a rotation, the terms "co-rotating" or "same direction" and "counter rotating" or "opposite direction" generally assume the same observation position or field of view, i.e. the same observation position of an external, stationary observer, wherein the observation position of the external, stationary observer is also referred to as "inert system".

By way of example, this variant can be applied if two or more reflectors, in particular plane or substantially plane mirrors, are used as test elements. Two or more reflectors are also referred to as reflector arrangement.

By way of example, two reflectors or reflector layers can be present in the reflector arrangement, which reflectors are at an angle of >180° to 360° in relation to one another. The angle between two reflectors or reflector layers is measured from the reflecting surface of one reflector or one reflector layer to the reflecting surface of another reflector or another reflector layer. In the case of an angle of 360°, the reflectors/reflector layers point in opposite spatial directions.

By way of example, more than two reflectors or reflector layers be present in a reflector arrangement, which reflectors or reflector layers are at an angle in relation to one another and point in various spatial directions, wherein adjacent reflectors or reflector layers are preferably at an angle of >180° to <360° in relation to one another, wherein the angle is defined as in the case above. In a specific preferred variant, neighboring reflectors or reflector layers can be at an angle of $$\alpha=360°-[(N-2)/N]*180°$$

in relation to one another, where N is an integer greater than or equal to 3. By way of example, the reflectors can be applied to the side faces of a prism, the base area of which forms a regular N-gon. A rotation is then preferably implemented in such a way that the first part is rotated against the second part by ½*360°/N in a first direction and, in the reference rotational device, the third part is rotated against the fourth part by ½*360°/N in the same direction.

In another embodiment, the first part is rotated in a first direction against the second part in the rotational device and the third part is rotated in the opposite direction thereto against the fourth part in the reference rotational device when varying the rotational position of the rotational device and the rotational position of the reference rotational device. Here, the same observation position is assumed, i.e. the same observation position of an external, stationary observer, wherein the observation position of the external, stationary observer is also referred to as "inert system". In the case of the same observation position, it is possible, for example, for the first part to be rotated clockwise against the second part in the rotational device and the third part to be rotated counterclockwise against the fourth part in the reference rotational device. In one variant of this embodiment, parts of the rotational device are rotated relative to one another by the same magnitude, e.g. angle magnitude or counter magnitude, as parts of the reference rotational device are rotated relative to one another. The magnitude of the rotation at the rotational device is set on the basis of the rotational position establishment system of the rotational device or displayed thereby and it is a nominal magnitude. In a further variant of this embodiment, parts of the rotational device are rotated relative to one another and parts of the reference rotational device are rotated relative to one another in such a way that the rotational position of the first part and of the fourth part is unchanged relative to one another in comparison with the state prior to the rotations. As already mentioned above, the term "unchanged" means a non-change within the scope of the measurement accuracy and setting accuracy, for example within the scope of the measurement accuracy of an autocollimator as rotational position establishment apparatus. An "unchanged position" within the scope of the measurement accuracy and setting accuracy can also be referred to as "substantially unchanged position".

In a preferred method variant, at least one variation of the rotational position of the rotational device is undertaken in the positive rotational direction and at least one variation of the rotational position of the rotational device is undertaken in the negative rotational direction. This method variant is advantageous for identifying hysteresis effects. The type of bearing of mutually rotatable parts, e.g. an air bearing or a roller bearing, is frequently the largest influencing factor for a hysteresis. Furthermore, the rotational position establishment system of the rotational device and the rotational position establishment system of the reference rotational device can cause a hysteresis.

If the rotation of the parts is undertaken in such a way that, after varying the rotational positions, the position of the first part to the fourth part relative to one another is unchanged, then the variation of the rotational position of the rotational device is compensated for by the variation of the rotational position of the reference rotational device. That is to say that a variation in the rotational position of the first part in relation to the fourth part, which is caused by a variation of the rotational position of the rotational device, is compensated for, expressed differently: lifted again, by a variation of the rotational position of the reference rotational device. Or, that a variation in the rotational position of the first part in relation to the fourth part, which is caused by a variation of the rotational position of the reference rotational device, is compensated for, expressed differently: lifted again, by a variation of the rotational position of the rotational device. Here, and in the method in general, it is irrelevant whether the rotational position of the rotational device is varied first, followed by the rotational position of the reference rotational device, or vice versa, or whether both variations are implemented simultaneously.

In one embodiment, the method comprises the following steps: performing the method with steps a)-d) and/or e), as described above, and furthermore:

f) restoring the first rotational position of the rotational device, corresponding to the first rotational position in step a), or substantially to such a rotational position, or restoring the first rotational position of the reference rotational device, corresponding to the first rotational position in step b), or substantially to such a rotational position, g) producing a modified first rotational position of the reference rotational device when the rotational device was brought into the first rotational position from step a), or producing a modified first rotational position of the rotational device when the reference rotational device was brought into the first rotational position from step b), such that, in the modified first rotational position of the rotational device/reference rotational device, there is a modified rotational position of the first part and of the fourth part relative to one another, wherein the fourth part is twisted relative to the first part by an angle value, preferably by 360°/M, compared to the first resultant rotational position of the first part and of the fourth part relative to one another in step c), wherein M is an integer, preferably greater than or equal to 2, more preferably 2 to 8, h) performing the method steps d) and/or e), optionally also step c), as described above, proceeding from the first or substantially the first rotational position of the rotational device and the modified first rotational position of the reference rotational device, or proceeding from the first or substantially the first rotational position of the reference rotational device and the modified first rotational position of the rotational device.

The above method is also referred to as "flipping-over method" in this invention, not only for the special case M=2. In the case of such repetition of method steps d) and/or e) within the scope of the above embodiment with steps f)-h), residual errors of the rotational position establishment can be compensated for, which residual errors can be caused, for example, by the type of method setup, the arrangement of utilized components or systematic residual errors of a rotational position establishment apparatus of the reference rotational device.

Steps d) and/or e) can be performed a number of times in step h) of the method variant above and various rotational positions can be produced. Step c) can be performed optionally in order to verify the desired resultant rotational position of the first part and of the fourth part relative to one another, i.e. to verify whether the fourth part is twisted relative to the first part by an angle value of 360°/M in the modified rotational position, as specified in step g). Step c) preferably also serves for establishing a start position of the method. If a mirror is used as test element and an autocollimator is used as rotational position establishment apparatus, it is advantageous to perform step c) in order to determine an offset of a test element, which will still be explained below.

After performing the above-described steps, it is still possible to set one or more further, modified first rotational positions of the rotational device and/or of the reference rotational device and to perform method steps d) and/or e), and optionally also step c), again proceeding therefrom.

Preferably, the method with steps f)-h) is performed (M−1) times, wherein there is a twist about an angle value of 360°/M in step g) each time it is performed. By way of example, if M=3, it is possible, initially, to perform the method described at the outset with steps a)-e) and then perform the sequence of steps f)-h) (M−1) times, i.e. twice. When the sequence of steps f)-h) is performed the first time, a first modified resultant rotational position of the fourth part relative to the first part is produced in the process, in which the fourth part is twisted relative to the first part by an angle value of 360°/3 (M=3) compared to the first resultant rotational position of the first part and of the fourth part relative to one another in step c). When the sequence of steps f)-h) is performed the second time, a second modified resultant rotational position of the fourth part relative to the first part is produced in the process, in which the fourth part is twisted relative to the first part by an angle value of 360°/3 compared to the first modified resultant rotational position from the first performance of the sequence of steps f)-h). In the case of another twist by 360°/3, the fourth part relative to the first part would once again reach the resultant rotational position from step c), which is why this step and a renewed performance of the method are unnecessary as the method was already performed from this resultant rotational position. Analogously to the example above, the sequence of steps f)-h) can respectively be performed (M−1) times for M=4, 5 or 6 and the resultant (modified) rotational positions of the first and of the fourth parts with respect to one another are respectively changed by 360°/4, 360°/5 or 360°/6.

In a further aspect, the invention relates to an arrangement for establishing errors of a rotational position establishment system which measures rotational positions of parts of a rotational device for a coordinate measuring machine, particularly for performing the aforementioned method, wherein the arrangement comprises:

the rotational device, which has a first part and a second part, which are rotatable relative to one another about a rotational axis of the rotational device, the rotational position establishment system, a reference rotational device comprising two parts rotatable relative to one another, wherein one of the two parts is a third part, which, in relation to the rotational axis, is coupled in a conjointly rotating manner to the second part of the rotational device, and the other part of the two parts is a fourth part, which is rotatable relative to the third part about a rotational axis of the reference rotational device, wherein the rotational axis of the reference rotational device is preferably coaxial or substantially coaxial with the rotational axis of the rotational device, a rotational position establishment apparatus for establishing a resultant rotational position of the first part and of the fourth part relative to one another in relation to the rotational axis, an error establishment apparatus for establishing the error of the rotational position establishment system, wherein the establishment apparatus is configured to establish the rotational position error of the rotational position establishment system from the changed resultant rotational position of the first part and of the fourth part relative to one another, and optionally from i) the rotational positions of the rotational device or the change in the rotational position of the rotational device, and ii) from the rotational positions of the reference rotational device or the change in the rotational position of the reference rotational device, and/or, alternatively or additionally, from the rotational positions of the rotational device or the change in the rotational position of the rotational device, and from the rotational positions of the reference rotational device or the change in the rotational position of the reference rotational device.

In respect of the arrangement and the components of the arrangement, reference is made to the above disclosure of the method, wherein embodiments of the arrangement for performing the method are already disclosed.

Examples of a rotational position establishment apparatus were already mentioned above. It is also possible to use a coordinate measuring machine as a rotational position establishment apparatus. In a further variant, one or more distance sensors can be used as rotational position establishment apparatus.

In the aforementioned arrangement a test element is preferably attached to the rotational device and/or to the reference rotational device, the rotational position or change in rotational position of which test element is registered using the rotational position establishment apparatus. The test element is preferably attached to the first part or to the fourth part. In one variant, the test element is a reflector which reflects radiation incident thereon dependent on the relative rotational position of the first part in relation to the fourth part. A reflector can be used, in particular, if the rotational position establishment apparatus is an autocollimator or a laser distance sensor. An exemplary reflector is a mirror or a retroreflector.

In a further variant, the test element is an already described measurement body, which is arranged at a distance from the rotational axis and/or in a manner not coaxial with the rotational axis such that the rotational angle of the measurement body about the axis is determinable by the measuring device on the basis of a changed rotational position of the measurement body.

Under II, the following subject combinations are also disclosed, wherein the specified reference signs establish a reference to the figures in merely an exemplary manner for explanation purposes.

1. A method for establishing one or more errors of a rotational position establishment system, which measures rotational positions of parts of a rotational device (201), in particular for a coordinate measuring machine, and/or for establishing a hysteresis effect in such a rotational position establishment system, wherein a first part (206) and a second part (205) of the rotational device (201) are rotatable relative to one another about a rotational axis (D) of the rotational device (201), and the method comprises the following steps:
   a) establishing a first rotational position of the rotational device (201) with two parts (206, 205) rotatable relative to one another, wherein a first rotational position of the first part (206) is established relative to the second part (205) of the rotational device,
   b) establishing a first rotational position of a reference rotational device (60) with two parts (61, 62) rotatable relative to one another, wherein one of the two parts is a third part (61), which, in relation to the rotational axis, is coupled in a conjointly rotating manner to the second part (205) of the rotational device (201), and the other part of the two parts is a fourth part (62), which is rotatable relative to the third part (61) about a rotational axis of the reference rotational device (R), wherein a first rotational position of the third part (61) is established relative to the fourth part (62),
   c) as an optional step: establishing a first resultant rotational position of the first part (206) and of the fourth part (62) relative to one another in relation to the rotational axis (D) and/or the rotational axis of the reference rotational device (R), wherein the first resultant rotational position results from the first rotational position of the rotational device (201) and the first rotational position of the reference rotational device (60),
   d) varying the rotational position of the rotational device (201) to a second rotational position of the rotational device, establishing the second rotational position of the rotational device using the rotational position establishment system,
   varying the rotational position of the reference rotational device (60) to a second rotational position of the reference rotational device, establishing the second rotational position of the reference rotational device (60),
   establishing a resultant rotational position of the first part (206) and of the fourth part (62) relative to one another, which resultant rotational position has been changed as a result of varying the rotational positions,
   establishing the rotational position error of the rotational position establishment system from the changed resultant rotational position of the first part (206) and of the fourth part (62) relative to one another and optionally from
   i) the rotational positions of the rotational device (201) or the change in the rotational position of the rotational device (201), and
   ii) from the rotational positions of the reference rotational device (60) or the change in the rotational position of the reference rotational device (60),
   and/or, alternatively or additionally to step d),
   e) varying the rotational position of the rotational device (201) to a second rotational position of the rotational device and varying the rotational position of the reference rotational device (60) to a second rotational position of the reference rotational device (60) such that the resultant rotational position of the first part (206) and of the fourth part (62) has not been changed,
   establishing the second rotational position of the rotational device (201), establishing the second rotational position of the reference rotational device (60), and
   establishing the rotational position error of the rotational position establishment system from the rotational positions of the rotational device (201) or the change in the rotational position of the rotational device, and from the rotational positions of the reference rotational device (60) or the change in the rotational position of the reference rotational device.

2. The method as claimed in point 1, in which the rotational positions of the first part (206) and of the fourth part (62) relative to one another, i.e. the unchanged rotational position of the first part (206) relative to the fourth part (62) or the change in the rotational position of the first part (206) relative to the fourth part (62), are established with the aid of a rotational position establishment apparatus (88).

3. The method as claimed in point 2, in which the rotational position establishment apparatus (88) is an autocollimator, a tactile measuring head system of a coordinate measuring machine, an optical sensor of a coordinate measuring machine, a laser interferometer, a distance sensor or a multiplicity or any combination of such apparatuses.

4. The method as claimed in point 2 or 3, in which the rotational position of the first part (206) and of the fourth part (62) relative to one another is established with the aid of a test element (5), wherein the rotational position or change in rotational position of the test element relative to the rotational position establishment apparatus (88) is established by means of the rotational position establishment apparatus (88).

5. The method as claimed in point 4, wherein
the rotational position establishment apparatus (88) is positioned in a conjointly rotating manner in relation to the first part (206) or the fourth part (62),
the test element (5) is positioned in a conjointly rotating manner in relation to the first part (206) or the fourth part (62),
wherein the rotational position establishment apparatus (88) is conjointly rotating in relation to the first part (206) if the test element (5) is conjointly rotating in relation to the fourth part (62), and the rotational position establishment apparatus (88) is conjointly rotating in relation to the fourth part (62) if the test element is conjointly rotating in relation to the first part (206).

6. The method as claimed in point 4 or 5, in which
the rotational position establishment apparatus (88) and/or
the test element (5)
is/are attached to the rotational device (201) or to the reference rotational device (60).

7. The method as claimed in one of points 4-6, wherein the test element is a reflector (5) which reflects radiation incident thereon, wherein the direction of the reflected radiation is dependent on the relative rotational position between the first part (206) and the fourth part (62).

8. The method as claimed in one of points 4-6, wherein the test element is a measurement body (1000) which is arranged at a distance from the rotational axis (D) and/or in a manner not coaxial with the rotational axis (D) such that the rotational angle of the measurement body about the axis (D) is determinable by the measuring device on the basis of a changed rotational position of the measurement body.

9. The method as claimed in one of the preceding points, wherein the first part (206) is rotated against the second part (205) in one direction and the third part (61) is rotated against the fourth part (62) in the direction opposite thereto when varying the rotational positions of the rotational device (201) and the reference rotational device (60).

10. The method as claimed in one of the preceding points, in which the reference rotational device (60) is a calibrated or self-calibrating rotary table or a rotary table that is mechanically adjustable to an accurate rotational position.

11. The method as claimed in one of the preceding points, in which the rotational device (201) is a rotary table (201), a rotary joint or a rotary pivot joint (2).

12. The method as claimed in one of the preceding points, in which the rotational axis (R) of the reference rotational device (60) is coaxial or substantially coaxial with the rotational axis (D) of the rotational device (201).

13. The method as claimed in one of the preceding points, furthermore comprising the following steps:
f) restoring the first rotational position of the rotational device (201), corresponding to the first rotational position in step a) of point 1, or substantially to such a rotational position, or restoring the first rotational position of the reference rotational device (60), corresponding to the first rotational position in step b) of point 1, or substantially to such a rotational position,
g) producing a modified first rotational position of the reference rotational device (60) when the rotational device (201) was brought into the first rotational position from step a), or producing a modified first rotational position of the rotational device (201) when the reference rotational device (60) was brought into the first rotational position from step b),
such that, in the modified first rotational position of the rotational device/reference rotational device, there is a modified rotational position of the first part (206) and of the fourth part (62) relative to one another, wherein the fourth part (62) is twisted relative to the first part (206) by an angle value compared to the first resultant rotational position of the first part and of the fourth part relative to one another in step c),
h) performing the method steps d) and/or e), optionally also step c), as described above, proceeding from the first or substantially the first rotational position of the rotational device (201) and the modified first rotational position of the reference rotational device (60), or proceeding from the first or substantially the first rotational position of the reference rotational device (60) and the modified first rotational position of the rotational device (201).

14. An arrangement for establishing one or more errors of a rotational position establishment system, which measures rotational positions of parts of a rotational device (201) for a coordinate measuring machine, in particular for performing the method as claimed in one of the preceding points, wherein the arrangement comprises:
the rotational device (201) which has a first part (206) and a second part (205) which are rotatable relative to one another about a rotational axis (D) of the rotational device (201),
the rotational position establishment system,
a reference rotational device (60) comprising two parts (61, 62) rotatable relative to one another, wherein one of the two parts is a third part (61), which, in relation to the rotational axis, is coupled in a conjointly rotating manner to the second part of the rotational device, and the other part of the two parts is a fourth part (62), which is rotatable relative to the third part (61) about a rotational axis of the reference rotational device (R),
a rotational position establishment apparatus (88) for establishing a resultant rotational position of the first part (206) and of the fourth part (62) relative to one another in relation to the rotational axis (D),
an error establishment apparatus (1001) for establishing the error of the rotational position establishment system, wherein the error establishment apparatus is configured to establish the rotational position error of the rotational position establishment system
from the changed resultant rotational position of the first part (206) and of the fourth part (62) relative to one another, and optionally from
i) the rotational positions of the rotational device (201) or the change in the rotational position of the rotational device (201), and
ii) from the rotational positions of the reference rotational device (60) or the change in the rotational position of the reference rotational device (60), and/or, alternatively or additionally,
from the rotational positions of the rotational device (201) or the change in the rotational position of the rotational device, and from the rotational positions of the reference rotational device (60) or the change in the rotational position of the reference rotational device.

III. Holding Element

A holding element disclosed below can be used in the method relating to II or it can also be used in a common arrangement with the test body described above. The holding element enables an alignment of a rotational device for establishing movement errors.

What is specified is a holding element for holding a rotational device, which has a part rotatable in relation to a rotational axis, or which has a plurality of parts rotatable about rotational axes, or for holding a sensor arrangement, which has a plurality of sensors, wherein the sensors are configured to measure deviations in respect of at least one of the degrees of freedom of movement of the rotational device, wherein the holding element comprises:
- a first holder for holding the rotational device or sensor arrangement,
- a support, to which the first holder is fastened, wherein the support has at least a first coupling region and a second coupling region, by means of which the holding element is coupleable to a base, and wherein the first coupling region is configured to couple the holding element in a first position and/or orientation to the base such that the sensor arrangement or rotational device held by the holding element is arranged in a first position and/or orientation when coupling the first coupling region to the base, and wherein the second coupling region is configured to couple the holding element in a second position and/or orientation to the base such that the sensor arrangement or rotational device held by the holding element is arranged in a second position and/or orientation when coupling the second coupling region to the base.

The position and/or orientation of the holding element, or else other positions and orientations specified in this description, are preferably reproducible. Instead of the term "orientation", the synonymous term "alignment" can be and is used as well.

In the case of a rotational device with a plurality of parts rotatable about rotational axes, the rotational axes are preferably not coaxial to one another.

According to a basic concept, the holding element is an intermediate element, by means of which the rotational device or sensor arrangement can be arranged in a preferably reproducible location on a base. Instead of arranging and aligning the rotational device directly on the base, the holding element, to which the rotational device or the sensor arrangement is fastened, is arranged on the base. As a result of the embodiment thereof, the holding element enables a plurality of—preferably reproducible—locations on the base, depending on how it is oriented relative to the base, in particular depending on the side with which it is placed onto the base or coupled to the base. When reorienting the holding element, the rotational device or the sensor arrangement is likewise reoriented—preferably in a reproducible manner—since there is a secure connection between the holding element and the rotational device or the sensor arrangement.

As a result of the embodiment of the coupling regions of the holding element it is possible to couple the holding element with a preferably reproducible orientation and preferably also in a reproducible position on the base. Accordingly, the rotational device or the or sensor arrangement can also be oriented with a reproducible orientation and preferably also in a reproducible position relative to the holder and hence also relative to the base.

In particular, the following advantages arise as a result of the holding element:
- The equipping times are minimized. It is possible to switch quickly between the measurement/qualification of two different axes without needing to disassemble the rotational device.
- It is possible to use a plurality of holding elements for testing a plurality of rotational devices. By way of example, one of the rotational devices can be measured in one holding element, while another rotational device is prepared in a further holding element.
- The coupling regions ensure an unchanging spatial orientation of the rotational device.
- The coupling regions ensure an unchanging position and/or orientation of the rotational device.
- The rotational device can be tested in the subsequent installed position which is used when measurements are taken with the rotational device.
- The holding element can be used for determining the compliance of a rotary pivot joint in different installed positions, also in combination with adapted test bodies.
- Using the holding element, in particular using an angular support which is yet to be described below, it is possible to qualify a one-stage rotational device, e.g. a rotary table, in different installation positions, such as horizontal and vertical.
- A sensor arrangement can be oriented in such a way that a rotational device, to which a test body has been attached (e.g. a test body which has a double sphere standard), can be qualified in the installed position thereof. In this variant, the rotational device is installed e.g. in a coordinate measuring machine for a subsequent measurement and a test body is attached to one of the axes. The sensor arrangement can be oriented toward the test body in a fitting manner by way of the holding element.

Specifically, the first orientation, in which the rotational device is arranged, corresponds to a predetermined orientation of a first rotational axis of the rotational device and the second orientation, in which the rotational device is arranged, corresponds to a predetermined orientation of a second rotational axis of the rotational device such that, when the first coupling region is coupled to the base and when the second coupling region is coupled to the base, respectively one rotational axis of the rotational device is aligned in the predetermined orientation thereof. In principle, a predetermined orientation can be any orientation which is required or desired for performing a measurement with or on the rotational axis. The predetermined orientation of the first rotational axis of the rotational device and the predetermined orientation of the second rotational axis of the rotational device can be the same relative to an external reference. Elsewhere in this description, a method is presented where a rotational axis of a rotational device is brought into a specific orientation relative to the rotational axis of a reference rotational device such that the relevant axis of the rotational device and the axis of the reference rotational device are coaxial or substantially coaxial with one another. Using the method, it is possible to determine movement errors of the rotational device, in particular rotational position errors. If the base is part of a further rotational device, in particular of a rotary table, as is still described below, then the first orientation therefore can be such that the first rotational axis is concentric or coaxial, i.e. flush, with the rotational axis of the rotary table. Accordingly, the second orientation can be such that the second rotational axis is concentric or coaxial, i.e. flush, with the rotational axis of the rotary table after a corresponding reorientation or realignment of the holding element and the rotational device connected therewith.

In a further, alternative or complementary variant, the predetermined orientation of a rotational axis of the rotational device is a rotation in relation to an externally fixed sensor arrangement. By way of example a test body can be attached to a part of the rotational device rotatable about a first rotational axis, which test body e.g. has a double sphere standard. The test body, which is attached to the holding element together with the rotational device, is oriented toward the sensor arrangement in an ideal manner with the aid of the holding element and movement errors of the first rotational axis can be established. If movement errors of the second rotational axis are intended to be established, the test body can be attached to a part of the rotational device rotatable about the second rotational axis, and the test body and the rotational device can be reoriented with the aid of the holding element until, once again, an ideal orientation of the test body in relation to the sensor arrangement is established.

By way of example, the rotational device is a rotary table, a rotary joint with a rotational axis or a rotary pivot joint with two or more rotational axes.

By way of example, the sensor arrangement has sensors which are oriented in different spatial directions. Furthermore, the sensor arrangement can have a sensor holder. Preferred sensors are distance sensors, which are also specified elsewhere in this description and which measure the distance to a test element described elsewhere in this description, wherein the test element can be part of a test body which is likewise described elsewhere and which can be attached to a rotational device with a rotational axis to be qualified.

In particular, the invention relates to rotational devices which are usable in coordinate measuring machines (abbreviated to CMM below), machine tools, robots and other applications in which a high accuracy is decisive. The parts of the rotational device rotatable in relation to one another are also rotatable relative to one another after the rotational device is fastened to the holding element. By way of example, one of the parts is fastened to the holding element, or held by the holding element, while other parts are movable relative to this part.

The base can be any substrate on which the rotational device is intended to be positioned for qualifying a rotational axis.

The surface of the base, on which the holding element is placed and coupled, is also referred to as "clamping face".

In particular, the base is a rotatable part of a further rotational device, in particular of a rotary table or of a further rotary (pivot) joint.

Specifically, the base is the rotary plate of a rotary table. In a further specific variant, the rotary table is a so-called reference rotary table, the rotational position or change in rotational position of which is known accurately. If the rotational device is positioned on a reference rotary table by means of the holding element, a specific method for establishing rotational errors, in particular the rotational position error of the rotational device, can be performed, which will still be explained below and in the exemplary embodiments.

The holding element has a support which is a central supporting part of the holding element. The support has the coupling regions already mentioned above. The support has one or more holders, to which a rotational device can be attached. By way of example, if a two-stage rotational device (rotational device with two rotational axes) is intended to be tested in different installation positions, e.g. horizontal and vertical, a second holder, which is arranged in relation to the first holder in accordance with the desired installation position, is advantageous.

The support is configured in such a way that the holding element can be positioned at or on the base in at least two—preferably reproducible—orientations.

In a specific embodiment, the support has a first limb and a second limb, which are at an angle to one another, wherein a holder is fastened to one of the limbs, preferably at the inner side of the limb, and wherein the first limb has the first coupling region, preferably at the outer side thereof, and the second limb has the second coupling region, preferably at the outer side thereof. Such an angle support is advantageous for two-stage and multi-stage rotary pivot joints. The angle between the limbs is preferably equal, or substantially equal, to the angle between two rotational axes of a rotational device to be qualified; by way of example, the angle is 90° in the case of a rotary pivot joint with rotational axes that are at a 90° angle in relation to one another. The angle support is preferably made of solid material with a relatively high density, in particular metal, preferably steel. A solid and high-mass embodiment is advantageous for reducing deformations of the support, for example by possible probing forces during the qualification. However, to the extent that deformations of the support occur, correction by calculation is also possible if weights and torques, or probing forces and lever lengths are known. Furthermore, a solid and high-mass embodiment of the support is advantageous for stable positioning and storage on a base.

In principle, the support can also have further coupling regions in addition to a first and a second coupling region. In one embodiment, the support has a third coupling region, by means of which the holding element is coupleable to the base, wherein the third coupling region is configured to couple the holding element in a third position and/or orientation to the base such that the sensor arrangement or rotational device held by the holding element is arranged in a third position and/or orientation when coupling the third coupling region to the base. This principle can be continued for further coupling regions (fourth, fifth, etc.).

A third coupling region is advantageous if a rotary pivot joint with three rotational axes is intended to be qualified. In one embodiment, the support has a third limb in addition to the above-described limbs, which third limb is at an angle to the first limb and/or the second limb and has a third coupling region, preferably at the outer side thereof, by means of which the holding element is coupleable to the base. By way of example, the angle of the third limb to the other two limbs images the angle at which a third rotational axis of a rotational device is in relation to the other two rotational axes.

In one variant, an above-described angle support has a third limb orthogonal to the two other limbs, wherein the three limbs can be connected to form a semi-cube. Each one of the limbs, or each one of the sides of a semi-cube, has a coupling region at the outer side. Such a support design is advantageous in the case of three-axis rotary pivot joints.

In a further variant, the support has an angled shape and the first, the second and the third limb are arranged in a C-shaped manner, wherein the limbs are e.g. at right angles to one another.

In one embodiment, coupling means are arranged at the coupling regions. Preferably, the first coupling region has first coupling means and the second coupling region has second coupling means. If a third coupling region is present, third coupling means are preferably arranged thereat.

The coupling means are preferably attached to the above-described support, for example at the outer sides of the support, in particular at outer sides of limbs of an above-described angle support.

The coupling means, which are also referred to as coupling elements, are preferably connectable to holding elements arranged on the base, in an interlocking manner. Here, one or more degrees of freedom of movement can be kept free, for example in order to enable a thermal expansion of the holding element, in particular of the support.

In one embodiment, one or more of the coupling regions are configured as a three-point bearing. A three-point bearing can be formed from three bearing means, e.g. spheres, bolts or pins. In particular, the first coupling means and/or second coupling means and/or third coupling means etc. are configured as a three-point bearing or are part of a three-point bearing. A three-point bearing can be embodied by spheres, which engage on the opposite side (base) in respectively one depression, or, in particular, engage in roller pairs or triple spheres, which are arranged on the base.

In an advantageous variant, the three-point bearing is configured in such a way that
- a first bearing means on the side of the support, for example a sphere, engages in a depression arranged on the side of the base, which depression does not enable a lateral degree of freedom of movement, that is to say, for example, it engages into a triple sphere,
- a second bearing means on the side of the support, for example a sphere, engages in a depression arranged on the side of the base, which depression enables a lateral degree of freedom of movement, that is to say, for example, it engages into a roller pair, and
- a third bearing means on the side of the support, for example a sphere or a screw tip, impacts on a planar or substantially planar surface on the base, for example it impacts on a hard-metal disk attached to the base.

What is ensured in this embodiment is that a possibly present thermal expansion of the support always occurs in two defined directions.

Preferably, a tensile force is generated between the holding element and the base, which is also referred to as "pretensioning". Such a tensile force can prevent the holding element from jumping out of a bearing. Depending on the orientation of the holding element and a rotational device fastened thereto, jumping out of the bearing can be brought about, for example, by the weight thereof or by a movement of the holding element if the base is e.g. a rotary plate of a reference rotary table, as described in the exemplary embodiments, or of parts of the rotational device.

The pretensioning increases the reproducibility of the orientation of the holding element and a rotational device attached thereto. A pretension can be implemented e.g. magnetically, preferably at a central point between a plurality of bearing points, or by the inherent weight of the holding element. An additional mass can be attached to the holding element in order to increase the mass of the holding element. For the purposes of magnetic pretension, the holding element can have a magnet which, for example, can be installed or set into the holding element. Such a magnet can exert an attractive force to a ferromagnetic substrate, for example to a ferromagnetic base. The pretension can also be advantageous if large accelerations occur when qualifying the rotational axis, for example as a result of release movements in the case of latching rotary pivot joints. Further means for pretensioning are screws, hooks, a bayonet or a spring.

Instead of a three-point bearing, the holding element can also be fixed locally to the base in a different manner, for example by means of one or more stops, hooks, screws, latching means, etc.

One or more of the coupling regions can have one or more adjustment means for adjusting the alignment of the holding element on the base. Examples of this are screw drives, such as set screws, leveling screws. An adjustment means can also simultaneously be a bearing means, for example of a three-point bearing. By way of example, one of the bearing points can be a tip of a leveling screw which lies on a counter-face on the base.

The one or more adjustment means may for example set the coaxiality between a rotational axis of the rotational device and the rotational axis of a reference rotary table if a method for determining the rotational position error of the rotational device is intended to be performed, which method is still described below and in the exemplary embodiments.

The holding element has a holder for holding the rotational device, which is fastened to the support. The holder is preferably configured in such a way that a rotational device with a connection point provided thereon is connectable to the holder in a fitting manner. A connection point of the rotational device is a mechanical and, preferably, also an electrical interface of the rotational device, by means of which the rotational device can be assembled in a coordinate measuring machine or a machine tool. By way of example, a rotary pivot joint for a coordinate measuring machine is connected to a holder on the side of the coordinate measuring machine which, for example, is provided on a sleeve. A conventional interface at a rotational device has, as mechanical elements, a three-point bearing, for example three pairs of spheres, into which respectively one roller on the side of the CMM, in particular at a sleeve, engages, and electrical contacts. The holder of the holding element according to the invention can be configured in a manner identical to a holder, at least in mechanical terms, which holder is provided for fastening the rotational device to a CMM, preferably also in a manner identical in terms of the electrical and, to the extent that these are present, also pneumatic contacts. In other words, the holding element according to the invention has an interface in the form of a holder which is identical to the interface at a CMM, at which the rotational device is attachable for the purposes of the measurement operation.

The holding element can have different holders, which are configured in the form of different interfaces. Thus, it is possible to attach different rotational devices with in each case a different (counter) interface at the holding element. In the case of an angle-shaped support, different holders or different interfaces can be attached e.g. to different limbs of the support, in particular on the inner sides of the limbs. Accordingly, as described above, a third holder, which in turn is configured as another interface, can be attached to a third limb.

In one embodiment, the holding element has one or more apparatuses for supplying energy to the rotational device or to the sensor arrangement. Examples of this are electrical connections and/or electrical lines, by means of which and as a result of which a rotational device or sensor arrangement fastened to the holding element can be supplied with energy in order to bring about a rotation of parts of the rotational device. By way of example, contacts and/or lines can be arranged in/on the support.

In a specific embodiment, the apparatus for supplying energy is arranged in a coupling region of the holding element or in a plurality of coupling regions, in particular on one or more outer sides of the support. The following description of the apparatus relates to one coupling region. An apparatus for supplying energy can be embodied analogously for other coupling regions.

In one variant, the apparatus for supplying energy has a first element of a first plug-connection, which is arranged in the coupling region and connectable to a second element of the first plug-in connection, which is arranged on the base.

The elements of the plug-in connection preferably have one or more electrical contact points.

The apparatus for supplying energy can have a first element of a second plug-in connection, which is arranged on the support on the side of the holder for the rotational device and connectable to a second element of the second plug-in connection, which is arranged on the rotational device or on the sensor arrangement. The elements of the plug-in connection preferably have one or more electrical contact points.

The apparatus for supplying energy can have one or more contacts or contact points which are respectively connectable to one or more counter contact points or counter contacts which are arranged on the base, wherein energy is supplied to the rotational device via the counter contacts which are arranged on the base. In one variant, one or more of the contact points simultaneously also form a bearing means of a three-point bearing, which was already described above. Here, a bearing means of a three-point bearing serves not only for mechanically bearing the holding element on the base but also as a contact for supplying energy to the rotational device attached to the holding element for the purposes of operating the rotational device. By way of example, a bearing means in the form of an electrically conductive sphere or an electrically conductive screw can also simultaneously serve as electrical contact point.

One or more supply lines can be arranged on or in the support of the holding element, which supply lines extend from the contact/bearing means to the holder for the rotational device. In the holder, the supply line or lines can in turn lead to one or more contact points, at which the rotational device is connected. The contact points at the holder can be part of an above-described interface for attaching the rotational device. Supply line or lines can likewise be arranged in or on the base, which conduct current from an external current source to the counter contact points on the base.

In one embodiment of the invention, the holding element has one or more identification means, which serve to identify the orientation of the holding element on the base. Instead, or additionally, the one or more identification means can also be configured to identify the type of the rotational device or the sensor arrangement. By way of example, using the identification means, it is possible to identify whether the rotational device is a rotary table or a rotary pivot joint and/or it is possible to identify the type of rotary table or rotary pivot joint. By way of example, it is possible to identify what sensors the sensor arrangement has and/or in what spatial orientations individual sensors are arranged. Examples of identification means are a barcode, a QR or matrix code, or a sensor system. By way of example, a sensor system can be embodied as reflectors or switching cams or dry reed contacts or radiofrequency identifiers (RFID), by means of which an identification of the orientation is made possible. It is possible to integrate such a sensor system into a three-point bearing. Contact points of the bearing can serve as contacts for an identification means, or an identification means can be arranged in the center of a three-point bearing.

With the aid of the identification means it is possible, for example, to automatically activate test plans that fit to the respective axis when qualifying an axis of the rotational device and/or assign the established correction values to the fitting axis. The identification means can also be configured—either solely for this purpose or as an additional feature—in such a way that it is possible to distinguish between different types of a holding element or support or identify a specific type, for example a type which has a fitting embodiment for a specific rotational device.

In one embodiment, the support of the holding element has one or more apertures for passing measuring radiation. If the holding element is rotated relative to a radiation-emitting sensor, such as an autocollimator or laser distance sensor, during a measurement, parts of the support can cover the measurement beam in specific rotational positions, which is why such a passage opening is advantageous. In particular, a support can have limbs and one or more apertures can be arranged in each case in one or more of the limbs.

In a further aspect, the invention relates to an arrangement comprising
- a holding element as described above,
- a first rotational device or a sensor arrangement, which is held by the holding element,
- a base, which is configured for coupling on the holding element in at least two different, preferably reproducible poses, wherein a pose is defined by the orientation and position of the holding element.

The arrangement can have a movement error establishment apparatus comprising at least one measuring sensor, which is configured to measure a measurement variable which enables an establishment of rotational errors of the rotational device, wherein the holding element is tuned to a rotational device to be held, in such a way that the at least one measuring sensor is able to measure the measurement variable, e.g. without the position and orientation of the measuring sensor changing, relative to the base, when the holding element with the held rotational device is in a first one of the preferably reproducible poses and able to measure the measurement variable when the holding element with the held rotational device is in a second one of the preferably reproducible poses. A rotational position establishment apparatus, which is subsequently still described on the basis of a method for establishing a rotational position error of a rotational device, is a specific movement error establishment apparatus. In the method, a rotational device is coupled to a reference rotational device. Specifically, the base is the rotary plate of a reference rotary table, the rotational position or change in rotational position of which is known accurately. If the rotational device is positioned on a reference rotational device by means of the holding element, a specific method for establishing rotational errors, in particular the rotational position error, can be carried out by the rotational device, which is described in more detail below and in the examples.

Furthermore, in addition to the aforementioned elements, the arrangement can also have a test body which is connected to the rotational device. A test body will still be described below and can be attached to the rotational device for the purposes of qualifying a rotational axis of the rotational device. A qualification method using the test body will still be described below and in the examples.

In the arrangement according to the invention, an XY-table and/or a tilt table can be attached between the holding element, in particular the support thereof, and the base, as a result of which it is possible to orient the holding element and the rotational device fastened thereto.

The arrangement can furthermore have an adjustment device for adjusting or displacing the holding element together with the rotational device. Using this, it is possible to perform a collision-free positioning of the holding element together with the rotational device on the base. By way of example, an adjustment device can linearly displace the holding element on the base if the bearing is configured in such a way that it permits linear guiding. By way of example, in the case of a V-shaped bearing, in which a V-guide is attached to the base, the holding element can be displaced in the V-shaped guide.

The holding element and the rotational device can be positioned and/or rotated from one orientation to any other orientation by hand or by a robot or by any other actuators, e.g. by pneumatic actuators.

For different installation lengths of rotational devices, for example for rotary pivot joints which are the same per se but have different lengths, the base can be provided with a plurality of alternative bearing points and/or the base can e.g. have a plurality of bearing means for bearings at different positions such that the holding element together with the rotational device can be positioned on the base at different positions.

Under III, the following subject combinations are also disclosed, wherein the specified reference signs establish a reference to the figures in merely an exemplary manner for explanation purposes.

1. A holding element (50; 510; 520) for holding a rotational device (2) which has a part rotatable in relation to a rotational axis or which has a plurality of parts (66, 67) rotatable about rotational axes (A, B), or for holding a sensor arrangement (750) which has a plurality of sensors (73, 74, 75, 76, 77), wherein the sensors are configured to measure deviations in respect of at least one degree of freedom of movement of the rotational device,
   wherein the holding element comprises:
      a first holder (68) for holding the rotational device (2) or sensor arrangement (750),
      a support (51, 52), to which the first holder (68) is fastened, wherein the support (51, 52) has at least a first coupling region (90; 901) and a second coupling region (91; 902), by means of which the holding element (50; 520) is coupleable to a base (61; 611), and
   wherein the first coupling region (90; 901) is configured to couple the holding element (50; 520) in a first position and/or orientation to the base (61; 611) such that the sensor arrangement (750) or rotational device (2) held by the holding element (50; 520) is arranged in a first position and/or orientation when coupling the first coupling region (90; 901) to the base (61; 611), and
   wherein the second coupling region (91; 902) is configured to couple the holding element (50; 520) in a second position and/or orientation to the base (61; 611) such that the sensor arrangement (750) or rotational device (2) held by the holding element (50; 520) is arranged in a second position and/or orientation when coupling the second coupling region (91; 902) to the base (61; 611).

2. The holding element as claimed in point 1, wherein the first orientation, in which the rotational device (2) is arranged, corresponds to a predetermined orientation of a first rotational axis (A) of the rotational device (2) and the second orientation, in which the rotational device (2) is arranged, corresponds to a predetermined orientation of a second rotational axis (B) of the rotational device (2), and so respectively one rotational axis of the rotational device (2) is aligned in the predetermined orientation thereof when coupling the first coupling region (90) to the base (61) and when coupling the second coupling region (91) to the base (61).

3. The holding element as claimed in point 1 or 2, wherein the first coupling region (90) has first coupling means (55, 56, 58; 692, 693, 694) and the second coupling region (91) has second coupling means (53, 54, 57; 692', 693', 694').

4. The holding element as claimed in one of the preceding points, in which the first coupling means (55, 56, 58; 692, 693, 694) and/or the second coupling means (53, 54, 57; 692', 693', 694') form a three-point bearing or are part of a three-point bearing.

5. The holding element (510) as claimed in one of the preceding points, wherein the support has a third coupling region (92), by means of which the holding element (510) is coupleable to the base (61),
   wherein the third coupling region (92) is configured to couple the holding element (50) in a third position and/or orientation to the base (61) such that the sensor arrangement (750) or rotational device (2) held by the holding element (50) is arranged in a third position and/or orientation when coupling the third coupling region (92) to the base (61).

6. The holding element (50; 510) as claimed in one of the preceding points, wherein the support (51, 52) has a first limb (51) and a second limb (52) which are at an angle to one another, wherein the first holder (68) is fastened to one of the limbs and wherein the first limb (51) has the first coupling region (90) and the second limb (52) has the second coupling region (91).

7. The holding element (510) as claimed in points 6 and 5, wherein the support (51, 52, 511) has a third limb (511) which is at an angle to the first limb (51) and/or the second limb (52), wherein the third limb (511) has the third coupling region (92).

8. The holding element (50; 510) as claimed in one of the preceding points, in which one or more of the coupling regions (90, 91; 90, 91, 92) have one or more adjustment means (57, 58; 57, 58, 514) for adjusting the location of the holding element (50; 510) on the base (61).

9. The holding element as claimed in one of the preceding points, comprising one or more apparatuses for supplying energy (69; 690, 691') to the rotational device (2) or the sensor arrangement (750).

10. The holding element as claimed in point 9, wherein the apparatus for supplying energy (690) is arranged in a coupling region (90, 91) or respectively one apparatus for supplying energy (690) is arranged in a plurality of coupling regions (90, 91).

11. The holding element as claimed in point 9 or 10, wherein the apparatus for supplying energy has a first element (690) of a first plug-connection, which is arranged in the coupling region and connectable to a second element (691) of the first plug-in connection, which is arranged on the base (61).

12. The holding element as claimed in one of points 9-11, wherein the apparatus for supplying energy has a first element (691') of a second plug-in connection, which is arranged on the support (51, 52) on the side of the first holder (68) and connectable to a second element (690') of the second plug-in connection, which is arranged on the rotational device (2) or on the sensor arrangement (750).

13. The holding element as claimed in one of the preceding points, comprising one or more identification means for identifying the orientation of the holding element (50) on the base (61) and/or for identifying the type of the rotational device (2) or of the sensor arrangement (750).

14. The holding element as claimed in one of the preceding points, which has one or more further holders for further rotational devices or sensor arrangements in addition to the first holder (68).

15. The holding element as claimed in one of the preceding points, wherein the support (51, 52, 511) has one or more apertures (515) for passing measuring radiation (S).
16. An arrangement comprising
    a holding element (50; 510) as claimed in one of the preceding points,
    a first rotational device (2) or a sensor arrangement (750), which is held by the holding element (50; 510),
    a base (61), which is configured for coupling on the holding element (50; 510) in at least two different poses, wherein a pose is defined by the orientation and position of the holding element.
17. The arrangement as claimed in point 16, wherein the base (61) is a rotatable part of a second rotational device (60).
18. The arrangement as claimed in point 16 or 17, wherein the first rotational device (2) is a rotary table, a rotary joint with one rotational axis or a rotary pivot joint with two or more rotational axes.
19. The arrangement as claimed in one of points 16-18, wherein the arrangement has a movement error establishment apparatus comprising at least one measuring sensor (88) which is configured to measure a measurement variable which enables an establishment of rotational errors of the rotational device (2),
    wherein the holding element (50) is tuned to a rotational device (2) to be held, in such a way that the at least one measuring sensor (88) is able to measure the measurement variable when the holding element (50) with the held rotational device (2) is in a first one of the poses and able to measure the measurement variable when the holding element (50) with the held rotational device (2) is in a second one of the poses.

BRIEF DESCRIPTION OF THE SEVERAL VIEWS OF THE DRAWING

The invention will be described below on the basis of examples. In detail.

DESCRIPTION OF THE INVENTION

Figure 1:
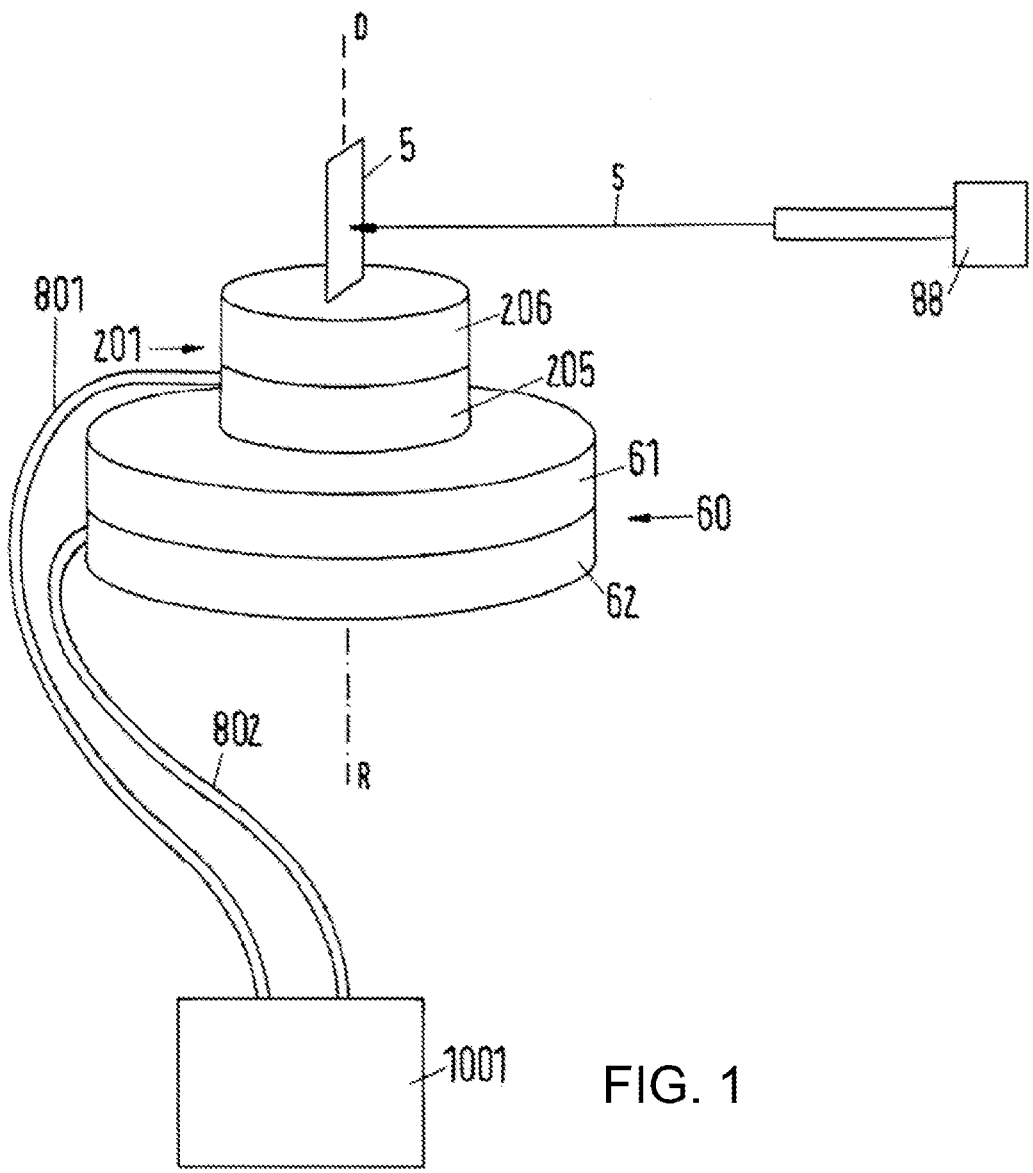
FIG. 1 shows a schematic diagram of an arrangement for carrying out a method according to the invention.

A possible setup for the course of the error registration is shown in FIG. 1: a rotational device 201 is placed onto a reference rotational device 60, in this case a rotary table which has a lower part 62 and a rotary plate 61. In this example, the rotational device 201 is likewise a rotary table, in the rotational angle measuring system of which (not depicted here) the rotational angle error is intended to be established. The rotary table 201 has a lower part 205 and a rotary plate 206. The lower part 205 of the rotary table 201 is placed onto the rotary plate 61 of the reference rotational device 60. The lower part 205 is connected in a conjointly rotating manner to the rotary plate 61 due to the friction between the plate 61 and the lower part 205 and the inherent weight of the rotary table 201. The plate 61 of the reference rotary table 60 is rotatable relative to the lower part 62 about the axis R of the reference rotational device. The plate 206 of the rotary table 201 is rotatable relative to the lower part 205 about the axis D. The axes D and R are arranged in a substantially coaxial manner.

A mirror is arranged on the plate 206 of the rotary table 201 as a test element 5, which mirror is aligned in the direction of an autocollimator (AKF) 88. The measurement beam S of the AKF 88 impinges on the surface of the mirror 5.

The order in which the reference rotational device 60, the rotational device 201 and the mirror 5, with an associated AKF 88, are in relation to one another is variable. It would also be feasible for the AKF 88 to stand on the rotational device 201 and for the mirror 5 to be fastened externally. Moreover, the reference rotational device 60 could stand on the rotational device 201, for example when calibrating a very large rotational device 201.

FIG. 1 furthermore shows an error establishment apparatus 1001, which e.g. is a computing unit, in particular a computer, which can perform a calculation according to a given program flow. In addition to error establishment, the computer 1001 can also be used to transmit control signals to the stator 205 of the rotary table 201 and to the stator 62 of the reference rotary table 60, in particular signals for controlling the movements of the rotors 61 and 206. In addition to error establishment, the measurement signals from the stator 205 of the rotary table 201 and from the stator 62 of the reference rotary table 60 can also be transmitted to the computer 1001, in particular measurement signals which provide information about the rotational position of the rotors 61 and 206. A cable 801 serves to transmit signals from the stator 205 of the rotary table 201 to the error establishment apparatus 1001 and a cable 802 serves to transmit signals from the stator 62 of the reference rotary table 60 to the error establishment apparatus 1001. Furthermore, the cables 801 and 802 also serve to transmit energy. Naturally, a plurality of cables could also be provided in each case instead of respectively one cable 801 or 802, for example one for signal transmission and one for energy transmission. What is not shown in this and in subsequent figures are signal and energy transmission apparatuses to an AKF or to sensors and further control or evaluation apparatuses. Furthermore, user interfaces at the only schematically depicted computer 1001 and a display are not depicted.

Below, possible embodiments of the method are described. The rotational position error of the rotational position establishment system of the rotary table 201 is intended to be established.

The plate 61 of the reference rotary table 60 is positioned in relation to the lower part 62 in such a way that the rotational position establishment system of the reference rotary table 60 is at the reference or zero marker thereof. Likewise, the plate 206 of the rotary table 201 is positioned in relation to the lower part 205 in such a way that the rotational position establishment system of the rotary table 201 is at the reference or zero marker thereof. Instead of the zero markers, any other rotational position can be used as first rotational position.

Now, the rotational positioning angle of the mirror 5, which is referred to as offset angle below, can be registered using the AKF 88 or, alternatively, a different angle measuring instrument. In a special case, the offset angle can also be zero, i.e. no offset would be present in this case.

For the error registration of the rotational position establishment system of the rotary table 201, support points for the error registration are initially defined. Here, these can be distributed irregularly and also regularly on one or more rotations of the plate 61 of the reference rotary table 60, wherein the variant of the integer divisors of 360° is preferred as an increment to be selected. As a result of this, errors from a badly set measuring system remain unconsidered.

Whether the plate 61 is rotated in a positive or negative direction as observed from above is not decisive for the method, i.e. both variants are of equal value. However, they can be twisted in the positive and negative rotational directions in order to determine hysteresis effects.

For a negative rotational direction of the plate 61, the rotational angle positions (intended positions) to be approached in the case of six steps for the reference axis would be e.g. 0°, −60°, −120°, −180°, −240° and −300°. However, the number can be increased almost as desired, for example if short-periodic errors of the rotational axis to be calibrated are intended to be registered or if aliasing effects are intended to be prevented.

When varying the rotational position of the plate 61 of the reference rotary table 60 and of the plate 206 of the rotary table, one of the following positioning strategies is preferably applied:

Variant 1 of the Method:

Variant 1 is a special example of variant d), which was described in the general description. For the respective support point, the settings are undertaken as follows:

The plate 61, which is also referred to as rotor, of the reference rotary table 60 is positioned at a negative predetermined intended rotational position, in this case e.g. −60°. This is the changed rotational position of the reference rotational device mentioned in the general part of the description, i.e. the changed rotational position of the third part 61 (in this case the plate) and fourth part 62 (in this case the lower part 62, also referred to as stator) relative to one another, obtained by varying the rotational position of the reference rotary table 60.

The changed rotational position of the reference rotational device is accurately known because the angle measuring system of the reference rotary table 60 is calibrated. Below, this variable will be denoted as X.

The plate 206 of the rotary table 201, also referred to as rotor of the rotary table 201, is positioned on the negated value of the intended rotational position of the reference table, in this case +60°, wherein the negative intended position is set with the aid of the error-afflicted rotational position establishment system of the rotary table 201. This is the changed rotational position of the rotational device 201 mentioned in the general part of the description, i.e. the changed rotational position of the first part (in this case the plate 206) and second part (in this case the lower part 205, also referred to as stator) relative to one another, obtained by varying the rotational position of the rotary table 201.

The changed rotational position of the rotational device is indicated by the rotational position establishment system, the error of which is intended to be determined. Below, this variable will be denoted as Y.

If the rotational position establishment system of the rotary table 201 is error afflicted, i.e. if the real rotational angle deviates from +60°, then the consequence thereof is that the relative rotational position of the first part 206 and of the fourth part 62 relative to one another has changed compared to the initial state. As described above, in the initial state, the offset angle of the mirror 5 was established using the AKF 88, wherein the offset angle can also be zero in the special case. The change in the relative rotational position of the first part 206 and of the fourth part 62 relative to one another, which is denoted as variable Z, corresponds to the following:

$$Z=\text{angle established by the } AKF \text{ after varying the rotational positions-offset angle}$$

The rotational position error F (in this case the angle position error) of the rotational position establishment system of the rotary table 201 is established using the error establishment apparatus 1001.

In this example, the rotational position error corresponds to: F=Z.

Thus, the rotational position error in the special variant 1 corresponds to the difference between the angle registered by the AKF 88 and the offset angle of the mirror mentioned above. The nominal (error-afflicted) rotary angle of the first part 206 and of the second part 205 in relation to one another (Y) and the nominal rotational angle of the third part 61 and of the fourth part 62 relative to one another (X) add to zero. The nominal rotational angle means the displayed angle, which in this case is based upon a default value.

In another variant of the method, it is also possible to select the nominal angles X and Y in such a way that they do not add to zero and to implement the rotational positions of the rotational device and the reference rotational device in such a way that the rotational position of the first part 206 and of the fourth part 62 relative to one another has changed compared to the initial state, i.e. so that the AKF measures an angle deviation Z. Then, the error F emerges from:

$$F=Z-\text{(difference between the nominal angles } X \text{ and } Y)$$

Variant 2 of the Method:

Variant 2 is a special example of variant e), which was described in the general description.

The plate 61 of the reference rotary table is positioned at a negative predetermined intended rotational position, e.g. −60°. This is the changed rotational position of the reference rotational device mentioned in the general part of the description, i.e. the changed rotational position of the third part 61 (in this case the plate) and the fourth part 62 (in this case the lower part) relative to one another, which is accurately known because the angle measuring system of the reference rotary table 60 is calibrated. Below, this variable will be denoted as X.

The plate 206 of the rotary table 201 is positioned in such a way that the angle measured by the external AKF 88 corresponds exactly to the offset angle measured prior to varying the rotational positions. This means that the rotational position of the mirror 5 relative to the AKF 88 is unchanged compared to beforehand (before varying the rotational positions). This means, furthermore, that the resultant rotational position of the first part 206 and of the fourth part 62 is unchanged or substantially unchanged. Therefore, in the ideal case, the angle value displayed by the AKF minus the previously determined offset is zero. In general, the ideal case is not achieved due to measuring errors or setting inaccuracies, which is why, in the real case, the angle value displayed by the AKF minus the previously determined offset varies slightly around zero within the scope of the measuring error or the setting inaccuracy.

The angle Y, which emerges from the above-described settings, is read off at the rotational position establishment system. The setting of the rotary table corresponds to the changed rotational position of the rotational device mentioned in the general part of the description, i.e. the changed rotational position of the first part (in this case the plate 206) and the second part (in this case the lower part 205) relative to one another, displayed by the rotational position establishment system, the error (F) of which is intended to be determined. The angle position of the plate 206 of the rotary table 201 to be calibrated corresponds to:

$$Y=+60°+\text{rotational position error of the rotational position establishment system of the rotary table 201}$$

$$Y=-X+F.$$

The rotational position error F (in this case the angle position error) of the rotational position establishment system of the rotary table 201 is established using an error establishment apparatus 1001. The rotational position error F corresponds to:

$$F=X+Y,$$

where Y corresponds to the nominal angle value displayed by the error-afflicted measuring system, i.e. the sum of the rotational angles which are displayed by the rotational position establishment system of the reference rotary table 60 and the rotational position establishment system of the rotary table 201. In contrast to variant 1, Z remains unconsidered in the calculation since the value is (approximately) zero.

Variant 3 of the Method:

Variant 3 is a special example of variant e), which was described in the general description.

The plate 206 of the rotary table 201 is positioned at a positive predetermined intended rotational position, e.g. +60°, displayed by the (error-afflicted) rotational position establishment system of the rotary table 201. This is the changed rotational position of the rotational device mentioned in the general part of the description, i.e. the changed rotational position of the first part 206 (in this case the plate) and the second part 205 (in this case the lower part) relative to one another. Below, this variable will be denoted as Y.

The plate 61 of the reference rotary table 60 is positioned in such a way that the angle measured by the external angle measuring instrument 88 corresponds exactly to the previously measured offset angle. This means that the rotational position of the mirror 5 relative to the AKF 88 is unchanged compared to beforehand (before varying the rotational positions). This means, furthermore, that the resultant rotational position of the first part 206 and of the fourth part 62 is unchanged.

The angle X which emerges from the above-described settings is read off at the calibrated angle measuring system of the reference rotary table 60. The setting of the reference rotary table corresponds to the changed rotational position of the reference rotational device 60 mentioned in the general part of the description, i.e. the changed rotational position of the third part (in this case the plate 61) and the fourth part (in this case the lower part 62) relative to one another, displayed by the calibrated angle measuring system. The angle position of the plate 61 of the reference rotary table 60 corresponds to:

$$X=-60°+\text{rotational position error of the rotational position establishment system of the rotary table 201}$$

$$=-Y+F.$$

The rotational position error F (in this case the angle position error) of the rotational position establishment system of the rotary table 201 is established using an error establishment apparatus (not shown here). The rotational position error corresponds to:

$$F = X + Y,$$

i.e. the sum of the rotational angles which are displayed by the rotational position establishment system of the reference rotary table 60 and the rotational position establishment system of the rotary table 201, like in the above-described variant 2. In contrast to variant 1, Z remains unconsidered in the calculation since the value is zero.

In all variants, further angles can be set in further method steps and other rotational directions can be selected.

Variants 1-3 listed in an exemplary manner above differ as follows:

Variant 1 offers a speed advantage over variant 2 and variant 3 since, in variants 2 and 3, the rotational position of the rotational axis to be calibrated or of the reference axis must be adjusted to an external reference. Adjustment to a rotational position of the inherent measuring system is generally quicker. However, when applying variants 2 and 3, there is independence from the accuracy of the external angle measuring instrument (AKF) since positioning is always to the same (possibly inaccurate) displayed angle. However, there is dependence on the reproducibility of the AKF measuring system.

Figure 2:
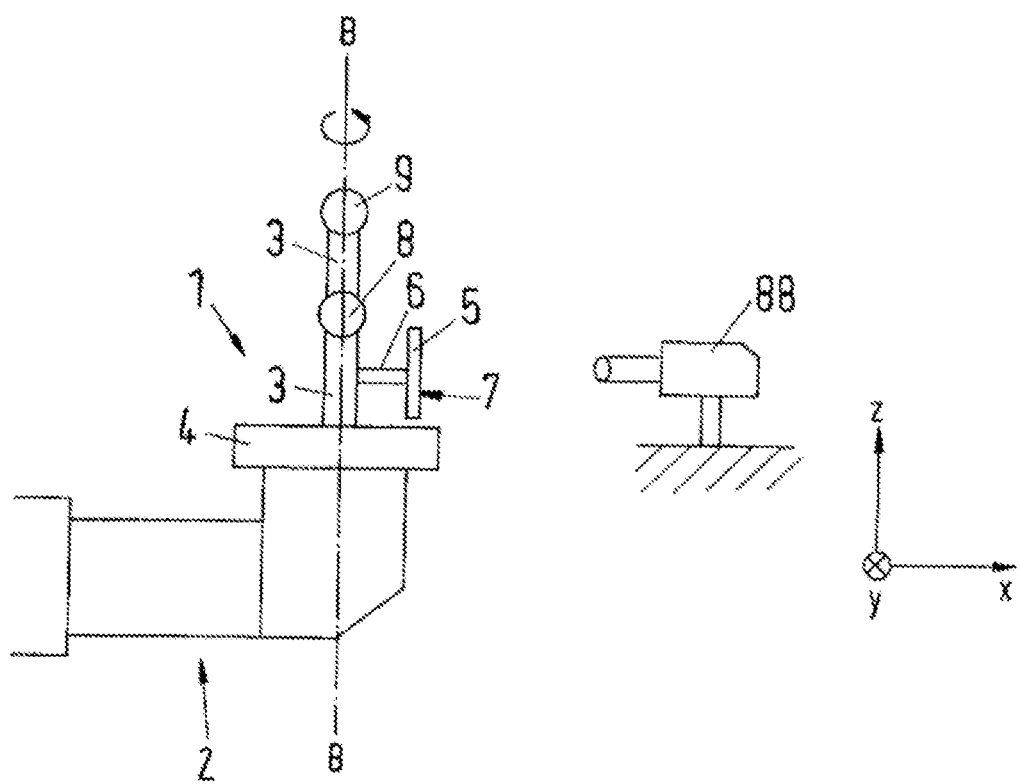
FIG. 2 shows a test body comprising a mirror aligned in a manner orthogonal to the rotational axis and a double sphere standard aligned in a manner coaxial with the rotational axis.

FIG. 2 shows a test body 1 which is connected to a rotary pivot joint 2. The test body 1 has a cylinder-rod-shaped holder 3 and a pedestal 4. The rotational axis B denotes one of the rotational axes of the rotary pivot joint 2. The cylinder-rod-shaped holder 3 has a rotational symmetry and the axis of rotational symmetry of the holder 3 is arranged in a manner coaxial with the rotational axis B. However, this is not necessary in all cases, as shown on the basis of FIG. 11, where the axis of rotational symmetry of the holder 3 is not coaxial with the rotational axis A of the rotary pivot joint in that case. Furthermore, the holder 3 need not have rotational symmetry and can, in principle, have any cross section. By way of example, the pedestal 4 is connected by way of a three-point bearing to the rotary pivot joint 2. The rotatable part of the rotary pivot joint 2, to which the pedestal 4 is attached and which is rotatable in relation to the part 66 (see FIG. 12) is not visible: it lies within the part 66 (see FIG. 12) and is rotatable in relation to the part 66 about the axis B. A mirror is attached laterally to the rotational axis B as a test element 5 and connected to the holder 3 by means of a rod-shaped support 6. The reflection face 7 or the mirror face faces away from the rotational axis B, points to the right in this illustration and is aligned in the direction of an autocollimator 88. In the selected coordinate system, which is depicted on the right-hand side in FIG. 2, the rotational axis B points in the Z-direction and the mirror points in the X-direction in the shown position. When the holder 3 is rotated about the rotational axis B, the mirror 5 rotates about the same rotational angle as the holder 3 and the rotational angle is detectable by means of the autocollimator 88 (abbreviated to AKF below). The rotations may be only very small. Two spheres 8, 9 as rotationally symmetric elements are attached to the holder 3. Both spheres 8, 9 are aligned in a manner coaxial with the rotational axis B, i.e. the axis of rotational symmetry thereof is axially flush with the rotational axis B. However, this is not necessary in all cases, as is shown on the basis of FIG. 11, where the spheres 8, 9 are not coaxial with the rotational axis A of the rotary pivot joint in that case. The spheres 8, 9 form a double sphere pair. The holder 3 can have a two-part design, wherein one part extends e.g. from the pedestal 4 up to in front of the first sphere 8 and a second part contains the first sphere 8 and the second sphere 9. The spheres 8, 9 can be probed using five distance sensors, as will still be described below in FIGS. 12 and 13. By way of example, the distance sensors can be capacitive sensors, eddy current sensors, magnetic field sensors, optical sensors, in particular interferometers, or mechanical inductive sensing units. Additionally, the tilt of the mirror 5, both about the rotational axis B and the Y-axis, can be observed by the AKF. The five distance sensors, which are still described on the basis of a subsequent example, enable a registration of the movement errors in the three translational spatial directions and the tilt about the X-axis and Y-axis. When applying a method still to be described below with a reference rotational axis rotating in the opposite direction, the AKF enables the registration of the rotational position error of the axis B. Additionally, one of the two tilt angles of the axis B about the X-axis or Y-axis is obtained from the measurement with the AKF, depending on how the AKF and mirror are aligned. In the shown illustration, the tilt angle could be measured about the Y-axis. In order to measure the tilt angle about the X-axis, the mirror would have to be aligned with the reflection face 7 in the direction of the observer and the beam of the AKF would have to be directed onto the mirror in the observation direction. Naturally, the tilt angles can be measured in succession after the setup has changed. The tilt angle or angles can be compared with the angle established by way of the distance sensors (yet to be described below), as a result of which the measurement reliability is increased.

Figure 3:
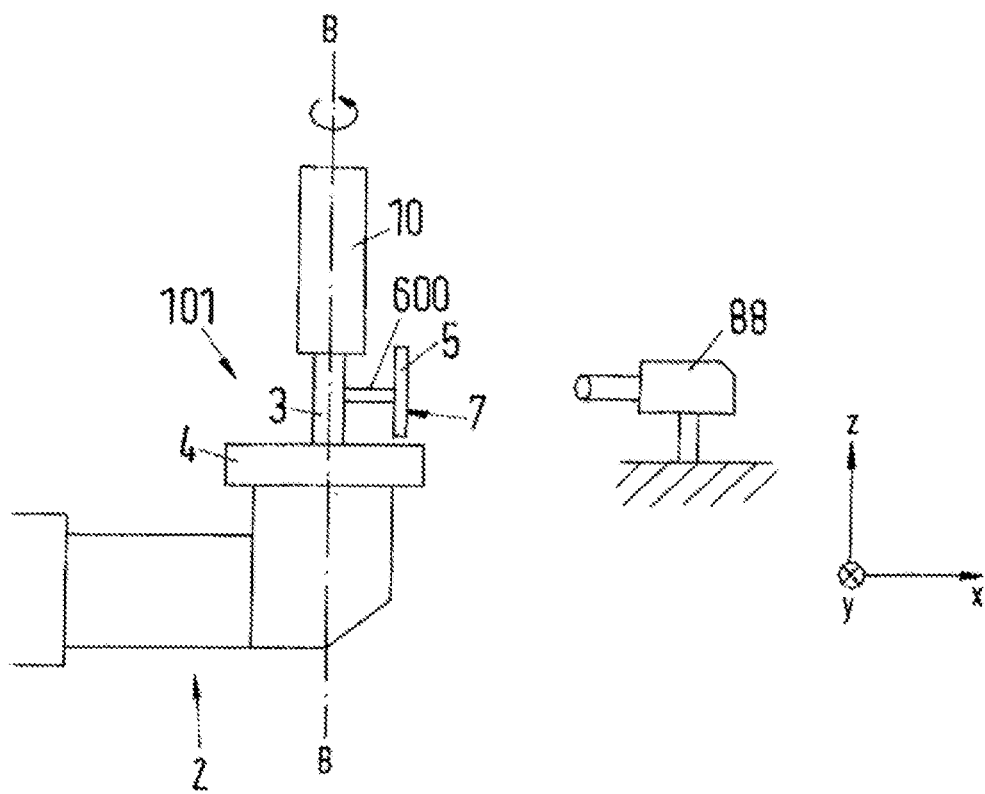
FIG. 3 shows a test body comprising a mirror aligned in a manner orthogonal to the rotational axis and a cylinder aligned in a manner coaxial with the rotational axis.

FIG. 3 shows a setup with a test body 101, wherein the reference signs have the same meaning as in FIG. 1; the difference here is that a cylinder 10 with an end face registrable by sensors is used as a rotationally symmetric element instead of the spheres 8, 9. The cylinder 10 is a special case of a second rotationally symmetric measurement body within the meaning of the general description of the invention. In the test body 101, like in FIG. 2, there is no "first" measurement body within the meaning of the general description of the invention (such a first measurement body is shown in the form of a sphere in FIG. 7). Instead of a cylindrical form, the second measurement body 10 could also have the form of a cuboid, wherein, in the view of FIG. 3, the view of the observer would fall on one of the four side faces of the cuboid. The cuboid 10 would be a special case of a second measurement body with a plurality of faces pointing in different directions, within the meaning of the general description of the invention.

Figure 10:
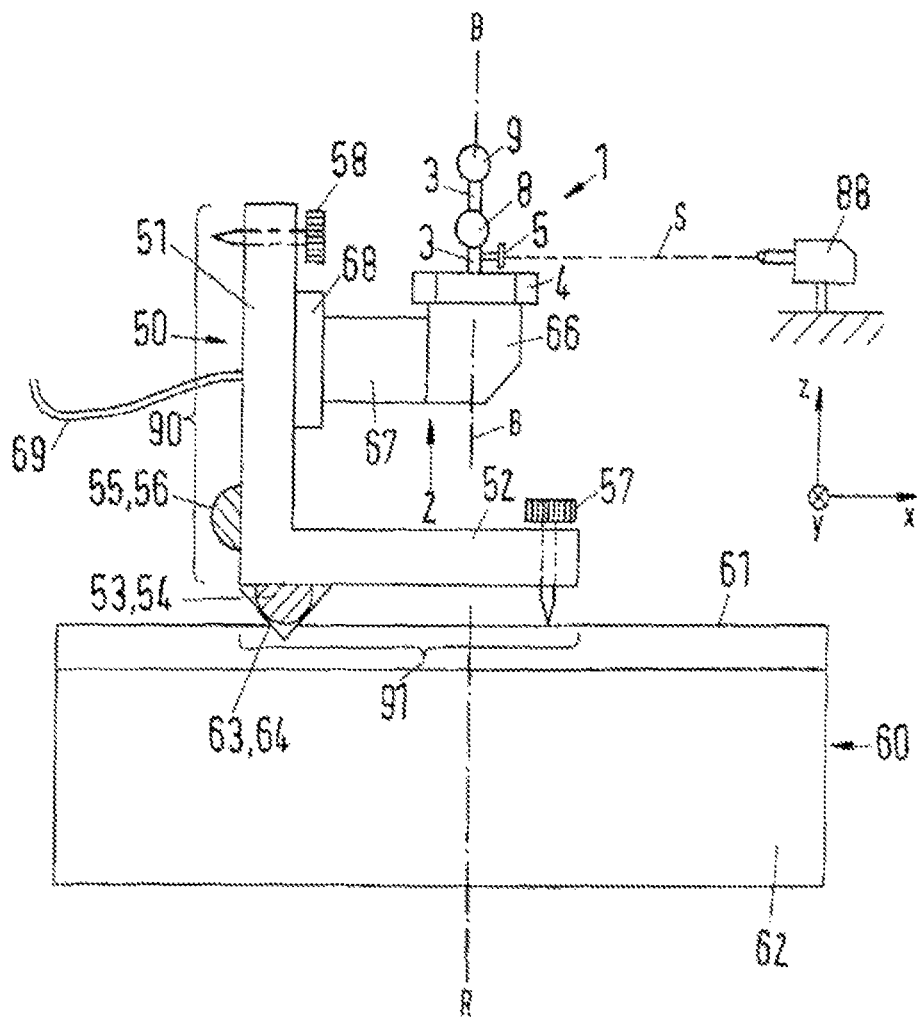
FIG. 10 shows an example for connecting a two-axis rotary pivot joint with a test body according to the invention for qualifying the B-axis.
Figure 11:
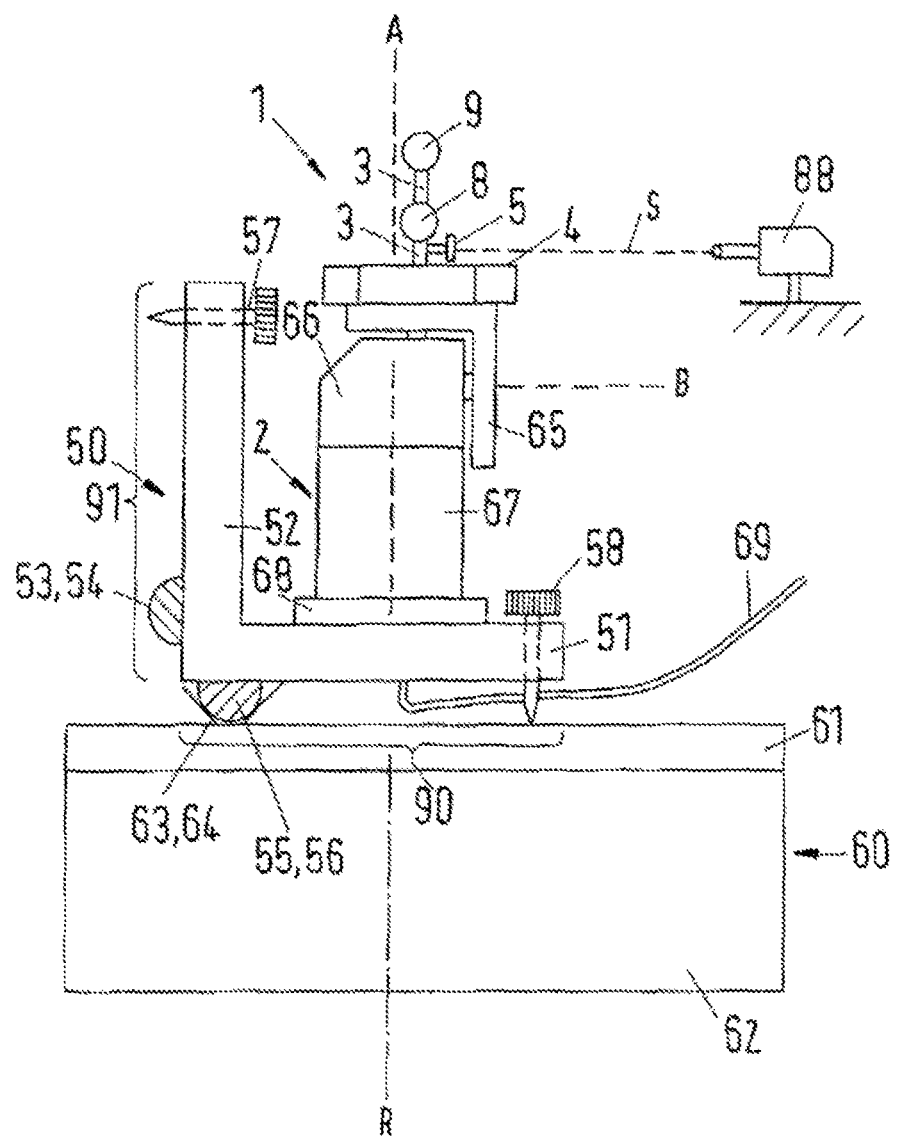
FIG. 11 shows an example for connecting a two-axis rotary pivot joint with a test body according to the invention for qualifying the A-axis.
Figure 12:
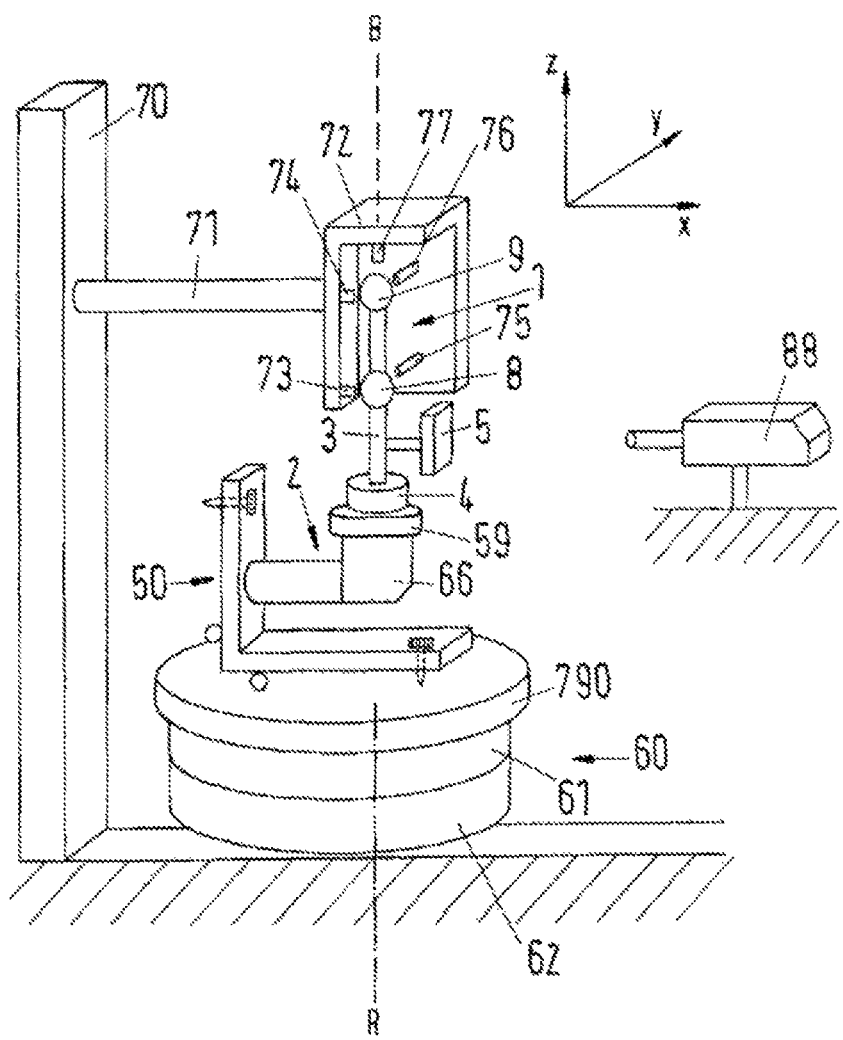
FIG. 12 shows a setup for qualifying the B-axis of a two-axis rotary pivot joint and for determining further translational and rotational deviations.

Now, the installation of the test body 1 in a CMM and a method for establishing the rotational position error and further translational and rotational errors is initially described on the basis of FIGS. 10 to 12.

Figure 28:
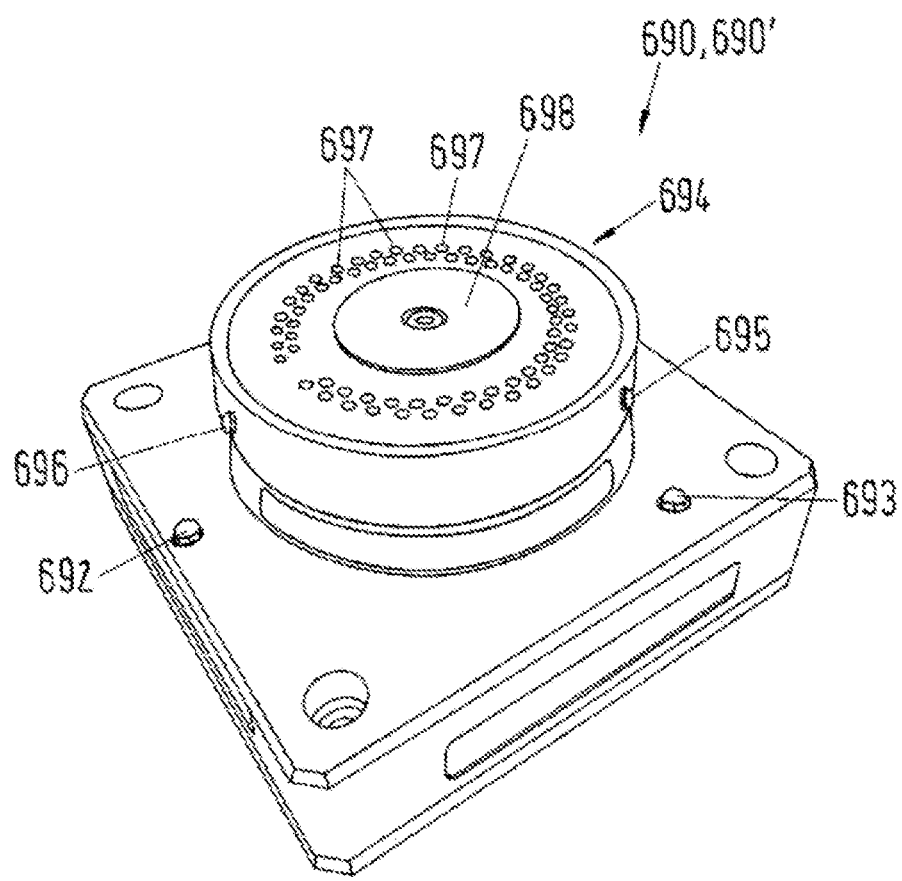
FIG. 28 shows a first element for a plug-in connection for connecting a holding element to a base or for connecting a rotational device to a holding element.
Figure 29:
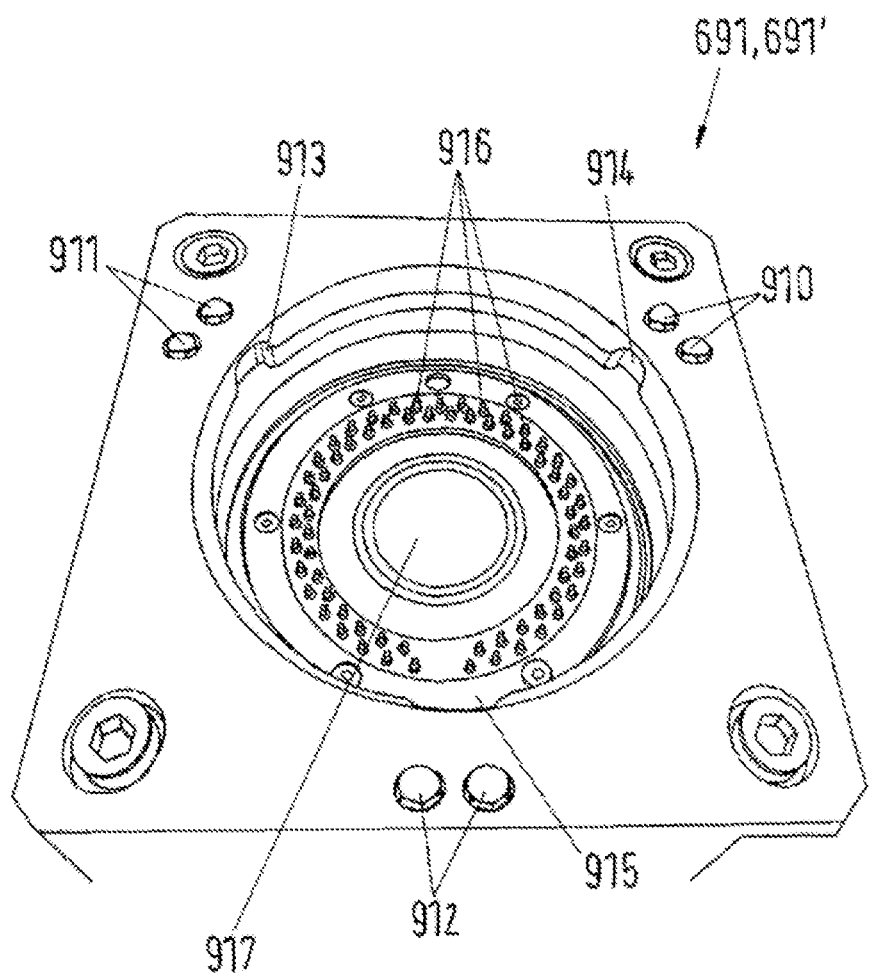
FIG. 29 shows a second element for a plug-in connection for connecting a holding element to a base or for connecting a rotational device to a holding element.

In the upper part, FIG. 10 shows the basic setup of test body 1, a rotational device 2 and an AKF 88, which was already described in FIG. 2. In this example, the rotational device 2, also referred to as a test object, is a rotary pivot joint 2 attached to an angle-shaped holding element 50. The holding element 50 has a holder 68, at which the rotational device 2 is attached. Furthermore, a current supply 69 is shown, by means of which the rotational device 2 is supplied with energy. Alternatively, the supply of energy and sensor signals can also be implemented directly by way of a plug-in connection, as shown in FIGS. 28 and 29. Where applicable, the rotary pivot joint 2, together with the holding element 50, can also be driven pneumatically, hydraulically or in any other way (not shown here). The angle has two limbs 51, 52 which form a support, wherein the limbs are in each case provided with a three-point bearing on the outer side. Each three-point bearing consists of two sphere-shaped elements and a knurled screw for adjustment purposes. Elements in the form of part of a sphere, preferably a hemisphere, are also possible. The hemisphere-shaped elements 53 and 54, which form coupling means, are attached to the lower limb 52, wherein only the front sphere-shaped element is visible in the selected perspective. Provision is made for the end of a set screw 57 as a third point of the three-point bearing and as a further coupling element. The hemisphere-shaped elements 53 and 54 and the end of the set screw 57 lie in the second coupling region 91 of the holding element 50. The holding element 50 is coupled to the base by way of the second coupling region 91. In an analogous manner, the second limb 51 has two hemisphere-shaped elements 55, 56 as coupling elements, of which only the front one is visible in the selected perspective, and a set screw 58 as a coupling element. In general, the coupling elements can also be referred to as "bearing elements" and are also denoted in an abbreviated manner as "elements" in the examples. The hemisphere-shaped elements 55 and 56 and the end of the screw 58 lie in the first coupling region 90 of the holding element 50. The elements 53, 54, 55, 56 can be a hemisphere or else a whole sphere, which is partly sunk into the limb.

Figure 30:
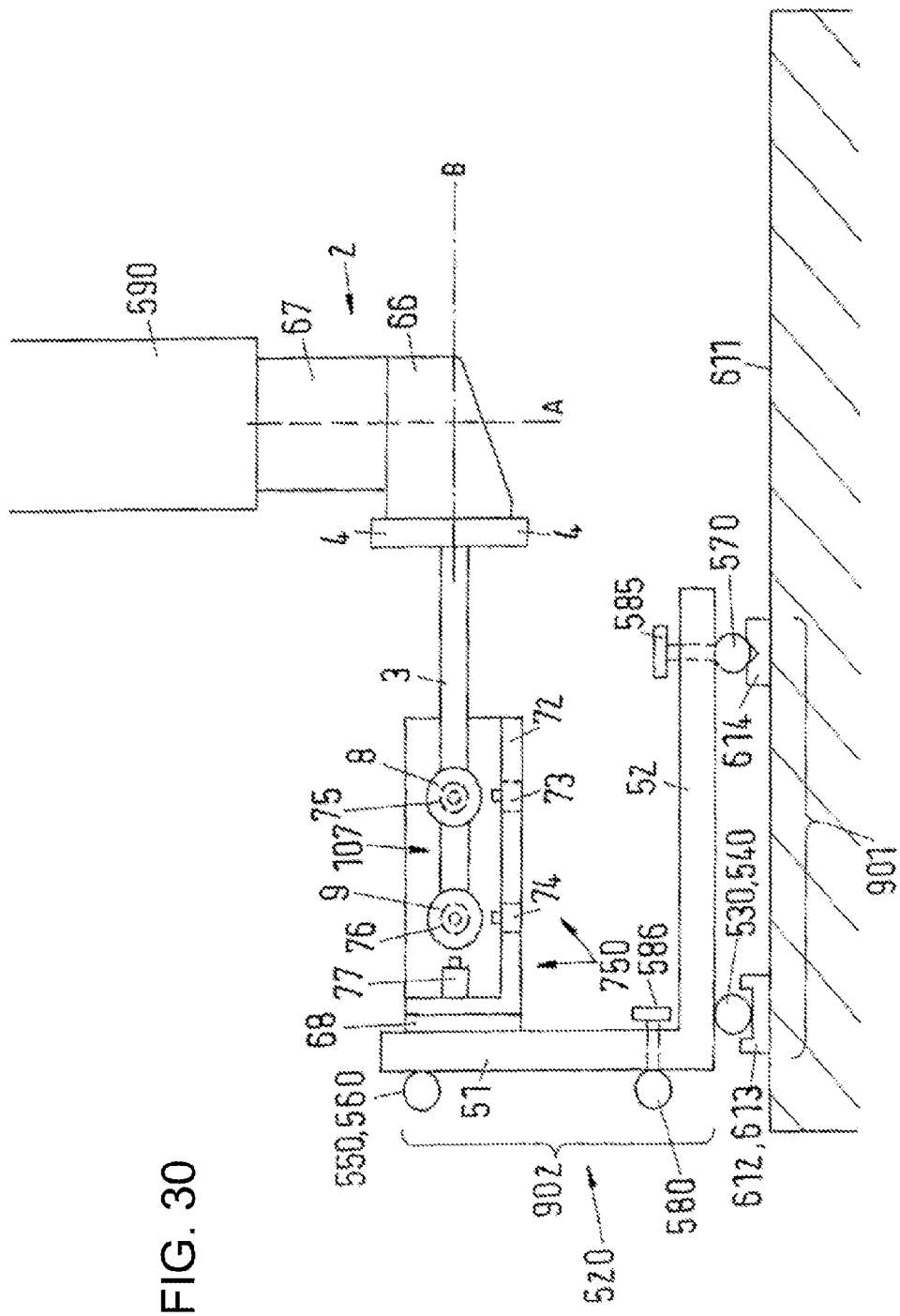
FIG. 30 shows a holding element with a sensor arrangement attached thereto, in a first position and orientation.
Figure 31:
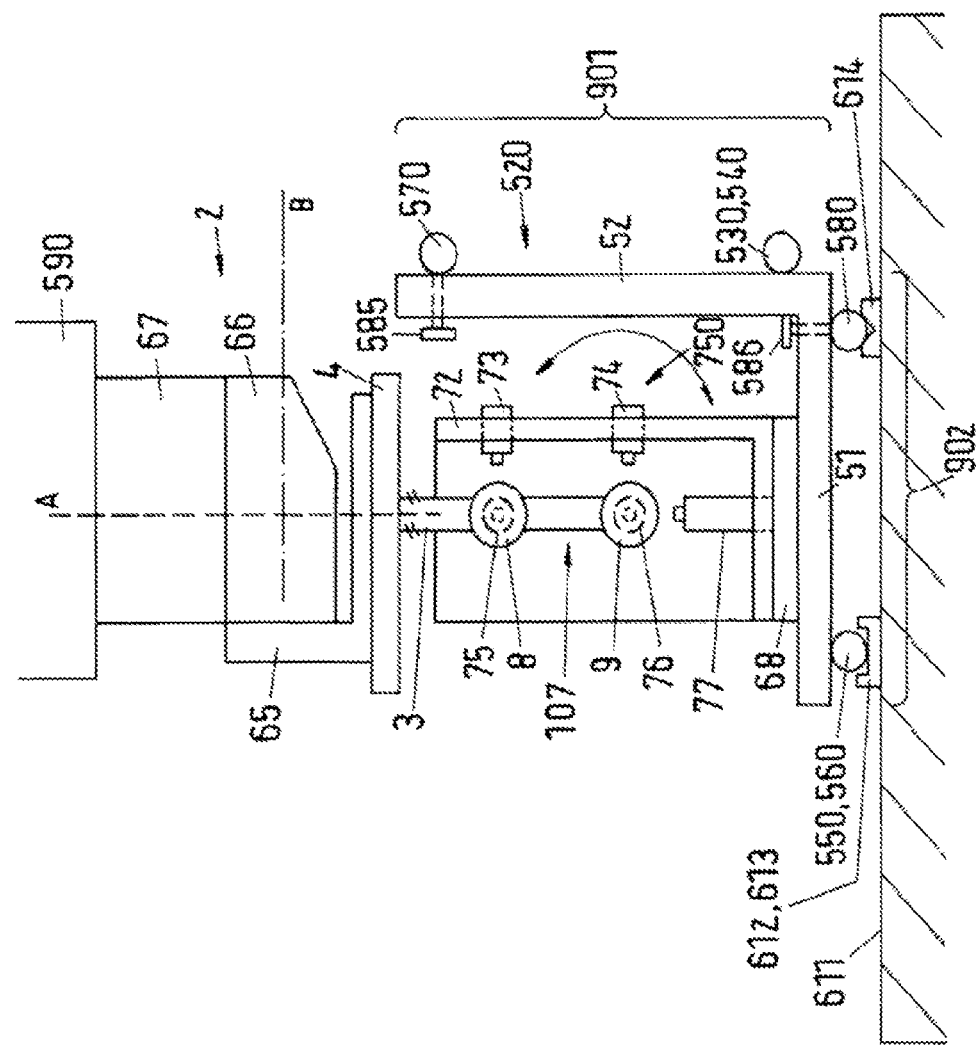
FIG. 31 shows a holding element with a sensor arrangement attached thereto, in a second position and orientation.

In the present figures, only one adjustment means in the form of a set screw 57 or 58 is visible per coupling region. In order to set the coaxiality with the reference rotational axis, respectively one further set screw, which is not shown here, can be provided in one or more of the coupling regions. In general, adjustment means can be present in any expedient number and combination. By way of example, one of the sphere-shaped elements 53, 54 or one of the sphere-shaped elements 55, 56 can be replaced by a set screw. It is furthermore possible to combine a set screw with a sphere-shaped bearing element or a partial sphere-shaped bearing element, as shown in FIGS. 30 and 31. In this case, the set screw 57 and/or 58 would not taper as shown, but would have a sphere or downward pointing hemisphere at the end, as is shown on the basis of the set screws 585 and 586 in FIGS. 30 and 31. In general, a tapering bearing element or adjustment means is preferably used if the bearing is implemented on a smooth surface. A bearing element or adjustment means in the form of a (partial) sphere can advantageously interact with a guide 63, 64, for example a roller pair or a triple sphere.

The three-point bearing of the angle-shaped holding element 50 enables a very accurate and reproducible orientation of the test body 1. Equipping times are minimized, particularly in the case of series measurements. By means of the holding element 50, slightly different orientations of the rotary pivot joint 2 can be established, as is identifiable when comparing FIGS. 10 and 11 (bottom).

Depending on the spatial orientation of the test object 2, torques or displacements may occur, for example due to the weight of the test body 1, of the test object 2 or, where applicable, due to the probing forces. In this case, deformations of the test object 2 or of the angled holder are eliminated by computation in a preferred variant.

In FIG. 10, the test object 2, in this case the rotary pivot joint 2, was placed onto a reference rotary table 60 together with the holding element 50, on the limb 51 of which the rotary pivot joint 2 is attached. The reference rotary table 60 has a rotary plate 61 and a lower part 62, in relation to which the rotary plate 61 is rotatable. The rotational axis of the plate 61 is denoted by R. The reference rotary table 60 has the rotational axis R. The energy supply of the reference rotary table 60 is not depicted here. An orthogonal alignment of rotational axes is not mandatory in this invention, neither in general nor in the shown examples. The axes B and R in FIG. 10 could, for example, also be aligned horizontally, as could the axes A and R in FIGS. 11, B and R in FIGS. 12 and D and R in FIG. 13. A horizontal alignment of B and R in FIGS. 10 and 12 is advantageous to the extent that, in the method described herein for recording the rotational position error (see below, for example), the rotary pivot joint 2 is in an orientation which corresponds to the orientation thereof in the subsequent measurement operation in specific types of coordinate measuring machine, for example in the horizontal arm coordinate measuring machine type.

The holding element 50 is mounted on the plate 61 of the reference rotary table 60 by means of the three-point bearing thereof, consisting of the sphere-shaped elements 53, 54 and the knurled screw 57, and it rotates together with the plate 61. Guides 63, 64 (only the front guide 63 is visible) for bearing the resting spheres 53, 54 are provided on the plate 61 of the rotary table 60. By way of example, the schematically depicted guides 63, 64 can be roller pairs or triple spheres or a combination thereof. The guides 63, 64 ensure a reproducible and constant positioning of the holding element 50 on the rotary table 60.

The reference rotary table 60 has a calibrated rotary angle display. As an alternative to the setup shown in FIG. 10, a test object 2 can also be placed directly on the reference rotary table 60, without use being made of a holding element 50 (compare FIG. 13, below, with a rotary table as test object). It is possible to identify in the setup of FIG. 10 that the rotational axis B of the test object 2 and the rotational axis R of the reference rotary table 60 are substantially flush or substantially coaxial with one another.

An exemplary method for recording the rotational position error of the rotational axis B of the test object 2 is performed in the following steps:

(1) The plate 61 of the reference rotary table 60 and the test body 1 rotate incrementally in opposite directions, e.g. +3° and -3°. Together with the plate 61, the holding element 50 and parts 66 and 67 of the rotary pivot joint 2 rotate e.g. by +3° about the axis R. The test body 1 is rotated by −3° about the axis B relative to the part 66 of the rotary pivot joint 2, with the relative rotation being implemented between the pedestal 4 and the part 66.

From the position of the external observer, i.e. when observed from the inert system, the mirror 5 thus remains stationary, or substantially stationary, when both rotational axes rotate in an ideal manner. After completing the movement step, the position value of the mirror 5 is established using the AKF 88. In the case of a rotational position error-free rotation about the axis B, the position of the mirror 5 should remain constant. By contrast, a deviating position of the mirror emerges as a result of a rotational position error and the rotational position error is determined with the AKF 88.

(2) Step (1) is repeated with different angle values, preferably until a multiple of 360° is obtained. In the case of roller-borne parts that are rotatable relative to one another, it is advantageous to acquire at least 2.5 rotations. Alternatively, the rotational movement and the angle measurement with the AKF 88 can be implemented continuously. Additional computational corrections can also be undertaken in order to compensate for synchronization problems. The great advantage of this method is that the increment can be selected to be very small, i.e. even short-periodic error components are registrable in a relatively short period of time.

(3) Subsequently, the measurement of the remaining—in total 5—rotational and translational errors can occur. To this end, the lower reference rotary table 60 is not rotated, i.e. the plate 61 is fixed relative to the lower part 62 and only the test body 1 is rotated relative to the part 66 of the rotary pivot joint 2 about the axis B. A setup for recording further errors is explained in FIG. 12.

(4) Characteristic variables are calculated from the data obtained and are compared to a given specification. Or correction values for a CAA correction are established from the data.

In the case of rotational devices with a plurality of rotational axes (multi-stage rotational axes), steps (1)-(4) are repeated for each rotational axis.

In alternative methods, it is possible initially to establish the rotational position error and at least one further wobble error and subsequently to establish the translational errors. Or the registration of all degrees of freedom is implemented simultaneously. From this, the following preferred requirements for the reference rotational axis R emerge:

If the errors Rb (rotational position errors of the axis B of the test object 2) and the errors Tx, Ty, Tz (translational deviation in the X-, Y- and Z-direction, respectively), Rx, Ry (rotational deviations about the X-axis and Y-axis, respectively) are established in succession, the reference rotational axis R of the rotary table 60 should only have a rotational position error that is as small as possible. A rotation of the plate 61 about the reference rotational axis R in relation to the lower part 62 could preferably only occur when recording the Rb error, as explained above. However, if the reference rotary table 60 has very small wobble and translation components in relation to the rotational axis to be calibrated, there can, however, also be a complete qualification of the rotational axis to be calibrated when rotating the plate 61 about the R-axis in relation to the lower part 62. Minimizing or eliminating the rotary position error of the reference rotational axis R can be implemented, for example, by mechanical precision, a highly accurate scale, a self-calibration method or a CAA (computer aided accuracy) correction.

If the errors Rb, Rx, Ry are established simultaneously in a first part of the method and if, subsequently, the errors Tx, Ty, Tz are established simultaneously (or if Rb, Rx are initially established simultaneously, followed, simultaneously, by the errors Tx, Ty, Tz, Ry; or if Rb, Ry are established simultaneously in a first part of the method and the errors Tx, Ty, Tz, Rx are established simultaneously in a second part of the method), the reference rotational axis R must have a rotational position error that is as small as possible and a wobble error that is as small as possible. The reference rotational axis R would only move when recording the Rb, Rx, Ry error. By way of example, a small wobble error can be achieved by mechanical outlay, CAA corrections or a partial online correction.

If all errors Rb, Rx, Ry, Tx, Ty, Tz are established simultaneously, the reference rotational axis R must have movement errors that are as small as possible in all 6 degrees of freedom. By way of example, this can be achieved by mechanical outlay, CAA corrections or a complete online correction.

FIG. 11 shows a setup for determining the rotational position error of the A-axis of the rotary pivot joint 2. The second axis B, which was measured using the setup according to FIG. 10, is plotted in FIG. 11 for comparison purposes. In relation to the setup of FIG. 10, the holding element 50 was rotated by 90°. The holding element 50 is coupled to the base by the first coupling region 90 or rests on the plate 61 of the reference rotary table 60 with a three-point bearing provided on the limb 51 (instead of a three-point bearing provided at 52 like in FIG. 10), without the rotational device 2 needing to be uninstalled. The three-point bearing brought about by the spheres 55, 56 and the knurled screw 58 is implemented in an analogous manner to that in FIG. 10. The test body 1 was reconfigured and aligned along the rotational axis A of the rotary pivot joint 2.

The spheres 8 and 9 can be arranged flush with the axis A or not, as is shown here. If the plate of the reference rotary table 60 is rotated about the axis R during the qualification such that the positions of the test body and of the mirror 5 remain unchanged, or substantially unchanged, as described above (plate 61 of the reference rotary table 60 and the test body 1 rotate in opposite directions about the axis R or A), then the spheres need not necessarily lie flush. Then, the axis A is preferably substantially coaxial or concentric to the axis R. By contrast, if no rotation is carried out about the axis R, the double sphere 8, 9 is preferably arranged in a manner substantially concentric and coaxial to the axis A. If the plate 61 of the reference rotary table 60 and the test body 1 rotate in the same direction about the axis R or A, then the double sphere 8, 9 is preferably arranged in a manner substantially concentric and coaxial to the axis A and the axis A is preferably substantially coaxial or concentric to the axis R.

The test body 1 is fastened to the rotary pivot joint 2 using the adapter 65. The adapter 65 is held magnetically. Like in FIG. 10, the AKF 88 remains aligned with the mirror 5. The method for recording the rotational position error about the axis A can be performed in an analogous manner, as is described above in FIG. 10 for the case of the axis B. However, in this case, the test body is not twisted relative to the part 66, but the part 66 is rotated about the axis A in relation to the part 67 and the test body 1 is not rotatable relative to the part 66.

FIG. 12 shows the setup of FIG. 10 in a wider context and the positioning of sensors for recording further translational and rotational errors that occur when rotating the rotary pivot joint 2 about the axis B. A stand 70 supports an arm 71, to which a sensor holder 72 with three walls perpendicular to one another is attached. Two distance sensors 73, 74 which point to the spheres 8 and 9 in the X direction are attached to a first wall. Using the distance sensors, it is possible to register the translation error Tx and the rotational error Ry, which emerges during the rotation of the holder 3 about the Y-axis. Distance sensors 75 and 76 which are aligned on the spheres 8 and 9 in the Y-direction are attached to the rear-side wall of the sensor holder 72. Using the distance sensors 75 and 76, it is possible to register the translation error in the Y-direction Ty and the rotational error Rx. Using the distance sensor 77, which is aligned on the upper sphere 9 in the Z-direction, it is possible to register the translation error in the Z-direction Tz. The spheres 8, 9 are a double sphere pair. Alternatively, it is possible to use a cylinder, like in the case of the test body 101 in FIG. 5, and equally arranged distance sensors can be directed onto the cylinder surface and the end face of the cylinder.

In FIG. 12, the rotary table 60, consisting of the lower part 62 and the rotatable plate 61, has a slightly different setup to the one shown in FIG. 10: a plane disk which rotates together with the plate is applied to the plate 61.

In a further difference to FIG. 10, an adapter plate 59 forming a mechanical interface between the test body 1 and test object 2 is installed between the test body 1 and the part 66 of the rotary pivot joint 2. As a mechanical interface, the adapter plate 59 enables the use of always the same test body 1 for a multiplicity of test objects.

Figure 13:
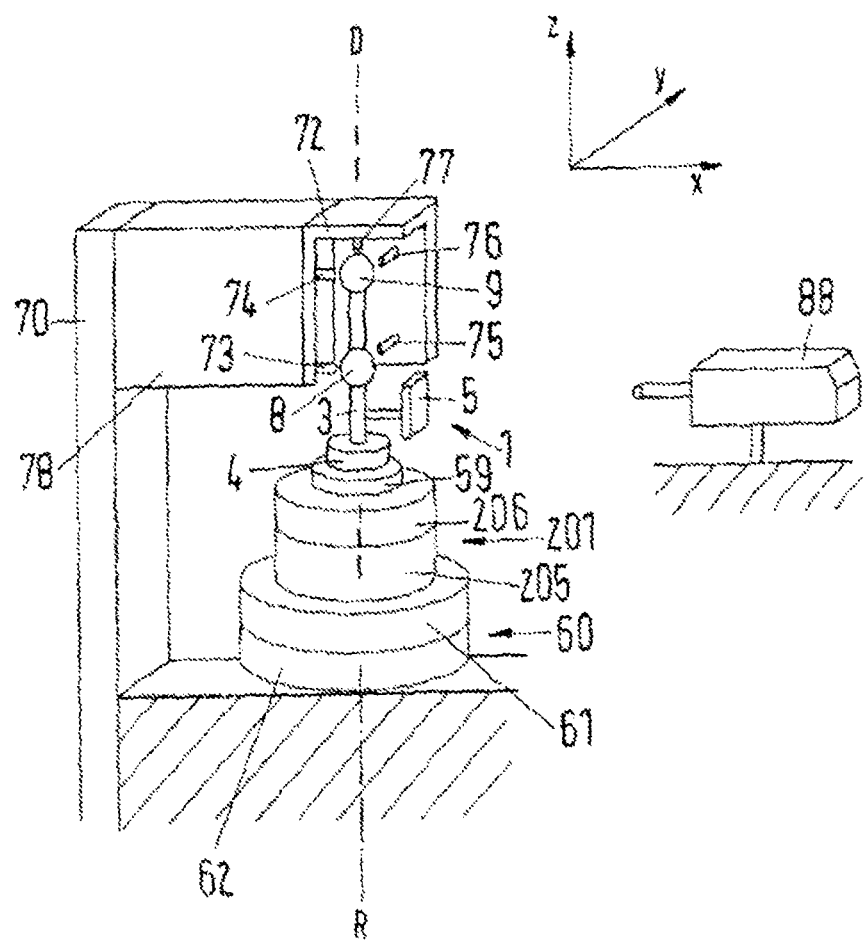
FIG. 13 shows a setup for qualifying the rotational axis of a rotary table and for determining further translational and rotational deviations.

FIG. 13 shows a measurement setup which is analogous to the setup in FIG. 12. In contrast to the setup of FIG. 12, the test object 201 in this case is a rotary table, the rotational axis D of which is intended to be calibrated or the rotational position error thereof, and further movement errors, are intended to be determined. The rotary table 201 is placed onto a calibrated reference rotary table 60, the rotatable plate of which is rotatable about the rotational axis R. The reference rotary table 60 has the same setup as in FIG. 12. The rotary table 201 has a lower part 205 and a rotary plate 206 which is rotatable about the axis D. In contrast to FIG. 12, a different type of arm 78 for the sensor holder 72 is provided in the present setup.

An adapter plate 59 is placed onto the rotary plate 201. The test body 1 is positioned on the adapter plate 59. The features of the test body 1 were already explained on the basis of the preceding figures. The test body 1 rotates together with the plate 206 of the rotary table 201 to be calibrated. The method for recording the rotational position error of the axis D is for example as follows:

(1) The plate 61 of the reference rotary table 60 is rotated about an angle, e.g. +3° about the axis R. In the process, the lower part 205 of the test object rotary table 201 positioned on the plate is likewise rotated by +3°. Following the rotation of the plate 61 of the reference rotary table 60, or simultaneously therewith, the plate 206 of the test object rotary table 201 is rotated about the axis D in the opposite direction, for example by −3°. In the process, the test body 1 is also rotated about the same angle, in this example −3°. When observed from the inert system, the mirror 5 remains stationary as a result thereof. After completion of the movement step, the position value of the mirror 5 is established by the AKF 88. In the case of a rotational position error-free rotation about the axis D, the position of the mirror 5 should be constant. By contrast, a deviating position of the mirror emerges from a rotational position error and the rotational position error is determined using the AKF 88.

Further steps are analogous to the method described on the basis of FIG. 10:

(2) Step (1) is repeated with different angle values, preferably until a multiple of 360° is obtained. In the case of roller-borne rotational axes, it is advantageous to acquire at least 2.5 rotations. Alternatively, the rotational movement and the angle measurement with the AKF 88 can be implemented continuously. Additional computational corrections can also be undertaken in order to compensate for synchronization problems. The great advantage of this method is that the increment can be selected to be very small, i.e. even short-periodic error components are registrable in a relatively short period of time.

(3) Subsequently, the measurement of the remaining—in total 5—rotational and translational errors can occur. To this end, the lower reference rotary table 60 is not rotated, i.e. the plate 61 is fixed relative to the lower part 62 and only the test body 1 is rotated together with the plate 206 about the axis D against the lower part 205 of the rotary table 201.

(4) Characteristic variables are calculated from the data obtained and are compared to a given specification. Or correction values for a CAA correction are established from the data.

Figure 4:
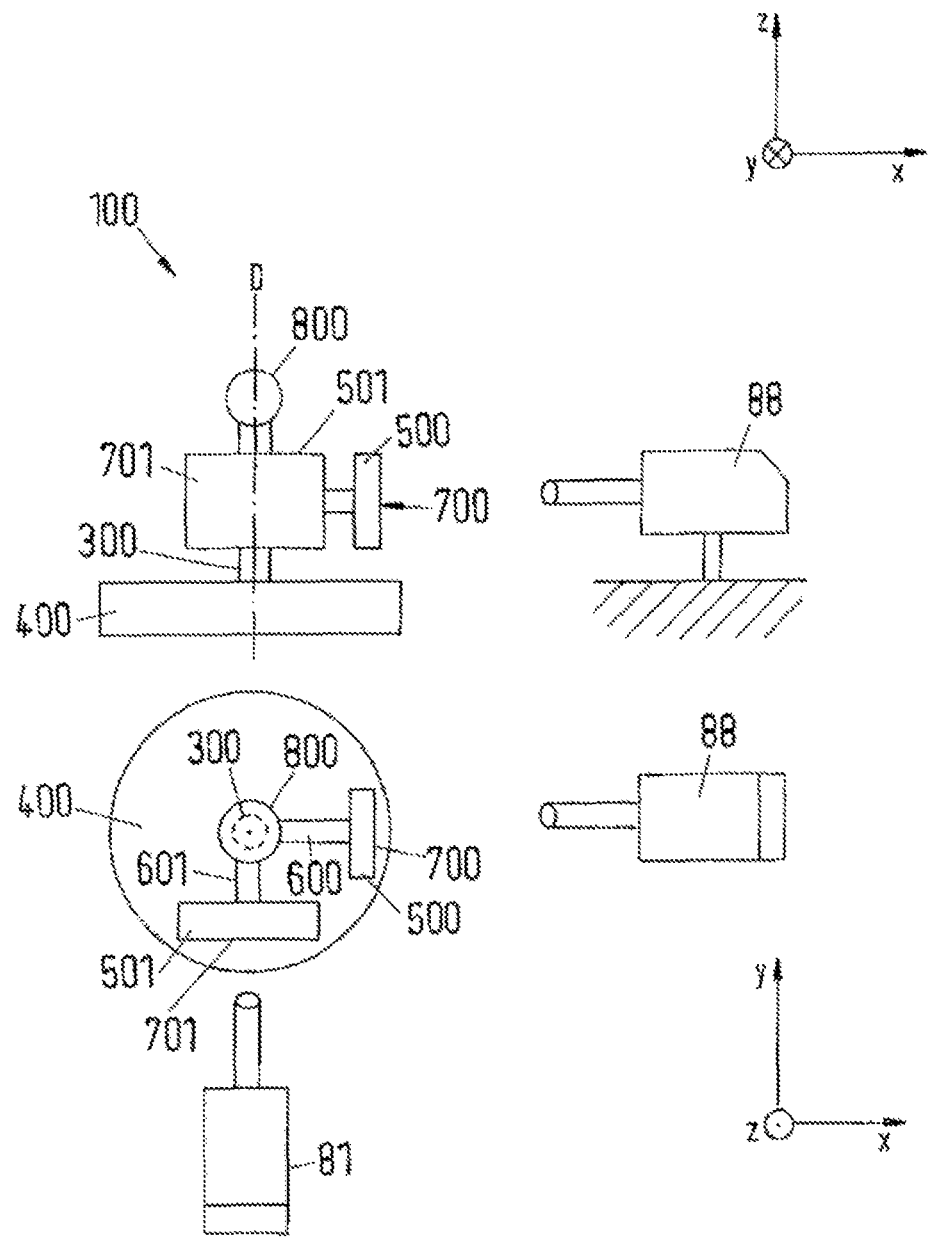
FIG. 4 shows a test body comprising two mirrors, aligned to one another and in a manner orthogonal to the rotational axis, and a sphere, which is arranged centrally on the rotational axis.

The following examples describe further embodiments of a test body and the peculiarities thereof:

FIG. 4 shows a test body 100 comprising a mirror 500 with the reflection face 700 which faces away from the rotational axis D. Furthermore, the test body has a second mirror 501 with a mirror face 701 which likewise faces away from the rotational axis D. The two reflection faces 700 and 701 are orthogonal to one another, wherein, in the selected view, the mirror face 701 points in the direction of the observer and the mirror face 700 is aligned laterally to the right in the direction of the AKF 88. The lower part of FIG. 4 shows the setup from above with the direction of view along the rotational axis D. In the lower part of FIG. 4, a second AKF 81 which is aligned onto the mirror face 701 of the second mirror 501 is depicted. Furthermore, the test body 100 of FIG. 4 also has a holder 300 and a sphere 800 attached to the end of the holder. The mirrors are fastened to the holder 300 with supports 600, 601. Alternatively, a cylinder, as shown in FIG. 3, or a double sphere, as in FIG. 2, can be provided instead of a sphere 800. In contrast to the embodiment according to FIG. 2, only one sphere is present; this is justified as follows: the double sphere of FIG. 2 of the cylinder of FIG. 3 is only required for registering the second tilt angle not registered by the AKF 88, in this case the tilt angle about the X-axis. If two mirrors 500, 501 and two associated AKFs 88, 81 are available, it is possible to dispense with a double sphere or a cylinder as the second tilt angle can be registered by the AKF 81 by way of the tilt of the mirror 501. As a result, it is possible to dispense with two of the five distance sensors shown in FIGS. 12 and 12. The use of an AKF 81 is advantageous in that the working distance can be larger and the apparatus can have a simpler configuration. The AKF offers the highest level of accuracy and a reliable measurement.

Figure 5:
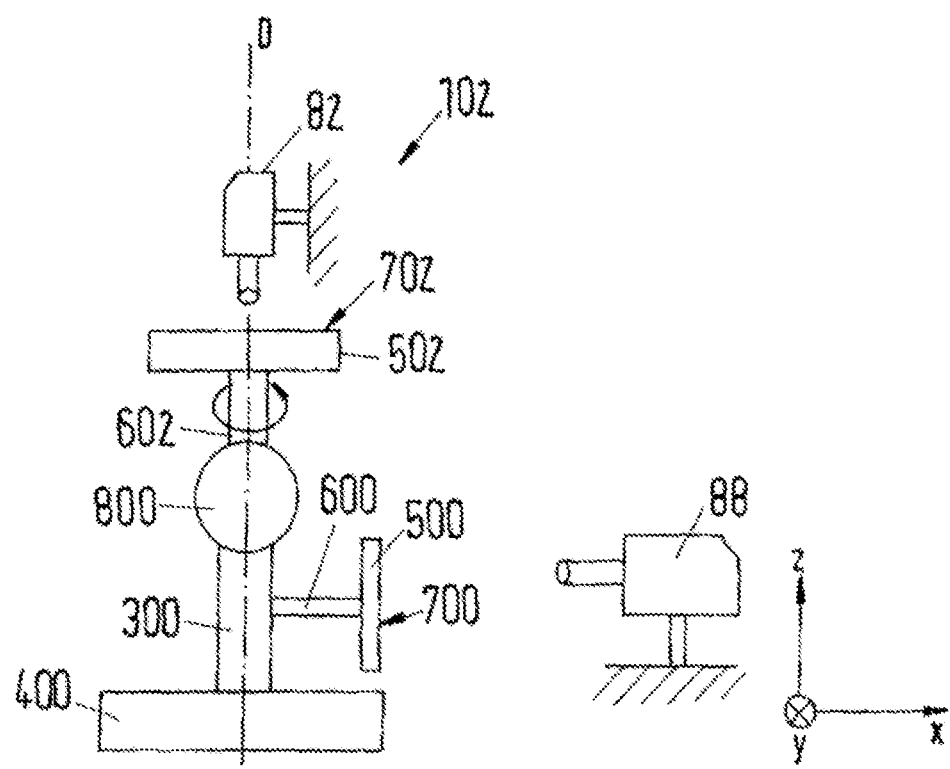
FIG. 5 shows a test body comprising a mirror aligned in a manner orthogonal to the rotational axis and a sphere arranged centrally on the rotational axis and a further mirror oriented in the direction of the rotational axis.

FIG. 5 shows a test body 102 which has a mirror 502 that has a reflection face 702 pointing in the direction of the rotational axis D. Expressed differently, the mirror face 702 points upward in the Z-direction. The mirror 502 is fastened to the sphere 800 by means of the support 602. All further elements were already described on the basis of FIG. 4. Instead of a sphere 800, provision can alternatively be made for a cylinder, as shown in FIG. 3, or a double sphere, as in FIG. 1, wherein the mirror 502 would be fastened accordingly by means of the support 602 on the cylinder or the upper sphere of the double sphere. A second AKF 82 is directed to the mirror face 702 of the second mirror 502 and measures the two tilts of the test body 102 about the X-axis and Y-axis. Moreover, the axial sensor 77 shown in FIGS. 12 and 13 could measure in the direction of the mirror 502 oriented in the axial direction, or the reflection face 702 thereof, in order to determine the translation deviation in the Z-direction Tz.

Figure 6:
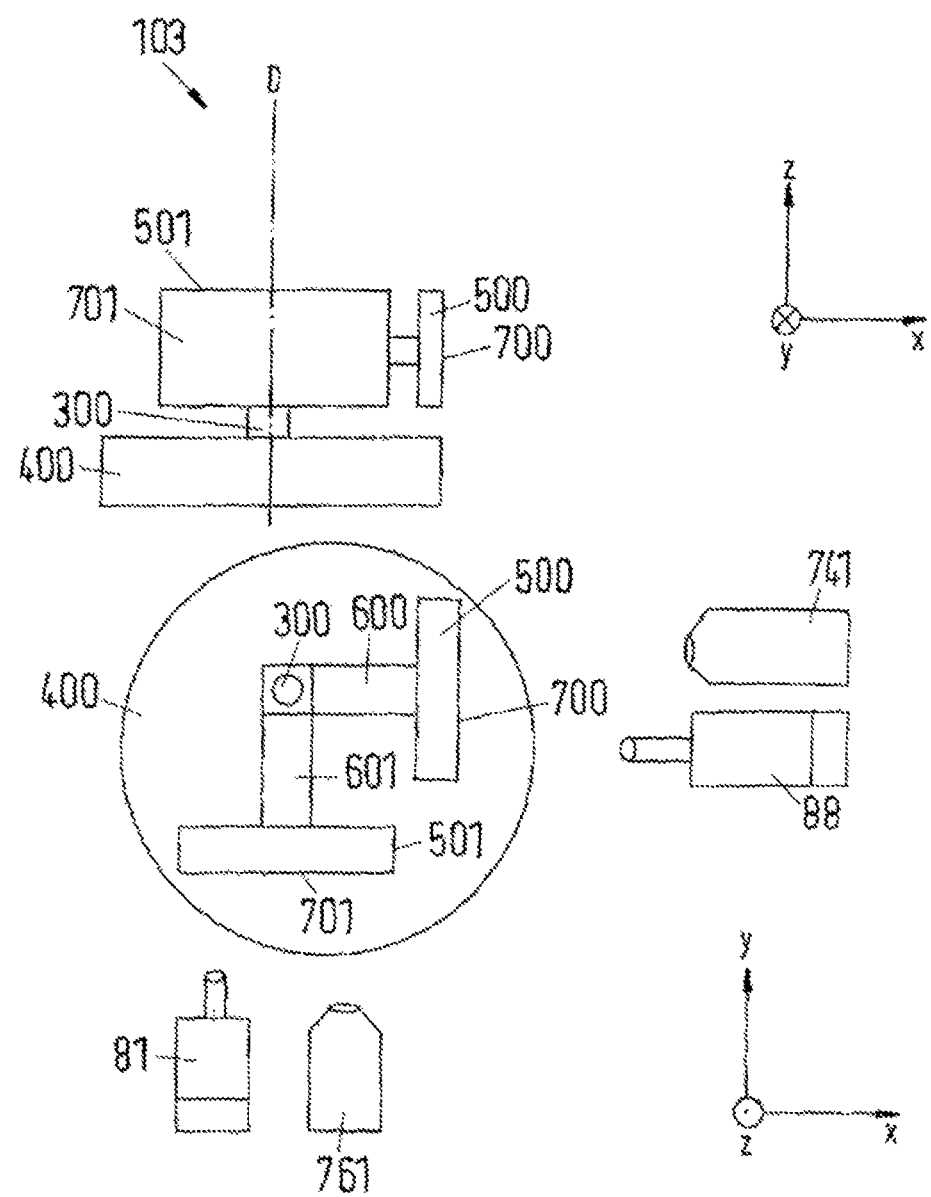
FIG. 6 shows a test body comprising two mirrors, preferably aligned to one another and in a manner orthogonal to the rotational axis.

FIG. 6: The embodiment of a test body 103 according to FIG. 6 is almost identical to the embodiment according to FIG. 4, except for that the test body 103 does not have a sphere 800 as rotationally symmetrical element. In this embodiment, the translation in the X-direction is registered by a distance sensor 741, which is depicted in the lower part of FIG. 6 (view of the setup in the −Z-direction). The translation in the Y-direction is registered by a distance sensor 761 directed onto the mirror 501. In this case, the determination of the three rotational errors (rotational position error of the axis D, Rx and Ry) and the measurement of the translation errors Tx and Ty can be implemented simultaneously. If the axial translation deviation Tz is likewise intended to be registered, a counter face which points in the Z-direction can be attached to the test body 103. A further distance sensor can be directed to this counter face. By way of example, provision can be made for a third mirror 502, as depicted in FIG. 5, onto the mirror face 702 of which an AKF 82 and a further distance sensor are directed.

The goal of the arrangement from FIG. 6 is the simultaneous measurement of the position error (AKF 88, 81), a rotation (AKF 88, 81) and a translation (distance sensor 741, 761) using the same mirror target 500 or 501 in each case.

When using the arrangements of autocollimator (AKF)/distance sensor 88/741 and 81/761, the distance sensor 741 or 761 is preferably arranged for the translation measurement in such a way that it is aligned centrally on the mirror 500 or 501, to the extent that the mirrors 500 and 501 themselves are also aligned centrally in relation to the rotational axis D—expressed differently, to the extent that the rotational axis D in the perspective of the upper FIG. 6 divides the mirror 501 into two halves and the mirror 500 is correspondingly divided into two halves if it were to be viewed from the right. It would be advantageous in this arrangement if the mirroring plane of the mirror 500 or 501 were to be arranged in such a way that the rotational axis D lies in this plane in order to avoid so-called cosine errors.

Expressed differently, the notional continuation of the measurement beam of the distance sensor 741 or 761 should impinge on the rotational axis D.

If the notional continuation of the measurement beam of the distance sensor 741 or 761 does not impinge on the rotational axis D, the following points should be considered in practice: the drawn arrangement is therefore not preferred because the laser distance sensors 741 and 761 are eccentric and a rotation of the mirror 500 or 501 as a result of a position error would be interpreted by the laser 741 and 761 as a translation due to the lever present. The changes in the distance caused by the rotation would add to the actual translations. The following solutions are feasible for this problem:
 1. The distance sensor 741 or 761 is arranged in such a way that the notionally extended beam of the laser intersects the rotational axis, as already mentioned above. As a result, the lever is dispensed with and the distance sensor 741 or 761 only still sees the actual translation. It would be advantageous in this arrangement if the mirroring plane of the mirror 500 or 501 were to be arranged in such a way that the rotational axis lies in this plane. Otherwise so-called cosine errors are generated. There are no problems with arranging the AKF eccentrically.
 2. The distance change visible at the laser 741 or 761 due to the rotation can be eliminated computationally. The rotational angle is known as a result of the AKF measurement. The relationship between the change in distance at the laser 741 or 761 and rotational angle can be determined by a simple rotation of the reference rotary table with a stationary test object. Here, the reference rotary table must additionally meet the requirement of being as translation error-free as possible. The translation determined by the laser 741 or 761 must be corrected by the distance change caused by the rotation. Alternatively, the relationship between rotational angle and distance change at the laser can be calculated from the lever relationships.
 3. The effect of the distance change caused by the rotation can be averaged out if use is made of two lasers. What is important for this is that one laser is arranged on the one side of the rotational axis and the other one is arranged on the other side of the rotational axis. That is to say, the signals must change in antiphase. The two lasers are preferably arranged as exactly as possible on one level and preferably have the same distance from the rotational axis. However, the two distance measuring units also be arranged as desired provided the distances between the lasers and the rotational axis are known. Then, the lasers can also both be arranged on one side of the rotational axis.

In place of a laser distance sensor 741 or 761, a capacitive distance sensor may also come into question since capacitive sensors can also measure against metallically mirrored mirror surfaces.

Figure 7:
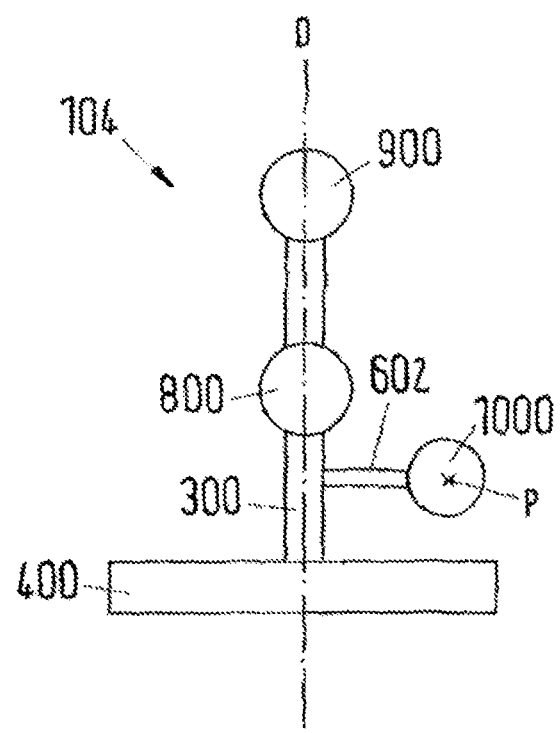
FIG. 7 shows a test body comprising a sphere, which is assembled in the plane orthogonal to the rotational axis at a radius >0, and a double sphere standard aligned in a manner coaxial with the rotational axis.

FIG. 7 shows a test body 104 with a test element 1000 in a spherical form, wherein the sphere 1000 is a first measurement body in accordance with the general description of the invention. The test sphere 1000 is connected to the holder 300 by way of a support 602. The holder has a double sphere 800, 900, which was already described in the preceding embodiments and which is a second measurement body in accordance with the general description of the invention, just like the cylinder 10 (FIG. 3), the sphere 800 (FIG. 4) and double spheres 8, 9, shown in the other figures. In this embodiment, a CMM is used to measure the sphere position of the sphere 1000 after the test body 104 was installed in a CMM, for example analogous to FIG. 12 or FIG. 13. In the shown embodiment, the center point P of the sphere 1000 serves as a reference point. The position of the reference point P can be determined in the various rotational positions of the test body 104 and the rotational angle of the test body 104 can be determined from the positions of the reference point P and the distance of the reference point from the rotational axis D. The rotational axis D need not necessarily extend through the holder 300 but can also extend next to it, as shown in FIG. 11.

In an embodiment (not shown here), it is also possible to attach and measure a plurality of spheres 1000 on the test body 104. Using a plurality of spheres, it is possible to measure the movement error as described in Busch, K.; Franke, M.; Schwenke, H.: Wiegand, U.: "Rückführung von Koordinatenmessgeräten durch Abschätzung der zu erwartenden Messabweichungen durch Simulation" Physikalisch-Technische Bundesanstalt. 1996 research report. Or changes in rotational position can be established at a plurality of spheres. Using the example of reflectors, a "flipping-over measurement" or multiple measurement was described in the general part of the description, with two mirrors which are at an angle of >180° to 360° in relation to one another or with three or more mirrors which are at an angle of >180° to <360° in relation to one another, in particular at the angle $\alpha=360°-[(N-2)/N]*180°$ (N is an integer ≥3) in relation to one another. A measurement with a plurality of spheres can also be implemented analogously, which spheres are arranged at a distance from the rotational axis and/or in a manner not coaxial with the rotational axis, wherein a notional line from a sphere to the rotational axis and a notional line from an adjacent sphere to the rotational axis are at an angle 360°/M in relation to one another, wherein M is an integer greater than or equal to 2, in particular 2-8. In particular, each of the spheres has a reference point, in particular the sphere center point, and a notional line from the sphere center point of a sphere to the rotational axis and a notional line from the sphere center point of an adjacent sphere to the rotational axis are at an angle of 360°/M in relation to one another.

The measurement accuracy of the CMM can be increased if the sphere 1000, as considered from the inert system, remains stationary, in an analogous manner to what was explained above on the basis of a stationary mirror in the case of counter-rotating reference rotary table plate and test body. In the case of a stationary sphere, the measuring system of the CMM only needs to move around the sphere. Long travel paths of the measuring system of the CMM are thus avoided. The rotational position error can be increased by a relatively large distance between the sphere and the axis D or a relatively long support 602.

Figure 8:
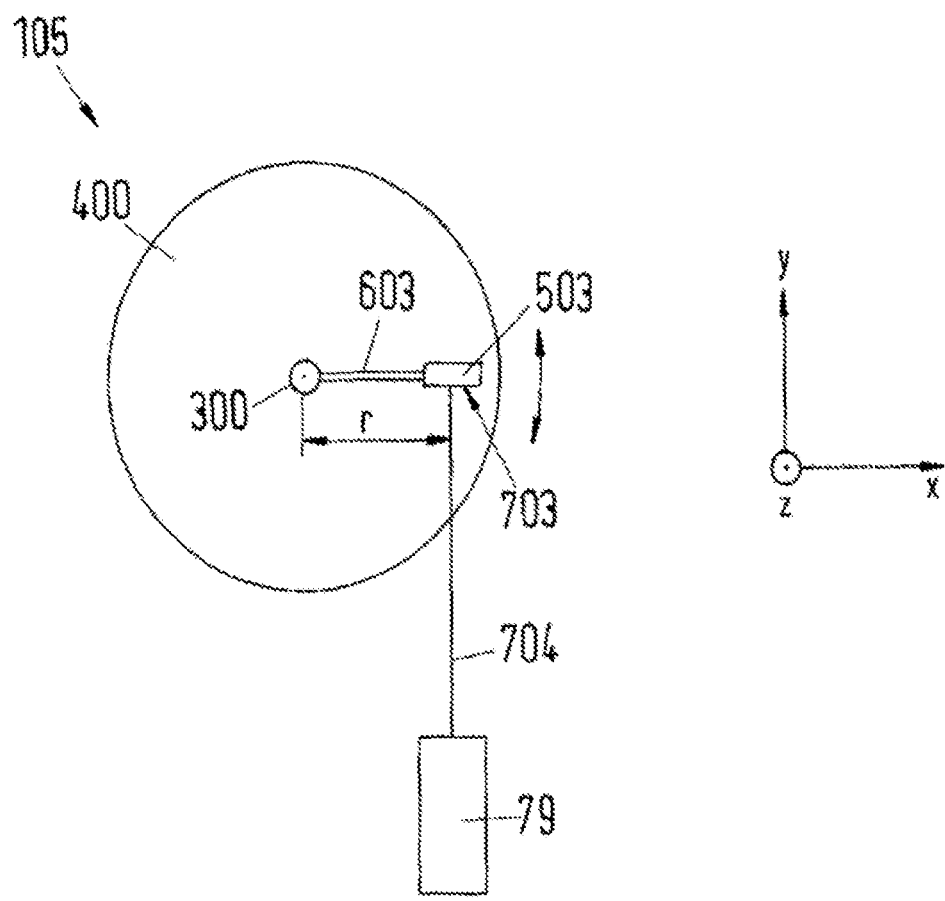
FIG. 8 shows a test body comprising a mirror, which is assembled in the plane orthogonal to the rotational axis at a radius >0.

FIG. 8 shows a test body 105 with a mirror 503, the reflection face 703 of which is aligned in the rotational direction or counter to the rotational direction, as depicted by a double-headed arrow. The mirror 503 is connected to the holder 300 by way of a support 603. In the selected perspective, the view is onto the test body 105 along the rotational axis. Alternatively, the mirror 503 can also be attached to the pedestal 400 and connected directly to the holder 300 by the pedestal 400. In the case of a connection via the pedestal 400, the mirror 503 can be placed onto the pedestal 400. In this embodiment, the AKF is replaced by a laser 79, which performs a distance measurement to the surface 703 of the mirror 503. To this end, a laser beam 704 is directed onto the surface 703. A change in the distance is measured when the mirror 703 rotates. The angle through which the test body 105 has rotated is determined indirectly by way of the position of the mirror 503 and emerges as $$\alpha = \arctan(dx/r),$$

where dx=change in distance between the laser 79 and mirror face 703, and r=shortest distance of the laser beam from the rotational axis.

The test body 105 from FIG. 8 can also additionally have a cylinder, a sphere or a double sphere.

Figure 9:
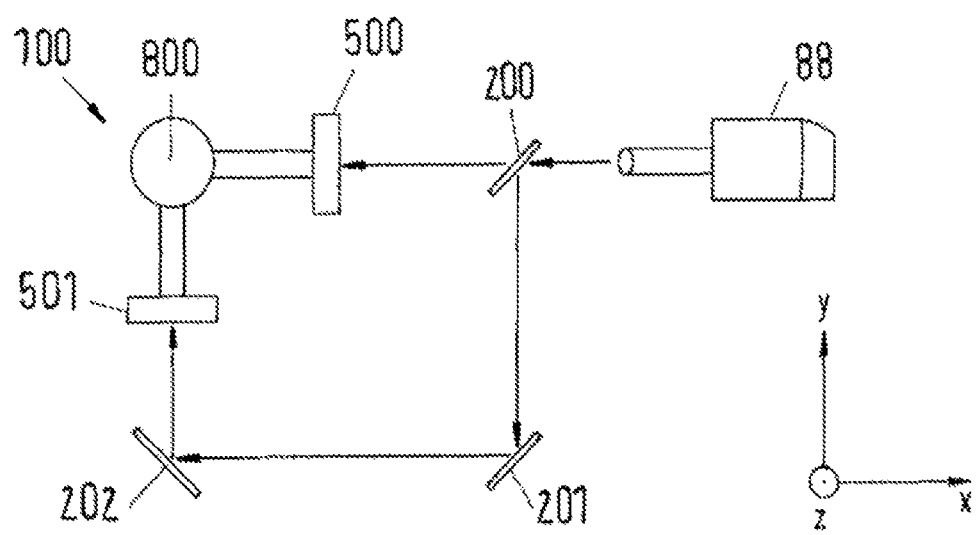
FIG. 9 shows a setup made of a test body and an autocollimator with multiple evaluation.

FIG. 9 shows a test body 100 as is described on the basis of FIG. 4. In contrast to the setup of FIG. 4, in the setup of FIG. 9, the position of each mirror 500, 501 is only measured using an AKF 88, the beam of which is directed to the mirror 500 through a semi-transparent mirror and, simultaneously, also directed to the mirror 501 by reflection in the semi-transparent mirror 200 and deflection in the mirrors 201 and 202. As a result of this arrangement, the rotational position error Rz is registered by each one of the two mirrors 500, 501. Additionally, Ry is registered in the first beam, i.e. on mirror 500, and Rx is registered in the second beam, i.e. on mirror 501.

In variants of the above-described method, the registration of the various degrees of freedom can also be implemented in sequence. In this manner it is possible, e.g., to initially observe a first mirror with the AKF and then a second one in a further measurement procedure after reconfiguration of the AKF.

In principle, a separate test body is feasible for each degree of freedom. Thus, for example, a mirror could be fastened relative to the rotational axis first and a double sphere standard could be fastened in a second measurement procedure.

The subsequent FIGS. 14-23 show further arrangements comprising a rotational device 201, in this case a rotary table, a reference rotational device 60, in this case a reference rotary table, and possibly further components.

Figure 14:
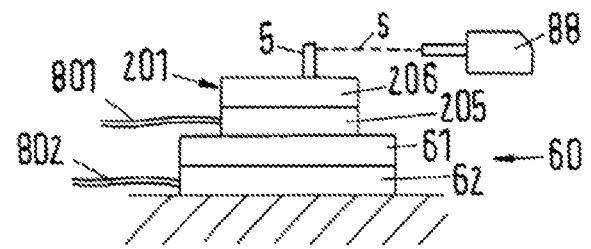
FIG. 14 shows an arrangement with a rotational device and a reference rotational device.

The setup of FIG. 14 is comparable to FIG. 1. The rotational device 201 is arranged on a reference rotational device 60, wherein the stator 205 of the rotational device 201 is connected in a conjointly rotating manner to the rotor 61 of the reference rotary table. A mirror 5 as a test element is attached to the rotor 206 of the rotational device 201, the rotational position of which mirror is registered by means of the autocollimator 88. An energy supply 802 in the form of a cable leads to the stator 62 of the reference rotary table 60 and an energy supply 801 in the form of a cable leads to the stator 205 of the rotary table 201. The cables 801, 802 also serve for signal transmission, e.g. of control and measurement signals to an error establishment unit 1001 depicted in FIG. 1. Within the meaning of the general description, the following applies in FIG. 14: the rotor 206 is the first part, the stator 205 is the second part, the rotor 61 is the third part and the stator 62 is the fourth part. The arrangement could also be reversed, i.e. the reference rotary table 60 would then be arranged on the rotary table 201, wherein the rotors would be arranged above the stator in each case. In this case, the sequence of the parts from top to bottom would be as follows:

reflector 5 on the rotor 62, rotor 62 of the reference rotary table 60, stator 61 of the reference rotary table 60, which undergoes conjoint rotation with the rotor 205, rotor 205 of the rotary table 201, which undergoes conjoint rotation with the stator 61, stator 206 of the rotary table 201.

In this arrangement, the stator 206 is the first part, the rotor 205 is the second part, the stator 61 is the third part and the rotor 62 is the fourth part within the meaning of the general description. From this assignment, it is obvious that the first part 206 in FIG. 14 is a rotor, whereas it is a stator in the above-described modification, where the rotary table is arranged below, and that the second part 205 in FIG. 1 is a stator, whereas it is a rotor in the development with reversed arrangement of rotational device 201 and reference rotational device 206. Accordingly, the functions of the third and fourth parts 61, 62, which are part of the reference rotary table 60, are interchanged in terms of the function thereof compared to FIG. 14 in the modification of the arrangement of FIG. 14. In FIG. 14, part 62 is a stator and part 61 is a rotor, whereas, in the reversed arrangement of rotary table 201 and reference rotary table 60, part 61 is a stator and part 62 is a rotor.

In the subsequent description of the figures, the first part of the general description is always assigned the reference sign 206, the second part is always assigned the reference sign 205, the third part is always assigned the reference sign 61 and the fourth part is always assigned the reference sign 62, independently of whether the relevant part is a rotor or a stator in relation to the respective rotational device or reference rotational device. In one definition, a stator of a rotational device is the part which has an energy supply and a drive, by means of which the rotor is driven. If the rotational device is used as intended in measurement operation of a coordinate measuring machine, the rotor is rotated while the stator remains stationary. Contrary to this principle, the subsequent figures also describe arrangements which do not constitute the use of the rotational devices in the measurement operation and in which the stator is rotated and the rotor remains stationary, e.g. stationary in relation to a substrate.

A disadvantage of the setup from FIG. 14 is that the stator 205 of the rotary table 201 is twisted in relation to the stator 62 of the reference rotary table 60 when the method is carried out and, as a result thereof, the energy cables 801 and 802 are also twisted in relation to one another, possibly leading to the winding of the cable 801 in the case of a relatively large rotational angle or in the case of multiple rotations. The reflector 5 on the rotor 206 of the rotary table 201 in FIG. 14 can be part of a test body described in the general part of the description, for example part of the test body 1 from FIG. 2 or of the test body 101 from FIG. 3 or of the test body 100 from FIG. 4 or of the test body 102 from FIG. 5 or of the test body 103 from FIG. 6, wherein the reference sign 500 should replace reference sign 5 when a test body in accordance with FIG. 4, 5 or 6 is used. Expressed differently, a test body which is conjointly rotating with the rotor 206 and which has a reflector 5 or 500, to which a measurement beam is directed using an autocollimator 88, can be positioned on the rotor 206.

Figure 15:
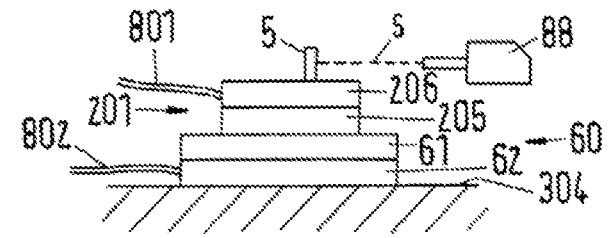
FIG. 15 shows an arrangement with a rotational device and a reference rotational device.

FIG. 15 shows an arrangement in which the rotary table 201 was rotated by 180° in comparison with FIG. 14. The rotor 205 of the rotary table 201 is the second part in this case (by contrast, part 205 is a stator in FIG. 14) and the rotor 205 is connected in a conjointly rotating manner to the rotor 61 (third part) of the reference rotary table 60. The advantage over the setup of FIG. 14 is as follows: the method for establishing an error of a rotational position establishment system of the rotary table 201, as described in this invention, can be performed in such a way that the stator 206 cannot be twisted in relation to the stator 62, or only by a little, and the problem of the winding of the cable 801 described in FIG. 14 is avoided. By contrast, the rotor 61 and the rotor 205 coupled thereto in a conjointly rotating manner can be rotated by any angle and in any direction relative to the stator 62 and relative to the stator 206. As in FIG. 14, the setup of FIG. 15 can also be modified in such a way that the rotary table 201 is arranged at the bottom and the reference rotary table 60 is arranged at the top, wherein the stators 62 and 206 are respectively arranged right at the bottom and right at the top, i.e. the overall setup of FIG. 15 could be rotated by 180° such that it is upside-down, with the exception of the reflector 5 which would then be arranged on the stator 62 of the reference rotary table 60.

Figure 16:
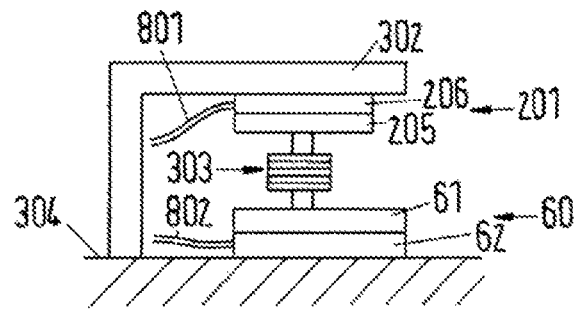
FIG. 16 shows an arrangement with a rotational device and a reference rotational device.

FIG. 16 shows a setup in which no rotational position establishment apparatus 88, i.e., in particular, no autocollimator 88, is required for performing a method for establishing an error of the rotational position establishment system of the rotary table 201. The meaning of the parts 61, 62, 205, 206 is the same as in FIG. 15. In this embodiment, the stator 206 of the rotary table 201 is connected to a substrate 304 in a conjointly rotating manner by way of a support 302. The stator 62 of the reference rotary table 60 is also arranged on the substrate 304 in a conjointly rotating manner such that, overall, the stators 62 and 206 undergo conjoint rotation. The rotors 61, 205 are connected to one another by means of a rotationally rigid coupling 303 and the rotors 61, 205 can be twisted synchronously in relation to their respective stators. Here, it is sufficient if one of the rotors 61 or 205 is driven and the respective other rotor is driven by way of the rotationally rigid coupling 303. The arrangement of FIG. 16 is suitable for performing variant e) of the method for the error establishment described in the general part of the description. In this variant, the resultant rotational positions of the first part 206 and of the fourth part 62 are not changed, i.e. part 206 is not rotated relative to part 62. In this case, it is not necessary to determine the unchanged rotational position of the first part 206 and of the fourth part 62 relative to one another by means of an external establishment apparatus 88 as the two parts 62 and 206 are rotated conjointly in relation to one another as a result of a mechanical connection by way of the support 302. By way of example, the rotationally rigid coupling 303 can be a bellows coupling, a claw coupling or a (double) Cardan-type joint. If one rotary table drives the other, as mentioned above, tension is avoided. Like in FIG. 15, the rotary table 201 could also be arranged at the bottom in FIG. 16 and the reference rotary table 60 could be arranged at the top, wherein, once again, the two stators 62 and 206 would be connected in a conjointly rotating manner to one another by way of the support 302 and the substrate 304. In this variant, the stator 62 of the reference rotary table 60 would be attached to the support 302 and the stator 206 of the rotary table 201 would be positioned on the substrate 304. In FIG. 16 and the variant just described, the two rotors are connected in a conjointly rotating manner by way of the coupling 303. There likewise are the two variants in which the two stators are connected in a conjointly rotating manner to one another by way of the coupling 303 and the rotors are connected in a conjointly rotating manner to one another by way of the support 302 and the substrate 304, wherein the disadvantages of the cable guide occur due to co-rotating cables.

Figure 17:
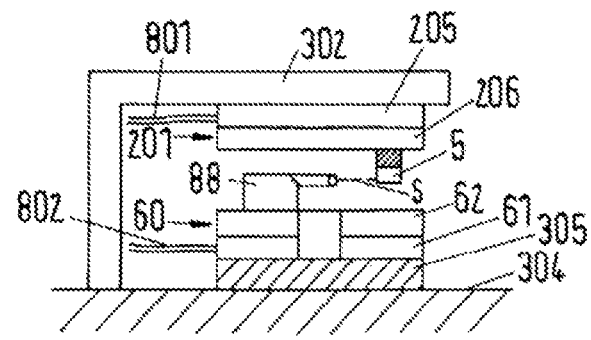
FIG. 17 shows an arrangement with a rotational device and a reference rotational device.

In FIG. 17, the stator 61 of a reference rotary table is placed on a pedestal 305, which in turn is placed on a substrate 304. The stator 61 is the third part within the meaning of the general description. An autocollimator 88 is positioned on the rotor 62 of the reference rotary table 60 (fourth part within the meaning of the general description). The measurement beam S of the autocollimator 88 is directed to a mirror 5 which is fastened to a rotor 206 of a rotary table 201. The rotor 206 is the first part within the meaning of the general description. The stator 205 (second part within the meaning of the general description) is attached to a support 302 which is connected to the substrate 304. The resultant rotational position of the first part 206 and of the fourth part 62, which are both rotors in this example, is determined with the aid of the autocollimator 88. It is likewise possible to use the AKF 88 to establish a change in the rotational position of the rotor 206 relative to the rotor 62 after varying the rotational positions of the rotary table 201 and of the reference rotary table 60, or an unchanged position of the parts 62 and 206 relative to one another can be determined using the ATF 88. Variations are also feasible in the setup of FIG. 17. By way of example, the ATF 88 could be attached to the rotor 206 and the mirror 5 could be attached to the rotor 62. Also, the reference rotary table 60 could be positioned at the top and the rotary table 201 could be positioned at the bottom, wherein the stator 61 of the reference rotary table 60 would then be fastened to the support 302 and the stator 205 of the rotary table 201 would be fastened to the pedestal 305 or to the substrate 304. In further variants, rotor and stator could be interchanged, i.e. parts 62 and 206 could respectively be a stator, wherein disadvantages of the cable guide occur due to co-rotating cables.

The rotational direction of a rotary table can be defined within a rotary table-inherent coordinate system in such a way that, in the case of a suspended rotary table, as shown by reference sign 201 in FIGS. 16 and 17, the positive rotational axis direction points downward and, in the case of a standing rotary table, as shown by reference sign 60 in FIGS. 16 and 17, it points upward.

Figure 18:
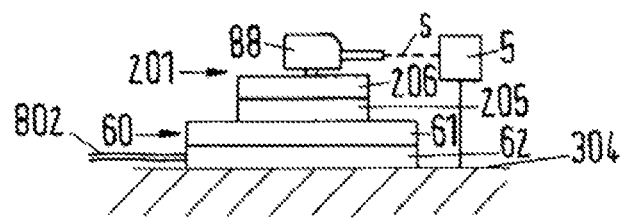
FIG. 18 shows an arrangement with a rotational device and a reference rotational device.

FIG. 18 constitutes a variant of the setup from FIG. 15. In this case, the ATF 88 is positioned on the rotor 206 of the rotary table 201 and can therefore co-rotate with the rotor 206. The mirror 5 is fastened on the substrate 304 in a manner stationary in relation to the stator 62 of the reference rotary table 60. By way of example, the setup of FIG. 15 can be modified in this manner: the ATF 88 can be attached to the part 206 and the reflector 5 can be attached to the substrate 304.

Figure 19:
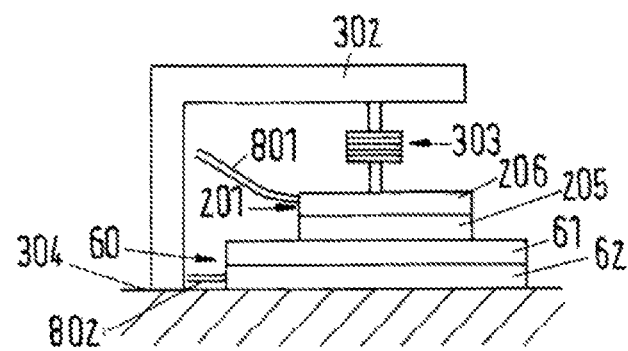
FIG. 19 shows an arrangement with a rotational device and a reference rotational device.

FIG. 19 constitutes a variant of the arrangement from FIG. 16. In this case, the rotationally rigid coupling 303 is positioned between the support 302 and the stator 206 (the first part within the meaning of the general description in this case). Like in the setup from FIG. 16, no rotational position establishment apparatus, i.e., in particular, no ATF 88, is required in the setup in relation to FIG. 19.

FIG. 20 shows an embodiment where the rotational axis D of a rotational device 201 and the reference rotational axis R of a reference rotational device 60 are not coaxial or not flush with one another, but rather arranged next to one another. A reference rotary table 60 is positioned on the substrate 304 with a stator 61 (third part within the meaning of the general description) and a rotary table 201 is positioned on the substrate 304 with the stator 205 (second part within the meaning of the general description) thereof. The two stators 61 and 205 rotate in a conjoint manner in relation to one another. An autocollimator 88 is positioned on the rotor (rotary plate) of the reference rotary table 60. The rotor 62 is the fourth part within the meaning of the general description. A mirror 5, onto which the measurement beam S of the autocollimator is directed, is positioned on the rotor (rotary plate) 206 of the rotary table 201. The rotor 206 is the first part within the meaning of the general description.

Figure 20A:
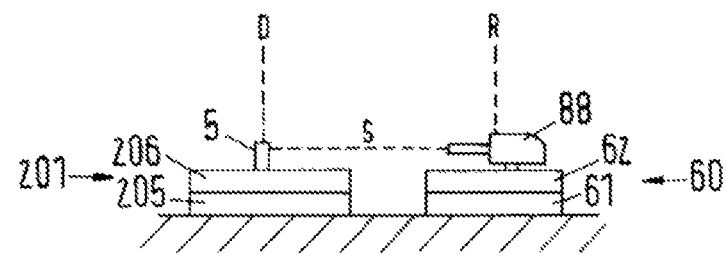
FIG. 20 shows an arrangement with a rotational device and a reference rotational device.
Figure 20B:
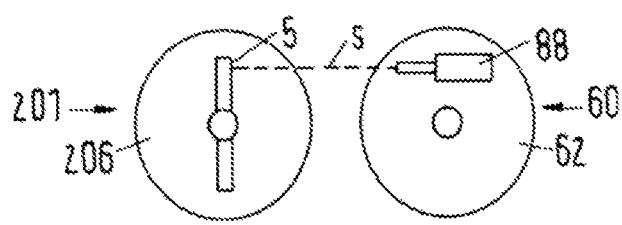
Figure 20C:
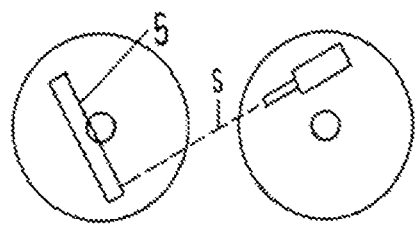

FIG. 20b shows a plan view of the arrangement from FIG. 20a, wherein the rotary table 201 and the reference rotary table 60 are situated in a first rotational position. FIG. 20c likewise shows a plan view of the arrangement, wherein the reference rotary table 60 and the rotary table 201 were brought into a second rotational position compared to FIG. 20b. Both rotary plates (in general: rotors) 62 and 206 were rotated in the same direction, in this case counterclockwise in the plan view. In this arrangement, a measurement over a restricted angular range is possible until the measurement beam S is no longer incident on the mirror 5. Using the autocollimator 88, it is possible to register a different rotational angle of the rotary plate 206 compared to the rotational angle of the rotary plate 62, or it is possible to determine that both plates or rotors 62 and 206 were twisted by the same angle. In the method for establishing one or more errors of a rotational position establishment system, which is described in the general description, this corresponds to method variants d) and e). In a development of the arrangement of FIG. 20, rotor and stator could be interchanged in the rotary table 201 and/or in the reference rotary table 60, i.e. one or both of the rotary plates 62 and 206 could be positioned on the substrate.

Figure 21A:
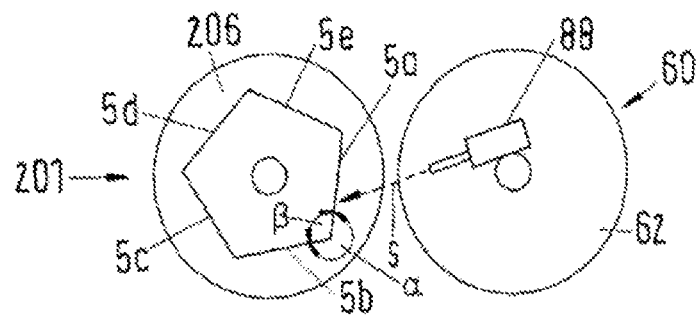
FIG. 21 shows an arrangement with a rotational device and a reference rotational device.
Figure 21B:
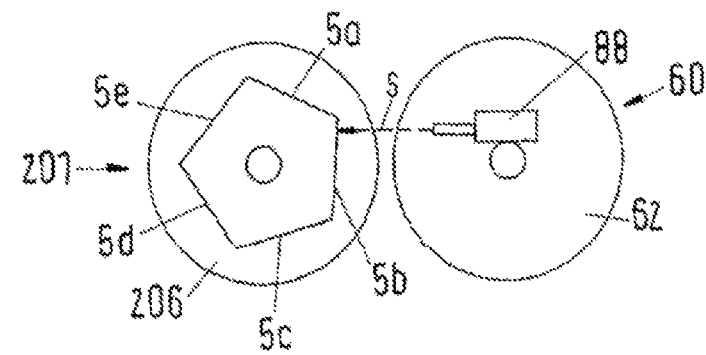

FIG. 21 shows an arrangement of a reference rotary table 60 and a rotary table 201, like in FIG. 20. In this case, a prism with a pentagon-shaped base area, the side faces of which are mirrored, is used instead of a single plane mirror 5. Thus, overall, 5 reflectors 5a, 5b, 5c, 5d, 5e are present which are applied to the side faces of the pentagon-shaped prism and are at an angle of $$\alpha=360°-[(N-2)/N]*180°$$

with N=5, i.e. at an angle of $$\alpha=360°-[(5-2)/5]*180°=360°-108°=252°$$

in relation to one another. The angle β plotted in FIG. 21 specifies the internal angle of the pentagon, which is $\beta=[(5-2)/5]*180°=108°$. In the arrangement of FIG. 21, a rotation of the rotary plate 206 about larger angles in comparison with FIG. 20 is possible. In principle, there can be full rotations about 360° of the rotary table 206. As soon as one of the mirrors or one of the mirrored side faces of the prism, e.g. the mirror face 5a, leaves the measurement beam S of the autocollimator, the next adjacent mirror face—the mirror face 5b in the case of a counterclockwise rotation—is rotated into the measurement beam S of the autocollimator and the measurement can be continued, as shown in FIG. 21b.

Using the arrangement of FIG. 21, it is also possible to carry out a method in which the method with steps a) to d) and/or e) according to the general part of the description is performed, wherein, when this method is carried out, the measurement beam of the autocollimator 88 is directed to one of the mirror faces, e.g. 5a. The AKF on the rotor 62 can be displaced in such a way that the measurement beam points 180° in the opposite direction and, subsequently, the rotor 62 can be rotated by 180° such that the beam S is once again, like previously, incident on the mirror face.

Subsequently, method steps d) and/or e), which are described in the general part of the description, can be carried out anew. This method can be combined with a rotation of the rotary plate 206 and the measurement of further mirror faces, as described above. This procedure is referred to as a flipping-over measurement, deviating from the procedure otherwise referred to as flipping-over measurement, which is only referred to as "flipping-over" following a rotation about 180°.

Figure 22A:
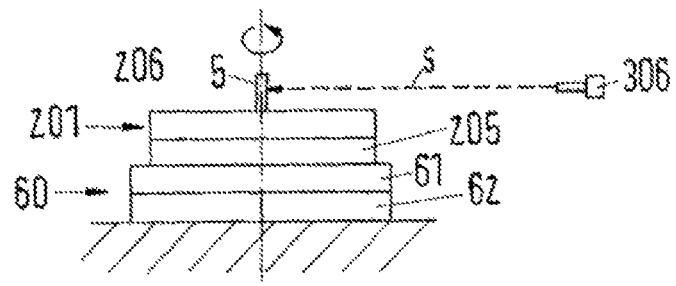
FIG. 22 shows an arrangement with a rotational device and a reference rotational device.
Figure 22B:
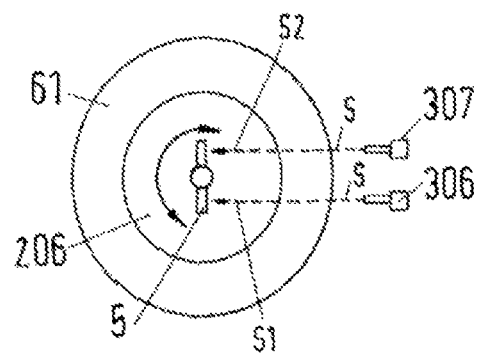

In two different views—once from the side in FIG. 22a and once from above in FIG. 22b—FIG. 22 shows a setup analogous to FIG. 14, wherein, in contrast to FIG. 14, a rotary angle is not measured by an autocollimator 88 but by using two distance sensors 306 and 307, the measurement beams S1 and S2 of which are directed to the reflector 5. By using two sensors 306 and 307, which are arranged next to one another and preferably arranged level with one another and preferably arranged at the same distance from the reflector 5, it is possible to distinguish between translation movements of the reflector 5 and rotation movements of the reflector 5 since, in the case of a rotation of the reflector 5, the distance to one of the sensors is reduced and the distance to the respective other sensor is increased.

Figure 23:
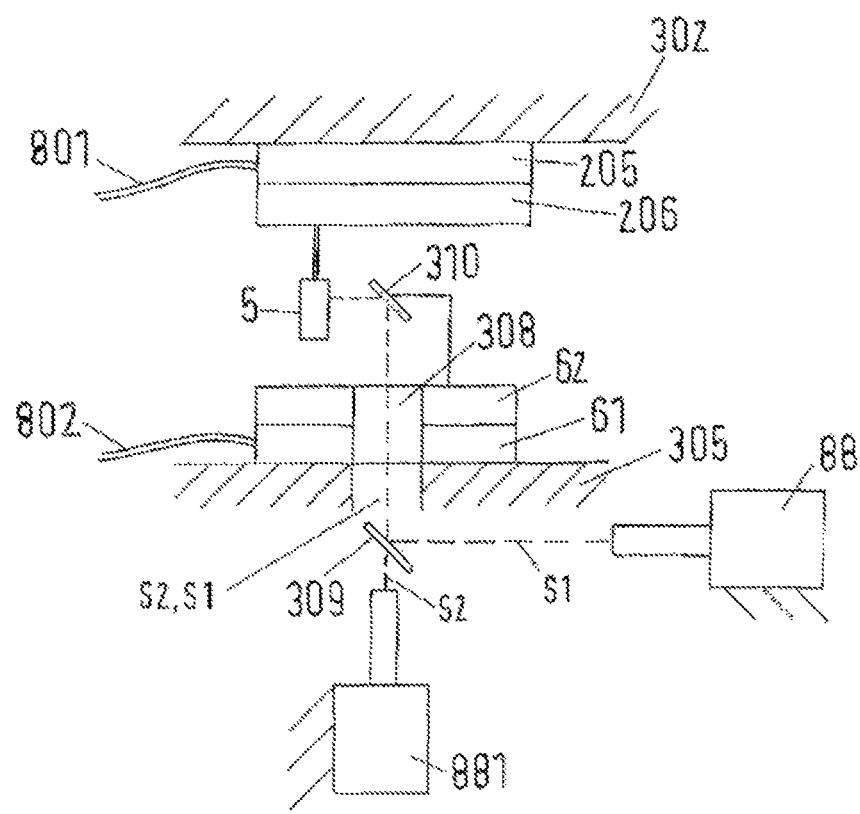
FIG. 23 shows an arrangement with a rotational device and a reference rotational device.

FIG. 23 shows a setup analogous to FIG. 17, where no AKF 88 which co-rotates with the rotor 62 is provided. Rather, provision is made either for an AKF 88 or an AKF 881, which are both plotted but used alternatively. The measurement beam S1 of the AKF 88 is incident on the mirror 309 and is deflected by the mirror 309 through the concentric passage bore 308 onto the mirror 310, and from there to the mirror 5. If the AKF 881 is used instead of the AKF 88, the mirror 309 is dispensed with and the measurement beam S2 of the AKF 881 passes directly through the concentric passage bore 308 and is deflected to the mirror 5 by the mirror 310. The measurement with two AKFs 88 and 881 would also be conceivable, wherein the mirror 309 would then have to have a semi-transparent embodiment. The measurement accuracy could be increased by using two AKFs 88 and 881.

FIG. 24 elucidates the principle of a flipping-over measurement which was already mentioned in the general part of the description. In order to compensate for residual errors of the angle calibration type, the basic method for establishing the error of a rotational position establishment system, with steps a) to e) and as described in the general description, can be applied using the test body described herein with a plurality of reflector layers, which are preferably distributed uniformly, and by using multiple measurements in a so-called flipping-over measurement. Causes for possible residual errors can lie in the type of setup, the arrangement of the employed components and/or systematic residual errors of the measuring system of the reference rotational device 60, or lie in further sources of error.

In FIG. 24, a setup analogous to FIG. 14 is used, wherein use is made of a test body 106 which has two reflectors 5a and 5b as first and second test elements. The reflectors 5a and 5b point in opposite spatial directions, i.e. in directions that are at 180° to one another.

Figure 24A:
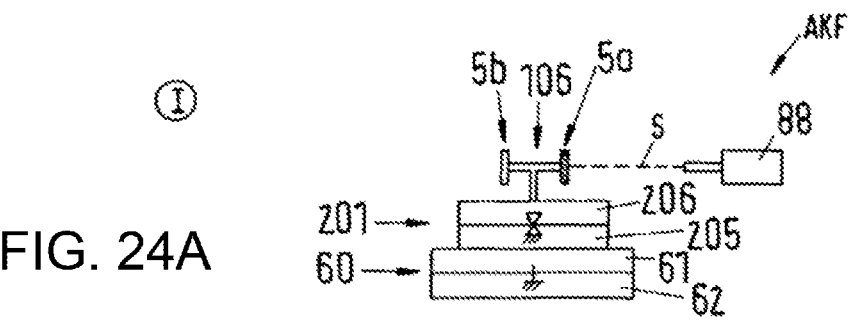
FIG. 24 shows an arrangement for undertaking a flipping-over measurement using the method according to the invention.
Figure 24B:
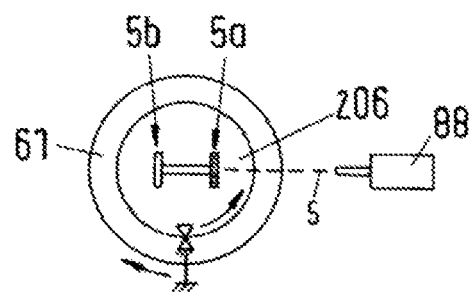

Here, the flipping-over measurement can be performed as follows:

In a first measurement, shown in two different views (from the side and from above) in FIG. 24a and FIG. 24b, the rotary table 201 is set to a start position (first rotational position), for example the reference marker or zero marker of the rotational position establishment system of the rotary table 201. In FIG. 24a, the start position is symbolically depicted on the stator 205 and on the rotor 206 by two wedge-shaped markings. The reference rotary table 60 is positioned in such a way that it is possible to measure in the direction of the mirror 5a using the AKF 88, i.e. the measurement beam S is incident on the mirror 5a and then returns or is reflected back to the AKF.

The rotational position of the reference table 60 is likewise set to a start position (first rotational position), for example the reference marker or zero marker of the rotational position establishment system of the reference rotary table 60. In FIG. 24a, the start position is symbolically depicted on the stator 62 and on the rotor 61 by two line-shaped markings.

Now the actual measurement, in which the rotor 206 of the rotational device 201 and the rotor 61 of the reference rotational device 60 are rotated in different directions in relation to one another, depicted by arrows in FIG. 24b, is implemented. Using the AKF 88, the rotational position error of the rotational position establishment system of the rotary table 201 is established. To this end, reference is made to the description of steps d) and e) of the method for establishing the error of the rotational position establishment system.

Figure 24C:
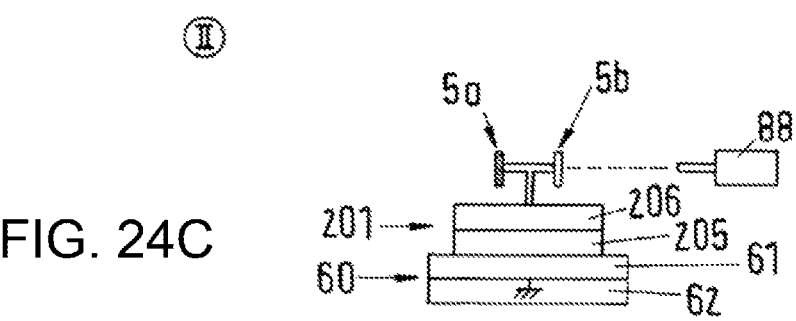
Figure 24D:
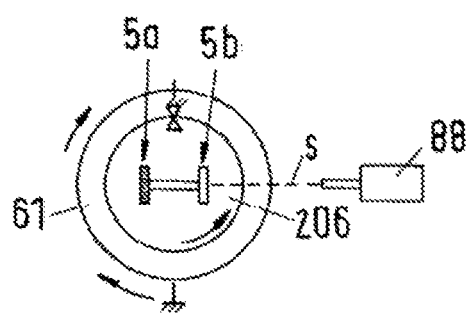

For a second measurement, which is shown in FIG. 24c and FIG. 24d, a modified first rotational position is established as follows in the reference rotary table: the rotor 61 is twisted by 180° (360°/M with M=2) compared to the position shown in FIG. 24b. In this modified first rotational position, it is once again possible to set a reference marker or zero marker of the rotational position establishment system of the reference rotary table 60 (in the controller of the rotary table 60) as a start point for the measurement, or the newly set angle of 180° of the reference rotary table is noted as the offset angle of the reference rotary table and taken into account. Starting from this start point, when once again establishing the error of the rotational position establishment system, the rotor 61 of the reference rotary table 60 can be rotated about a whole rotation of 360°, for example from 180° to 540° or from −180° to 180° in the case of a 180° offset and in the case of a positive rotation of the reference rotary table—if the reference rotary table rotates in the negative direction, the rotation occurs e.g. from 180° to −180° or from −180° to −540°.

The whole rotary table 201 was rotated together with the rotor 61 such that now—as depicted in FIG. 24c/d—the measurement beam S of the AKF 88 is incident on the mirror 5b instead of on the mirror 5a. The start position or first rotational position of the rotary table 201, i.e. the position of the rotor 206 in relation to the stator 205, is unchanged, as is visible in FIG. 24d on the basis of the symbolic wedge-shaped markings (in FIG. 24c, these lie covered on the rear side).

A modified rotational position of the first part 206 and of the fourth part 62 relative to one another is obtained as a result of the modified first rotational position of the reference rotary table 60. In this case, the fourth part is twisted relative to the first part by an angle value of 360°/2 compared to the first resultant rotational position of the first part 206 and of the fourth part 62 relative to one another, which is shown in FIG. 24a/b.

Proceeding from the rotational position shown in FIG. 24c/d, the error of the rotational position establishment system of the rotary table 201 can be established anew, wherein reference is made to the description of steps d) and e) of the method for establishing the error of the rotational position establishment system.

The measurement using the setup according to FIG. 24a/24b is referred to as "measurement 1" and the new measurement proceeding from the setup of FIG. 24c/24d is referred to as "measurement 2". After implemented measurements 1 and 2, the measured angle position errors of the rotary table 201 from measurements 1 and 2 are combined in a suitable manner by calculation, wherein the forming of an average taking into account the rotary angle of the rotational device 201 is preferred. Other ways of combining the individual measurements by calculation are feasible.

This method can be performed with any number of mirror faces, for example with five mirror faces, as shown in FIG. 21. By way of example, use can be made of N mirror faces, which are preferably at an angle of $\alpha=360°-[(N-2)/N]*180°$ in relation to one another, where N is an integer greater than or equal to 3. In principle, the following applies here: the greater the number of measurements is, the more error components can be eliminated by this principle of the multiple measurement. Using two measurements, it is possible to eliminate errors due to the aforementioned causes, which would be noticeable in the first error harmonics (these are also referred to as first order errors). Using four measurements, the first and the second errors harmonics are eliminated; using six measurements, the first to the third error harmonics inclusive are eliminated, etc. For four measurements, use can be made of e.g. a test body with a prism with a square base area (which can also be referred to as cube or cuboid), wherein the side faces of the prism are mirrored. For five measurements, use can be made of a prism with a pentagon-shaped base area, the side faces of which are mirrored. For six measurements, use can be made of a prism with a hexagon-shaped base area, the side faces of which are mirrored, etc.

Figure 25:
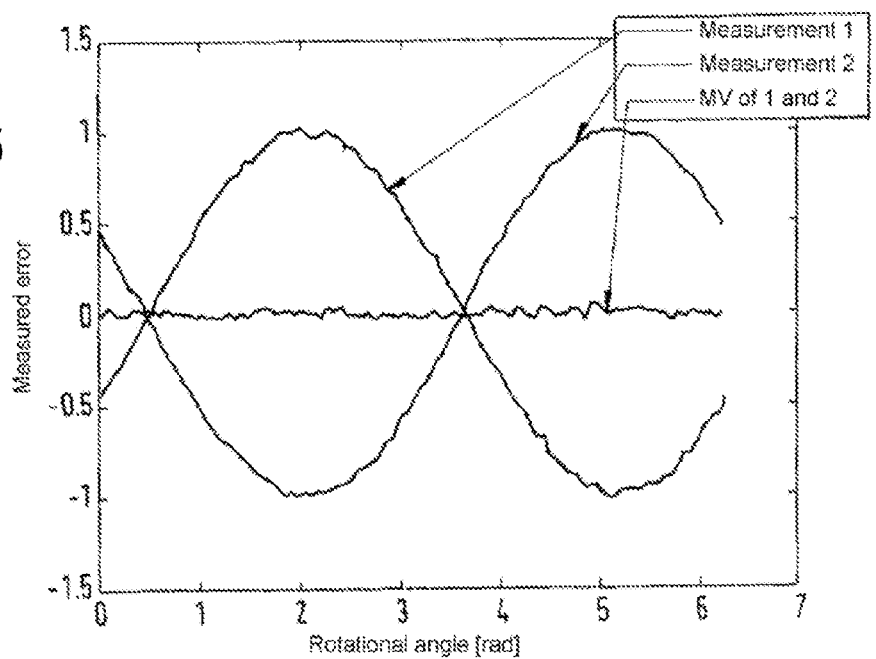
FIG. 25 shows an error correction curve from a flipping-over measurement.
Figure 26:
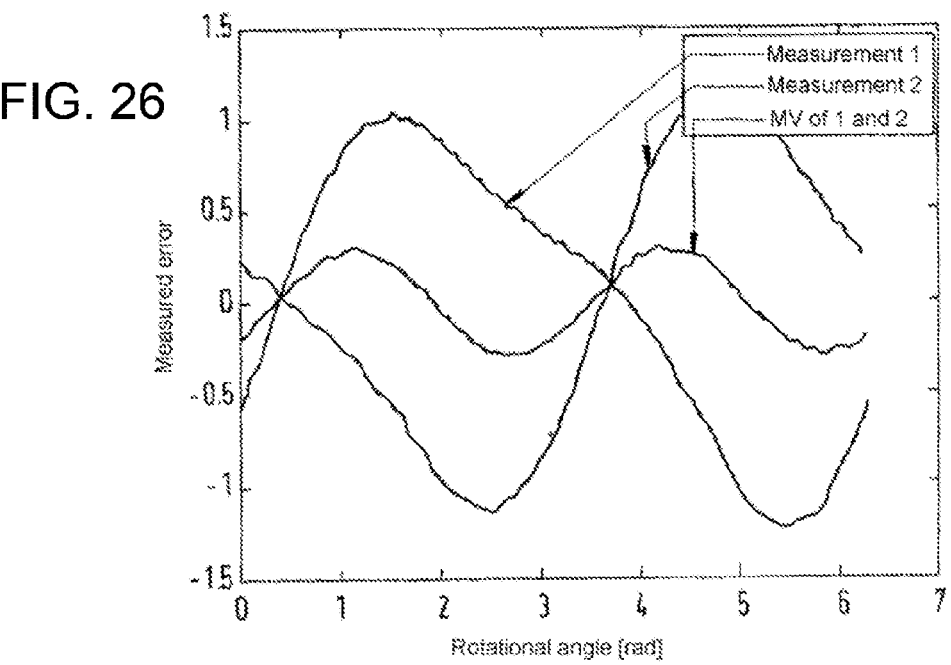
FIG. 26 shows an error correction curve from a flipping-over measurement.

The results of the exemplary flipping-over measurement for the mirrors 5a and 5b in accordance with FIG. 24 are depicted in FIGS. 25 and 26. In the measured error signal in FIG. 25, only the first error harmonic was contained and it could be eliminated apart from residual noise. The residual noise is the sought-after position error without the residual errors of the setup. In FIG. 26, the second error harmonic was additionally contained and this could not be eliminated in the case of the flipping-over measurement using two measurements.

Figure 27:
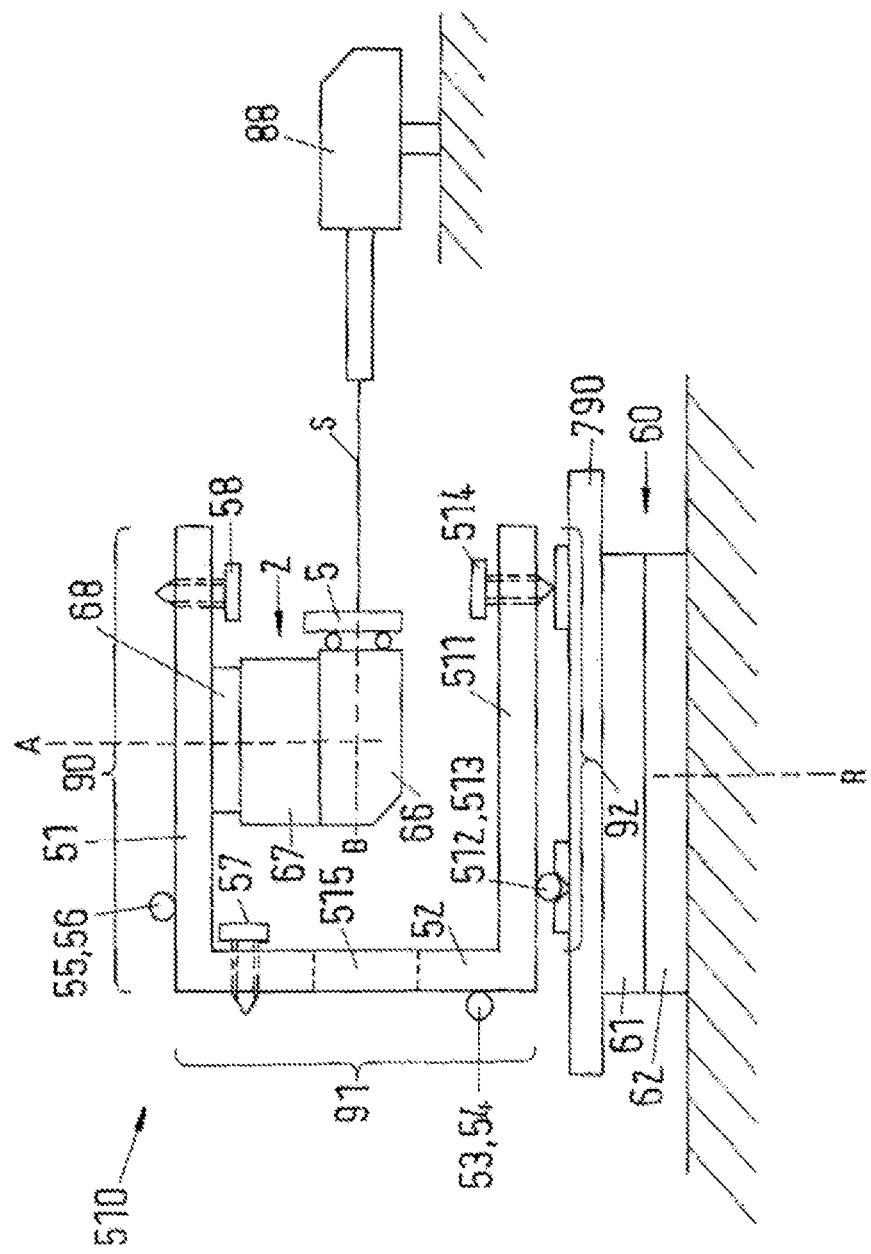
FIG. 27 shows an embodiment of a holding element, arranged in a measurement setup.

FIG. 27 shows a holding element, in which the support has a third limb 511 in addition to the first limb 51 and the second limb 52. The third limb 511 has a coupling region 92, which is referred to as a third coupling region and by means of which the holding element 510 is coupleable to the base 61. In this case, a plane disk 790 is attached to the rotor 61 of the reference rotary table 60, on which plane disk the holding element 510 with the third coupling element 92 has been placed. The third coupling region 92 has coupling means 512, 513 and 514, which are analogous to the coupling means 55, 56 and 58 of the first coupling region 90 and to the coupling means 53, 54 and 57 of the second coupling region 91. These coupling means were already explained on the basis of FIG. 10. In this exemplary embodiment, the coupling means 512 and 513 are spherical elements, wherein, in the selected perspective, the element 513 is covered by the element 512 lying at the front. Together with a knurled screw 514, the sphere-shaped elements 512 and 513 form a three-point bearing. The spheres 512 and 513 can, together with the bearing point in the screw 514, lie on the corners of a notional equilateral or isosceles triangle, with this not being mandatory. Likewise, the coupling means 55, 56, 58 or the coupling means 53, 54, 57 can lie on the corners of an equilateral or isosceles triangle. Together, the limbs 51, 52 and 511 from a C-shaped support. This embodiment is particularly advantageous for CAA data recording of the shown A-axis of a rotary pivot joint 2 in the subsequent installation position thereof. The position of the rotary pivot joint 2 shown in FIG. 27 corresponds to the subsequent installation position during the measurement operation, for example on a sleeve of a coordinate measuring machine. A method for recording the rotational position error of axis B was described on the basis of FIG. 10; this can also be performed analogously for the A-axis. In this method, the C-shaped support rotates together with the rotor or rotary plate of the reference rotary table 60 about the rotational axis R of the reference rotary table 60. The part 66 is rotated about the axis A in the opposite rotational direction if the rotation about R and about A is observed along the axes from the same direction of view, for example from above.

In the case of a rotation, the terms "co-rotating" or "same direction" and "counter rotating" or "opposite direction" generally assume the same observation position, i.e. the same observation position of an external stationary observer, wherein the observation position of the external stationary observer is also referred to as "inert system". The rotational movement of the holding element 510 leads to the limb 52 being moved into the measurement beam S of the AKF 88 and covering the measurement beam in the case of a solid limb 52 such that said measurement beam is no longer incident on the mirror 5. By way of example, the following solutions exist for this problem:

- The perpendicular limb 52 contains a perforation 515, which is depicted in FIG. 27 by two horizontal dashed lines. As a result, the width of the shadowing of the beam S is reduced. The sealed regions could remain unconsidered and be interpolated in a CAA correction field.
- The shadowed regions could therefore lie between the support positions in the case of a large support position width, i.e. in the case of a large distance between the angle positions driven to during the method.
- The perpendicular struts, i.e. the regions of the limb 52, which lie between the edge of the recess 515 and the lateral outer edge of the limb 52, could be embodied to be so narrow that the aperture of the AKF 88 is not completely covered, and so measurements can nevertheless be performed. This is conceivable, in particular, if a tripod is used instead of a C-shaped support, in which the perpendicular supports can be narrow.
- In the method, it is not always necessary to perform full rotations of the rotor 61, i.e. it is not always necessary to measure 360°. Moreover, the rotary pivot joint 2 can have a rotational range about the axis A which cannot be approached and in which the limb 52 could be arranged.
- The method could be performed using two AKFs, which observe the rotary pivot joint 2 from two different directions.
- The beam S could be deflected by deflection mirrors onto the mirror 5, i.e. it could be guided past the limb 52 which interrupts the straight-line path of the measurement beam S.

The above-described problem of the measurement beam S being covered can occur not only in the C-shaped support from FIG. 27 but also in different types of support which could cover the measurement beam S when they are rotated accordingly. By way of example, the limb 51 in FIG. 10 could interrupt the measurement beam S, which is incident on the mirror 5 coming from the AKF 88, in the case of a corresponding rotation of the holding element 50 about the axis R. One or more of the above solutions could also be applied in this embodiment of FIG. 10. In very general terms and detached from the specific exemplary embodiment, the support of a holding element according to the invention can have one or more perforations for a measurement beam. One or more perforations can respectively be provided in one of more of the coupling regions. However, the geometry and dimensions of the limbs could otherwise also be selected in such a way that no interruption of the beam occurs.

In another arrangement of the holding element 510 on the rotor 61 of the reference rotary table 60, the B-axis can be measured according to an analogous method as for the A-axis. To this end, the holding element 510 can be placed onto the surface of the plane disk 790 by means of the coupling region 91; i.e. it can be rotated 90° counterclockwise in the depicted perspective. Subsequently, the mirror 5 is reoriented in such a way that the measurement beam S of the AKF 88 is incident thereon in the same way as shown in FIG. 27. As depicted in FIG. 27, the mirror 5 could thus be covered either by the limb 51 or by the limb 511, depending on the rotational position of the holding element 510. In order to avoid this, it is possible either to apply one of the solutions proposed above, e.g. respectively provide a perforation in the limb 51 and in the limb 511 (not depicted here) or the mirror 5 can be positioned so far toward the top together with the AKF 88 that it projects beyond the limbs 51 and 511. To this end, use can be made of e.g. a test body, as shown e.g. in FIG. 10 by means of the reference sign 1, where the mirror 5 is attached at a fitting level to a holder 3.

FIGS. 28 and 29 show elements of an alternative apparatus for supplying energy to the rotational device 2. An energy supply 69, as shown in FIGS. 10 and 11, can be replaced by these elements 690 and 691. The part 690 or 690' from FIG. 28 is combinable with the part 691 or 691' from FIG. 29 so as to form a plug-in or latching connection. By way of example, an element 690 can be provided in one or more of the above-described coupling regions 90, 91 or 92 (see FIG. 11 and FIG. 27 of a holding element 50 or 510). Preferably, respectively one element 690 is provided in each one of the coupling regions 90, 91 and 92. By way of example, a first plug-in element 690 is arranged on the outer side of the limb 51, i.e. on the side of the limb 51, which faces the base 61. Hence, the plug-in element 690 is situated in the coupling region 90. When using the element 690 in a coupling region 90, it is possible to dispense with the coupling means 55, 56 and 58 since the coupling means 55, 56 and 58 are replaced by the means 692, 693 and 694. The analogous principle can be applied to other limbs/in different coupling regions.

In this example, a second element 691 is arranged at the base and shown in FIG. 29. When the holding element 50 is placed onto the base 61, the elements 690 and 691 are connected to one another. The element 690 for a plug-connection has bearing means 692, 693, 694 (694 is covered by the centrally raised male connector part). The bearing means have a form shaped like a hemisphere. The bearing means 692, 693, 694 can be means of a three-point bearing, which can be used as an alternative to the above-described coupling means 55, 56, 58. Moreover, clamping/latching means 695, 696 in the form of hemispheres are provided for a bayonet closure. A further, third latching means is covered in this view. The plug-in connection element 690 has a multiplicity of contacts 697 for transmitting energy and measurement system signals. A metal plate 698 is provided for interacting with a magnet 917 which is provided on the other complementary connector part 691 in order to exert a pulling force. As a result, contacting can be ensured in addition to the bayonet closure. The plug-in element 690 shown in FIG. 28 can also be provided in an analogous fashion to the rotational device 2 and is denoted by the reference sign 690' in this case for distinguishing purposes. If an element 690' is provided at the rotational device 2, then the holder 68 (see FIG. 11) for the rotational device 2 has a plug-in connection element 691', as shown in FIG. 29. The holder 68 can itself be embodied as plug-in connection element 691'.

FIG. 29 shows the already mentioned plug-in connection element 691 or 691' which is provided at the base 61 and/or at the holding element 50 on the side of a holder 68. The plug-in connection part 691/691' has counter bearing means 910, 911, 912, which are embodied as hemisphere pairs. The counter bearing means 910, 911, 912 serve to receive the bearing means 692, 693 and 694 from FIG. 28. Furthermore, a bayonet with the recesses 913, 914 and 915 is present, into which the elements 695, 696 and the further element (not shown) from FIG. 28 are insertable. A multiplicity of counter contacts 916 are connectable to the contacts 697 from FIG. 28 for establishing the contacting. A magnet 917, which interacts with the metal plate 698 from FIG. 28, is provided in the center of the plug-in connection element 691.

A plug-in connection made of parts 690 and 691 can also be used to include other components, which require an energy supply, into a measurement setup. By way of example, an AKF 88 can be connected to a rotatable part of a rotational device by means of such a plug-in connection, for example if an AKF is intended to be connected to a rotor 62 or 206, as depicted in FIGS. 17 and 18.

FIGS. 31 and 32 show the use of a holding element 520 for holding a sensor arrangement 750 which has a plurality of sensors 73, 74, 75, 76, 77, wherein the sensors are configured to measure deviations in respect of at least one degree of freedom of movement of the rotational device 2. The rotational device is a rotary pivot joint 2 with two rotational axes A, B. Such a rotary pivot joint 2 was already explained in FIGS. 10-12. However, in this example the rotary pivot joint 2 is not attached to the holding element 520, as is the case in FIGS. 10-12, but rather to a perpendicular sleeve 590 of a coordinate measuring machine not depicted in any more detail. Here, the rotary pivot joint 2 is situated in its installed position for future measurements.

In terms of the setup thereof, the sensor arrangement 750 in FIGS. 31 and 32 was already described in FIGS. 12 and 13. The arrangement has a sensor holder 72 and sensors 73, 74, 75, 76, 77. The sensors 73, 74, 75, 76, 77 are attached to the sensor holder 72, which has three walls which are perpendicular to one another. In a first spatial direction, the sensors 73, 74 point to the spheres 8 and 9 of a test body 107 (not according to the invention); the sensors 75, 76 point to the spheres 8 and 9 of the test body 107 in a second spatial direction. In the selected perspective of FIGS. 30 and 31, the sensors 75, 76 are behind the spheres 8, 9 and therefore drawn with dashed lines. The sensor 77 points to the sphere 9 in a third spatial direction. The spatial directions can be the axes of a Cartesian coordinate system, wherein the assignment to one of the axes X, Y and Z depends on the location of the coordinate system and the current orientation of the holding element 520 and the sensor arrangement 750 connected therewith.

In contrast to FIG. 12, the sensor arrangement 750 is attached to the holding element 520 in FIGS. 30 and 31 by virtue of the sensor holder 72 being connected to the holder 68. Apparatuses for the energy or data transmission from or to the sensors 73, 74, 75, 76, 77 and an evaluation unit are not depicted in FIGS. 30 and 31.

Like the holding element 50 in FIGS. 10-12, the holding element 520 also has two limbs 51 and 52. The coupling regions 901 and 902 have a slightly different design to the coupling regions 90 and 91 in FIGS. 10-12. In FIGS. 10-12, the bearing elements 53, 54, 55, 56 have a hemispherical form, wherein this can in each case be a hemisphere or else a whole sphere which is partly sunk into the limb. The bearing elements 530, 540, 570, 550, 560, 580 have the form of a whole sphere in FIGS. 30 and 31, but that makes no difference to the functioning thereof. Fastening means for fastening the bearing elements 530, 540 and 550, 560, 580 to the limbs are not shown.

The bearing elements 530, 540 and 570 are attached to the limb 52 and form a three-point bearing, wherein only the front element 530 of the bearing elements 530, 540 is visible in the selected perspective. The spherical bearing element 570 is attached to the end of a set screw 585. One or both of the bearing elements 530 and 540 can also be attached to the end of a set screw. Other adjustment possibilities are also possible. In an analogous manner to the limb 52 there are the bearing elements 550, 560 and 580 are attached to the limb 52 and form a three-point bearing, wherein only the front element 550 of the bearing elements 550, 560 is visible in the selected perspective. The spherical bearing element 580 is attached to the end of a set screw 586. One or both of the bearing elements 550 and 560 can also be attached to the end of a set screw.

In FIG. 30, the holding element 520 is coupled to the base 611 by the coupling region 901. The coupling is implemented by way of counter coupling means 612, 613 (covered by 612 in this illustration) and 614, which are attached to the base and interact with the spherical bearing elements 530, 540 and 570. Further counter coupling means can be present on the base in order to establish a different position of the holding element 520. In this example, the base 611 is not the reference rotary table 60 as in FIG. 12, but rather a base, in particular a measuring table, of a CMM. In FIG. 31, the same holding element 520 is coupled to the base 611 in an analogous manner as in FIG. 30, but it is coupled via the coupling region 902 unlike via 901 as in FIG. 30. The coupling in FIG. 31 is likewise implemented by way of the counter coupling means 612, 613 and 614. In FIGS. 30 and 31, dimensions of parts sometimes deviate from one another in the drawn representation, without this being the case in reality. By way of example, the holder 3 is drawn to be shorter in FIG. 31 than in FIG. 30, which is indicated by interruptions in the form of double lines.

As shown in FIGS. 30 and 31, the sensor arrangement 750 can be oriented in such a way that the rotary pivot joint 2, to which the test body 107 is attached with the double sphere 8, 9, can be qualified in the installed position thereof. The position of the rotary pivot joint 2 remains unchanged in FIGS. 30 and 31 and corresponds to the installed position for measurements. Only the arrangement of the test body at the rotary pivot joint 2 is modified and aligned in a manner coaxial either to the A-axis (FIG. 31) or the B-axis (FIG. 30). The alternative ways of fastening a test body to a rotary pivot joint are already shown in FIGS. 10 and 11 in an analogous manner. In FIG. 31, the fastening is implemented with the aid of an adapter 65 which is fastened magnetically to the rotary pivot joint 2. After reorienting the test body 107, the sensor arrangement 750 with the holding element 520 is also oriented in a fitting manner to the test body 107 such that the sensors 73, 74, 75, 76, 77 are aligned toward the spheres 8 and 9 in a fitting manner. Recording of movement errors can be implemented when the test body is rotated about the A-axis or the B-axis.

The invention claimed is:

1. A test body for establishing one or more rotational errors of a rotational device for a coordinate measuring machine, in respect of one or more degrees of freedom of movement, in which a real rotational movement of the rotational device differs from an ideal rotational movement, the test body comprising:
   a holder, rotatable together with part of the rotational device about a rotational axis, the holder configured to arrange or fasten the test body in relation to the rotational axis about which the test body is to be rotated for establishing the rotational error or errors;
   a plurality of test elements rigidly connected to the holder or formed on the holder, each test element of the plurality of test elements being used to establish the rotational error in respect of one or more of the degrees of freedom of movement;
   a first test element of said plurality of test elements selected from the group of:
      a reflector aligned at an angle to the rotational axis and reflecting radiation incident thereon in a direction dependent on the rotational angle of the test body; and
      a first measurement body arranged at least one of at a distance from the rotational axis and in a manner not coaxial with the rotational axis such that the rotational angle of the test body is determinable by an associated sensor or by the measuring system of a coordinate measuring machine on the basis of the rotational position of the test element;
   a second test element of said plurality of test elements selected from the group of:
      a reflector aligned at an angle to the rotational axis and reflecting radiation incident thereon in a direction dependent on the rotational angle of the test body and which, if another reflector which is a test element of the test body is present, is aligned in a different direction to the another reflector and which, if the first test element is selected to be a reflector, can be attached together with the first test element reflector at a common support body;
      a reflector which is aligned in the direction of the rotational axis and which, if the first test element is selected to be a reflector, can be attached together with the first test element reflector at a common support body; and
      a second measurement body including
         a rotationally symmetric measurement body, with which errors in respect of the plurality of translational and rotational degrees of freedom of movement are registrable, the translational errors being related to the Cartesian coordinate axes X, Y and Z and the rotational errors being related to the Cartesian coordinate axes X and Y if the rotational axis of the rotational device is aligned in the Z-direction;
   at least one of the plurality of test elements including a reflector;
   a distance sensor and/or an angle sensor assignable to the reflector; and
   a rotation of the test body about at least one of a rotational axis of the rotational device, one or more axes at an angle to the rotational axis, and an unchanging position of the test body is registrable using the distance sensor and/or the angle sensor;
   distance sensors assignable to the rotationally symmetric measurement body; and
   translational deviations in directions at an angle to the rotational axis are determinable with the distance sensors.

2. The test body as claimed in claim 1, further comprising a pedestal connected to the holder or formed on the holder, the pedestal configured to attach the test body to a rotational device.

3. The test body as claimed in claim 1, further comprising a fastener for fastening or bearing in or on a coordinate measuring machine or for fastening or bearing on a rotational device for a coordinate measuring machine.

4. The test body as claimed in claim 1, wherein the first test element is a measurement body that has one or more reference points determinable with a measuring system of the coordinate measuring machine, such that the rotational angle of the test body is determinable by determining the position of the reference point or points in various rotational positions of the measurement body.

5. The test body as claimed in claim 1,
   wherein the first test element is a reflector aligned at an angle to the rotational axis, the second test element is a reflector aligned at an angle to the rotational axis and there is at least one further reflector as a further test element that is aligned at an angle to the rotational axis, the reflectors being attached to the outer faces of a common polyhedron-shaped support body.

6. The test body as claimed in claim 1, wherein the first test element is a reflector aligned at an angle to the rotational axis and reflecting radiation incident thereon in a direction dependent on the rotational angle of the test body; and
   the second test element is a reflector aligned at an angle to the rotational axis and reflecting radiation incident thereon in a direction dependent on the rotational angle of the test body, and
   wherein a third test element of said plurality of test elements is a rotationally symmetric test element, the axis of symmetry of which is arranged in a manner coaxial with the rotational axis.

7. The test body as claimed in claim 1, wherein said second test element is not a reflector aligned in the direction of the rotational axis, the test body further comprising a third test element including a reflector aligned in the direction of the rotational axis.

8. An arrangement comprising:
   a rotational device;
   a test body as claimed in claim 1, including a distance sensor and/or an angle sensor assigned to the reflector, and distance sensors assigned to the rotationally symmetric measurement body, wherein translational deviations in directions at an angle to the rotational axis are determinable with the distance sensors, said test body arranged at, or fastened to the rotational device; and a plurality of sensors respectively assigned to one or more of the test elements of the test body and configured to measure deviations in respect of at least one of the degrees of freedom of movement.

9. The arrangement as claimed in claim 8, wherein
at least one of the first test element and the second test element of the test body is a reflector;
one or more angle sensors are assigned to the reflector or reflectors; and
the one or more angle sensors are configured to register a rotation of the test body about at least one of:
a rotational axis of the rotational device;
one or more axes at an angle to the rotational axis; and
an unchanging position of the test body.

10. The arrangement as claimed in claim 9, wherein the angle sensor includes at least one of an autocollimator, a laser interferometer and a magnetoresistive angle sensor.

11. The arrangement as claimed in claim 9, wherein one or more distance sensors are assigned to the reflector or reflectors.

12. The arrangement as claimed in claim 8, wherein:
the first test element of the test body is a measurement body arranged at least one of at a distance from the rotational axis and in a manner not coaxial with the rotational axis;
at least one of an optical sensor or a tactile measuring head system of a coordinate measuring machine are assigned to the measurement body;
the at least one of an optical sensor or a tactile measuring head system being configured to register a rotation of the test body about at least one of:
a rotational axis of the rotational device;
one or more axes at an angle to the rotational axis; and
an unchanging position of the test body.

13. The arrangement as claimed in claim 8, wherein:
the test body has a rotationally symmetric measurement body as a test element, the axis of symmetry of which is arranged in a manner coaxial with the rotational axis;
distance sensors are assigned to the rotationally symmetric measurement body; and
translational deviations in directions at an angle to the rotational axis are determined with the distance sensors.

14. A method for establishing rotational errors of a rotational device for a coordinate measuring machine in respect of a plurality of degrees of freedom of movement, in which a real rotational movement of the rotational device differs from an ideal rotational movement, the method comprising the steps of:
providing a test body as claimed in claim 1 arranged at, or fastened to, the rotational device;
rotating the test body about a rotational axis,
establishing rotational errors using a plurality of sensors that are each respectively assigned to one of the test elements of the test body and configured to measure deviations in respect of at least one of the degrees of freedom of movement.

15. The method as claimed in claim 14, further comprising the step of calibrating an angle measuring system of the rotational device using the established rotational errors.

16. The method as claimed in claim 14, wherein at least one of the first test element and the second test element is a reflector as first and one or more angle sensors are assigned to the reflector or reflectors, the method further comprising at least one of the following steps:
registering a rotation of the test body about a rotational axis of the rotational device with the one or more angle sensors; and
registering a rotation of the test body about one or more axes at an angle to the rotational axis with the one or more angle sensors.

17. The method as claimed in claim 16, wherein one or more distance sensors are assigned to the reflector or reflectors, the method further comprising the step of:
establishing one or more translation errors by measuring the distance between the reflector or reflectors and the assigned one or more distance sensors.

18. The method as claimed in claim 14, wherein the test body includes a reflector as a test element and an angle sensor is assigned to the reflector, the method further comprising the step of:
registering, using the angle sensor, a rotation of the test body about at least one of:
a rotational axis of the rotational device;
one or more axes at an angle to the rotational axis; and
an unchanging position of the test body.

19. The method as claimed in claim 14, wherein:
the test body has a rotationally symmetric measurement body as a test element, the axis of symmetry of which is arranged in a manner coaxial with the rotational axis;
distance sensors are assigned to the rotationally symmetric measurement body; and
translational deviations in directions at an angle to the rotational axis are determined with the distance sensors.

20. A test body for establishing one or more rotational errors of a rotational device for a coordinate measuring machine, in respect of one or more degrees of freedom of movement, in which a real rotational movement of the rotational device differs from an ideal rotational movement, the test body comprising:
a holder, rotatable together with part of the rotational device about a rotational axis, the holder configured to arrange or fasten the test body in relation to the rotational axis about which the test body is to be rotated for establishing the rotational error or errors;
a plurality of test elements rigidly connected to the holder or formed on the holder, each test element of the plurality of test elements being used to establish the rotational error in respect of one or more of the degrees of freedom of movement;
a first test element of said plurality of test elements includes a reflector aligned transverse to the rotational axis and reflecting radiation incident on the reflector in a direction dependent on the rotational angle of the test body; and
a second test element of said plurality of test elements includes a rotationally-symmetric measurement body having an axis of symmetry arranged coaxial to the rotational axis;
a distance sensor and/or an angle sensor assignable to the reflector;
a rotation of the test body about at least one of a rotational axis of the rotational device, one or more axes at an angle to the rotational axis, and an unchanging position of the test body is registrable using the distance sensor and/or the angle sensor;
distance sensors assignable to the rotationally symmetric measurement body; and
translational deviations in directions at an angle to the rotational axis are determinable with the distance sensors.

21. A test body for establishing one or more rotational errors of a rotational device for a coordinate measuring machine, in respect of one or more degrees of freedom of movement, in which a real rotational movement of the rotational device differs from an ideal rotational movement, the test body comprising:
- a holder, rotatable together with part of the rotational device about a rotational axis, the holder configured to arrange or fasten the test body in relation to the rotational axis about which the test body is to be rotated for establishing the rotational error or errors;
- a plurality of test elements rigidly connected to the holder or formed on the holder, each test element of the plurality of test elements being used to establish the rotational error in respect of one or more of the degrees of freedom of movement;
- a first test element of said plurality of test elements is a first measurement body arranged at a distance from the rotational axis and in a manner not coaxial with the rotational axis such that the rotational angle of the test body is determinable by an associated sensor or by the measuring system of a coordinate measuring machine on the basis of the rotational position of the test element; and
- a second measurement body including a rotationally symmetric measurement body, with which errors in respect of the plurality of translational and rotational degrees of freedom of movement are registrable, the translational errors being related to the Cartesian coordinate axes X, Y and Z and the rotational errors being related to the Cartesian coordinate axes X and Y if the rotational axis of the rotational device is aligned in the Z-direction;
- distance sensors assignable to the rotationally symmetric measurement body; and
- translational deviations in directions at an angle to the rotational axis are determinable with the distance sensors.

22. A method for establishing rotational errors of a rotational device for a coordinate measuring machine in respect of a plurality of degrees of freedom of movement, in which a real rotational movement of the rotational device differs from an ideal rotational movement, the method comprising the steps of:
- providing a test body as claimed in claim 21 arranged at, or fastened to, the rotational device;
- rotating the test body about a rotational axis,
- establishing rotational errors using a plurality of sensors that are each respectively assigned to one of the test elements of the test body and configured to measure deviations in respect of at least one of the degrees of freedom of movement.

23. A test body for establishing one or more rotational errors of a rotational device for a coordinate measuring machine, in respect of one or more degrees of freedom of movement, in which a real rotational movement of the rotational device differs from an ideal rotational movement, the test body comprising:
- a holder, rotatable together with part of the rotational device about a rotational axis, the holder configured to arrange or fasten the test body in relation to the rotational axis about which the test body is to be rotated for establishing the rotational error or errors;
- a plurality of test elements rigidly connected to the holder or formed on the holder, each test element of the plurality of test elements being used to establish the rotational error in respect of one or more of the degrees of freedom of movement;
- a first test element of said plurality including a reflector aligned at an angle to the rotational axis and reflecting radiation incident thereon in a direction dependent on the rotational angle of the test body;
- a distance sensor and/or an angle sensor being assignable to the reflector, such that:
  - a rotation of the test body about a rotational axis of the rotational device, and/or a rotation of the test body about one or more axes at an angle to the rotational axis, and/or an unchanging position of the test body is registrable using the angle sensor; or
  - a translational error is determinable with the distance sensor by measuring the distance between the reflector and the distance sensor;
- a second test element of said plurality of test elements includes a rotationally-symmetric measurement body having an axis of symmetry arranged coaxial to the rotational axis;
- distance sensors assignable to the rotationally symmetric measurement body; and
- translational deviations in directions at an angle to the rotational axis are determinable with the distance sensors.

24. A method for establishing rotational errors of a rotational device for a coordinate measuring machine in respect of a plurality of degrees of freedom of movement, in which a real rotational movement of the rotational device differs from an ideal rotational movement, the method comprising the steps of:
- providing a test body as claimed in claim 23 arranged at, or fastened to, the rotational device;
- rotating the test body about a rotational axis,
- establishing rotational errors using a plurality of sensors that are each respectively assigned to one of the test elements of the test body and configured to measure deviations in respect of at least one of the degrees of freedom of movement.

* * * * *